Figure 5:
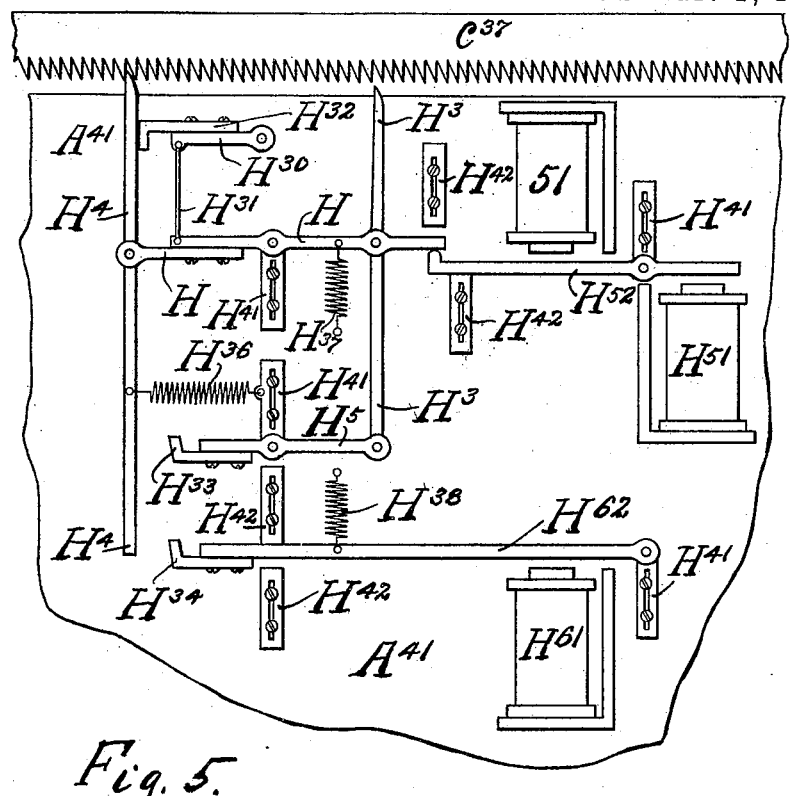

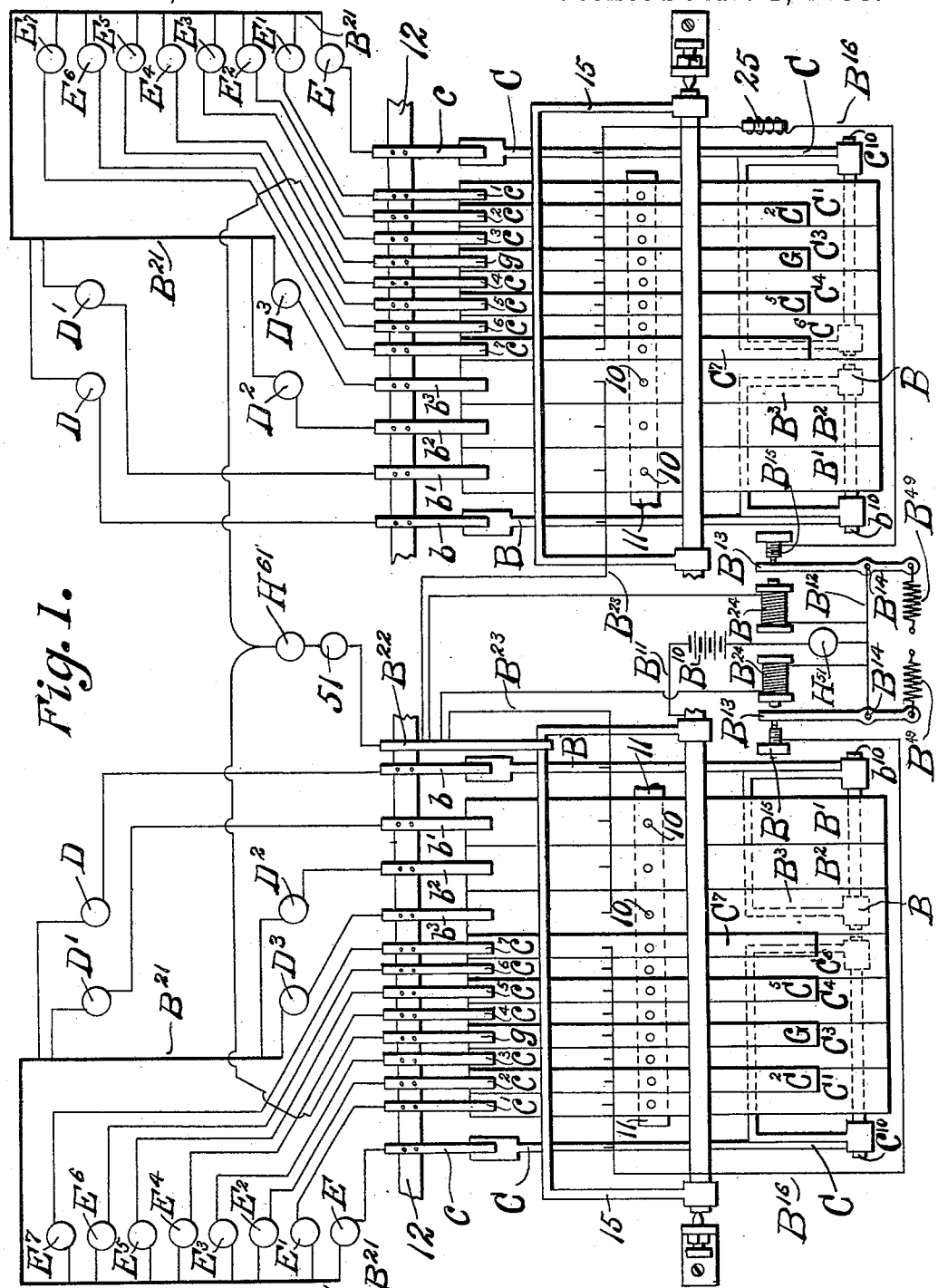

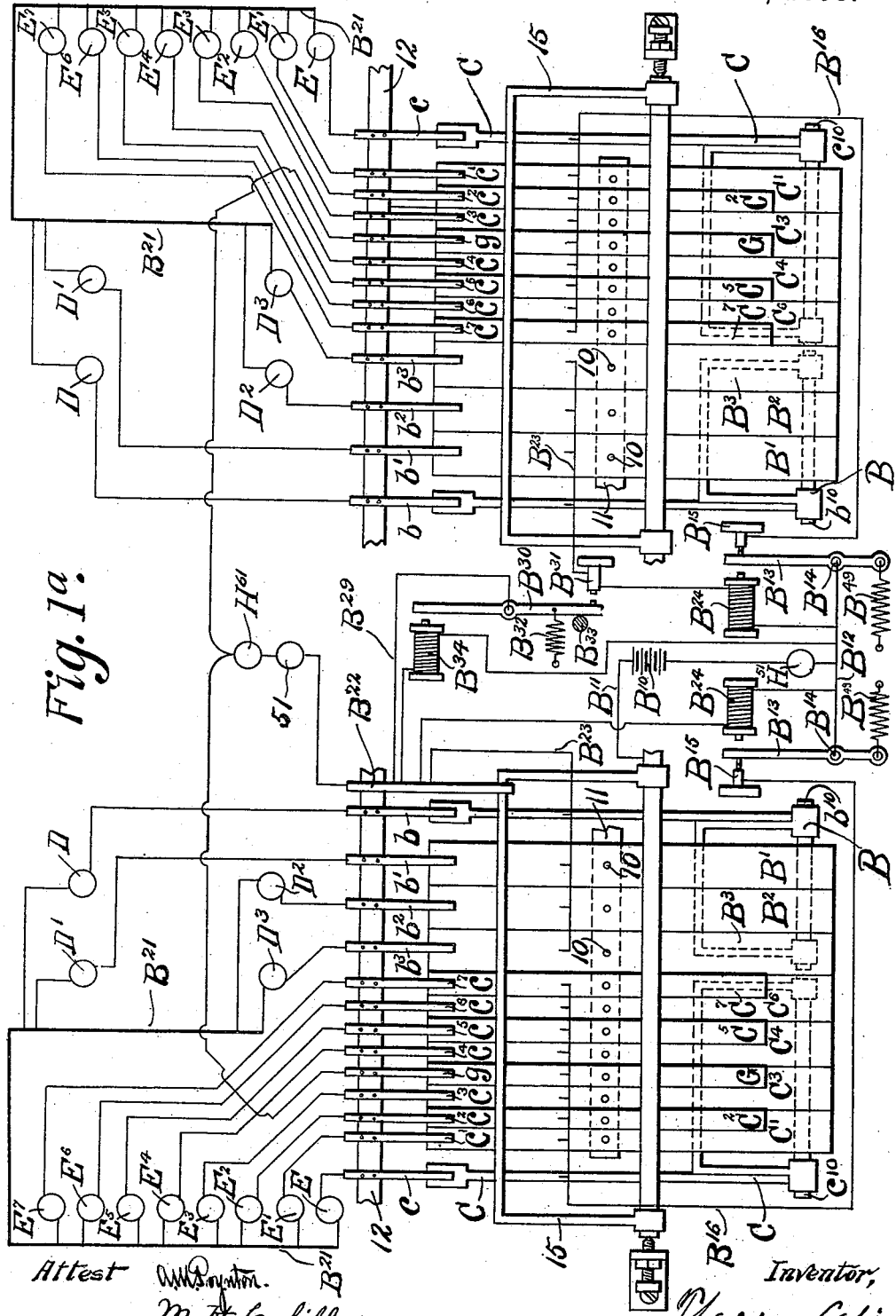

(No Model.) T. CAHILL. 10 Sheets—Sheet 3.
TYPE WRITING MACHINE.
No. 600,120. Patented Mar. 1, 1898.
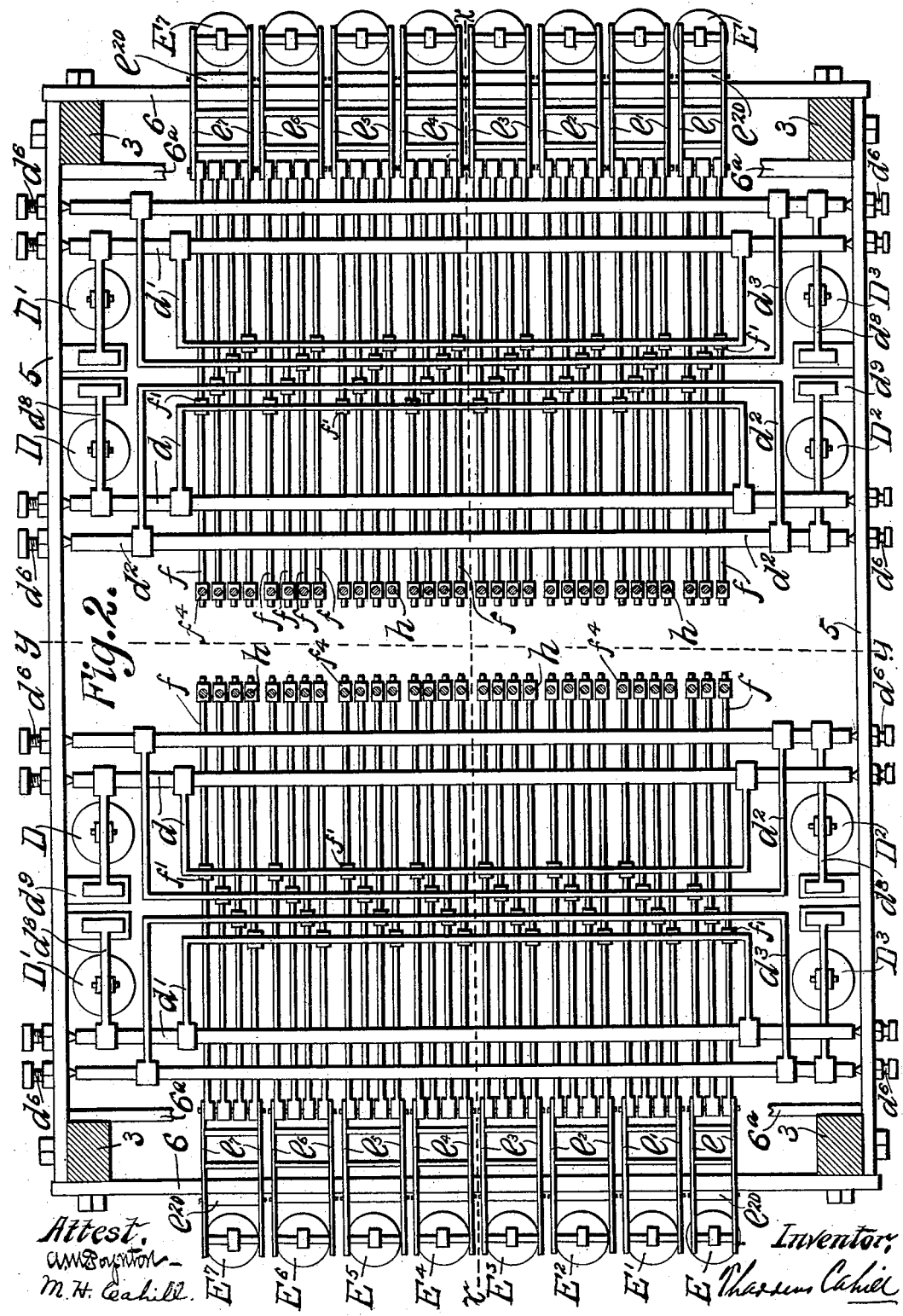

(No Model.) 10 Sheets—Sheet 4.
T. CAHILL.
TYPE WRITING MACHINE.
No. 600,120. Patented Mar. 1, 1898.
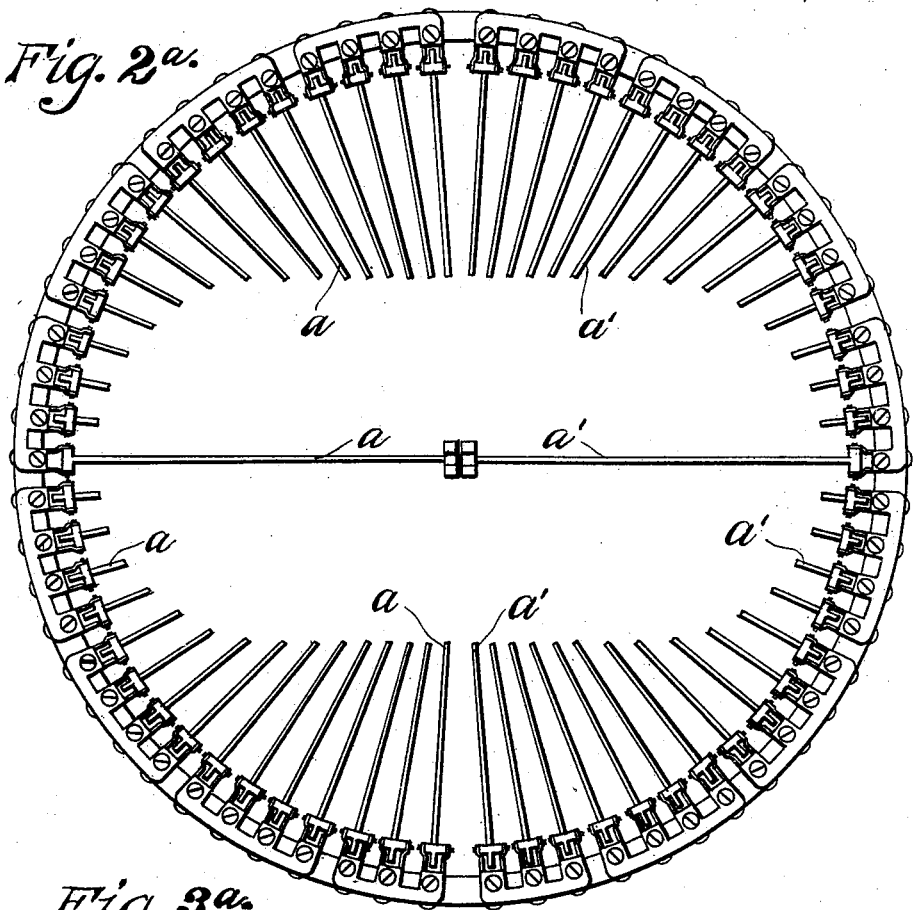
Fig. 2ª.
Fig. 3ª.
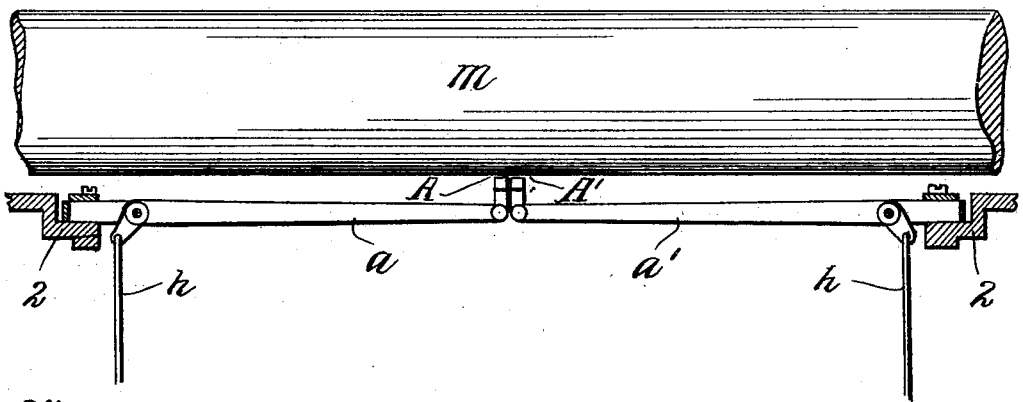
Witnesses
Inventor, (No Model.)　　　　　　　T. CAHILL.　　　　10 Sheets—Sheet 5.
TYPE WRITING MACHINE.
No. 600,120.　　　　　　　　　　Patented Mar. 1, 1898.
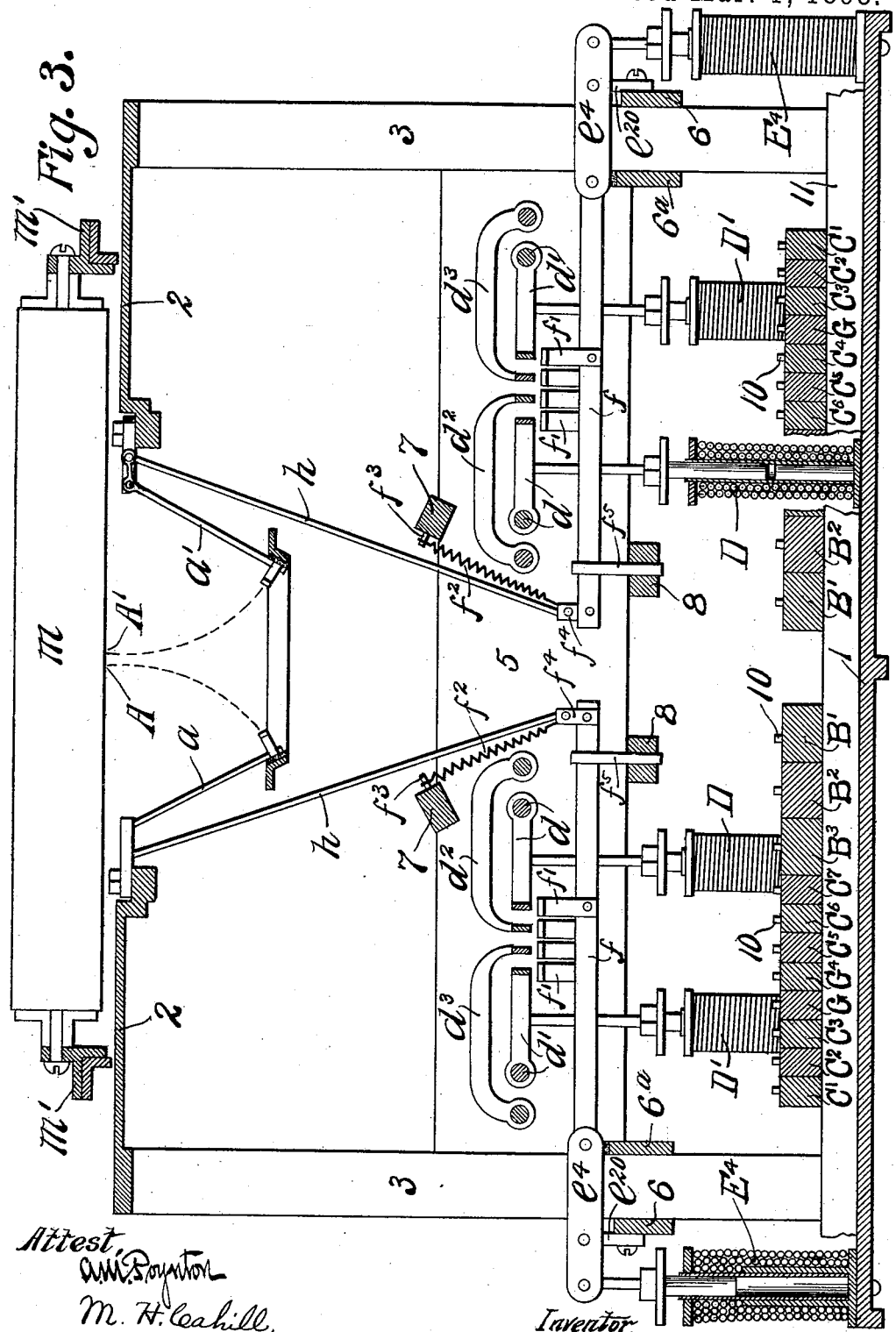
Attest,
A. W. Boynton
M. H. Cahill.
Inventor,
Thaddeus Cahill

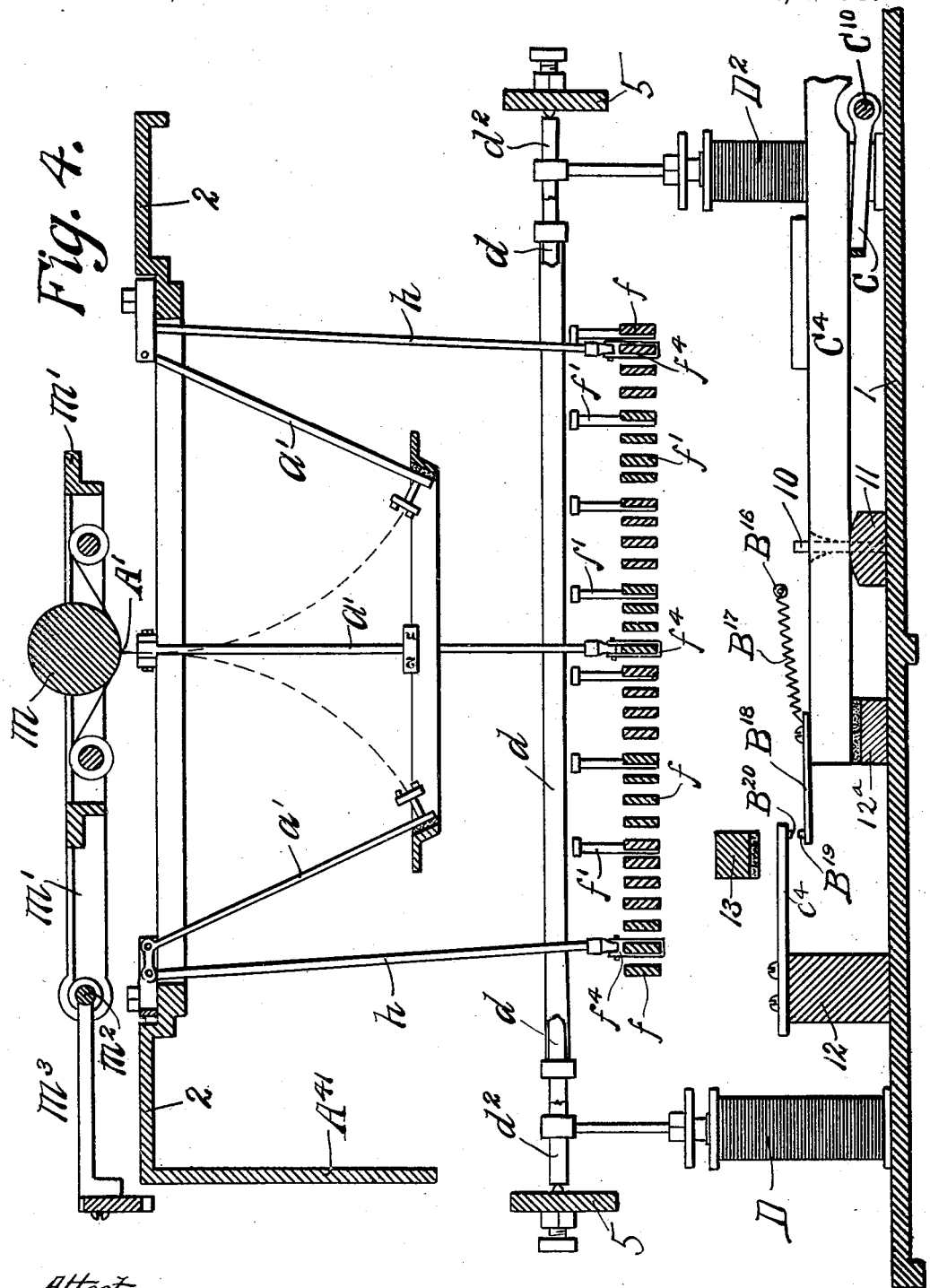

(No Model.)  10 Sheets—Sheet 7.

T. CAHILL.
TYPE WRITING MACHINE.

No. 600,120. Patented Mar. 1, 1898.

(No Model.) 10 Sheets—Sheet 10.
T. CAHILL.
TYPE WRITING MACHINE.
No. 600,120. Patented Mar. 1, 1898.
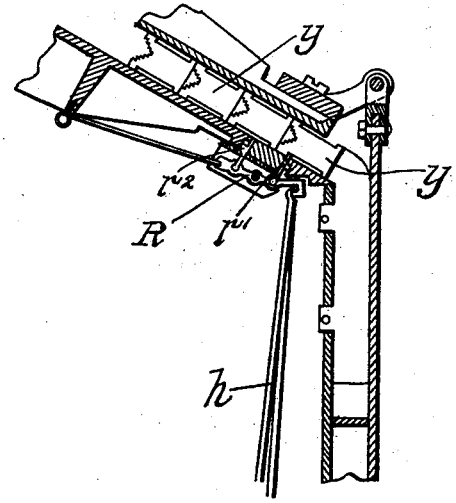
Fig. 8.
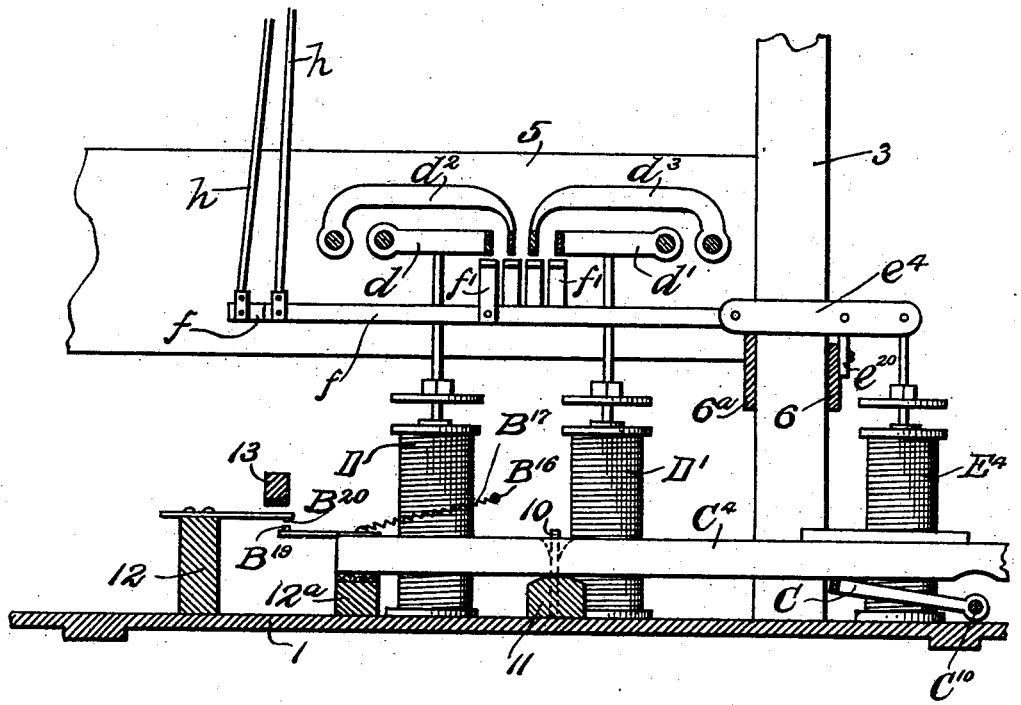
Attest:
Arthur T. Cahill.
Inventor:
Thaddeus Cahill

UNITED STATES PATENT OFFICE.

THADDEUS CAHILL, OF NEW YORK, N. Y., ASSIGNOR TO HIMSELF, AMOS J. CUMMINGS, GEORGE F. CAHILL, ARTHUR T. CAHILL, AND E. HILTON JACKSON, TRUSTEES.

TYPE-WRITING MACHINE.

SPECIFICATION forming part of Letters Patent No. 600,120, dated March 1, 1898.

Application filed October 21, 1896. Serial No. 609,489. (No model.)

*To all whom it may concern:*

Be it known that I, THADDEUS CAHILL, a citizen of the United States, and a resident of the city, county, and State of New York, temporarily residing at Washington, in the District of Columbia, have invented certain new and useful Improvements in Type-Writing Machines, Type-Setting Machines, Linotyping-Machines, and other Similar Instruments, of which improvements the following is a specification.

The objects of my invention are to increase the ease and rapidity with which work can be done upon a machine of the sort hereinbefore mentioned; and my invention consists in the parts, improvements, and combinations hereinafter described and claimed.

I shall first describe my invention as applied to a type-writing machine and after that will point out how it may be applied to type-setting machines, linotyping-machines, and other similar instruments.

My invention as applied to a type-writing machine relates more particularly to two essential features, to wit: (a) to an improved form of permutational character-selecting mechanism, and (b) to two sets of type-bars and means controlling the same, whereby two letters may be printed at the same time, the type-bars striking the paper at or about the same instant. Both these features belong to the preferred form of machine illustrated in the drawings; but each is capable of being used entirely independently of the other, and the permutational character-selecting mechanism constituting a part of my present invention is applicable generally to linotype-machines, matrix-making machines, and a number of other instruments, as well as to type-writing machines.

Figure 6:
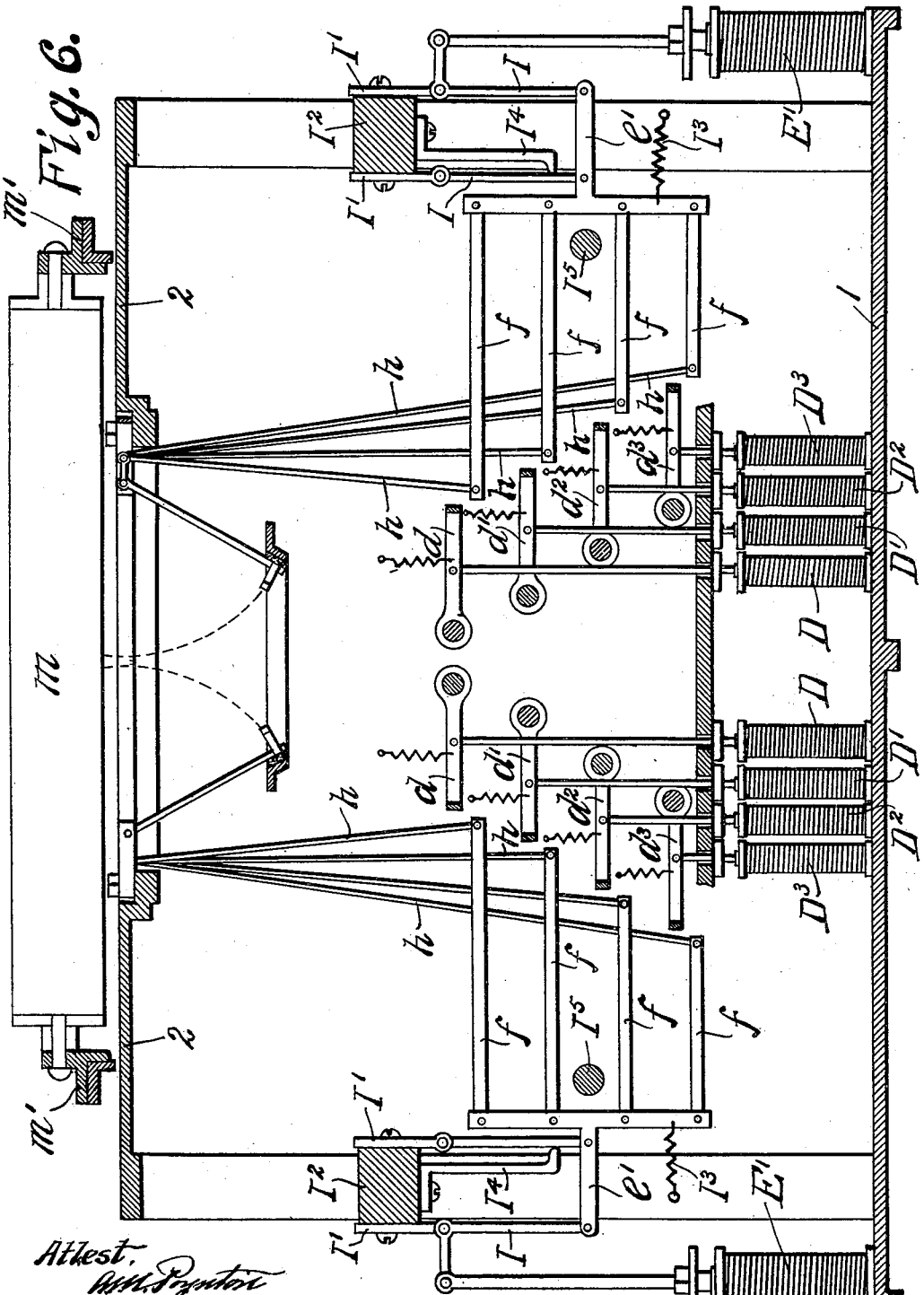
Figure 7:
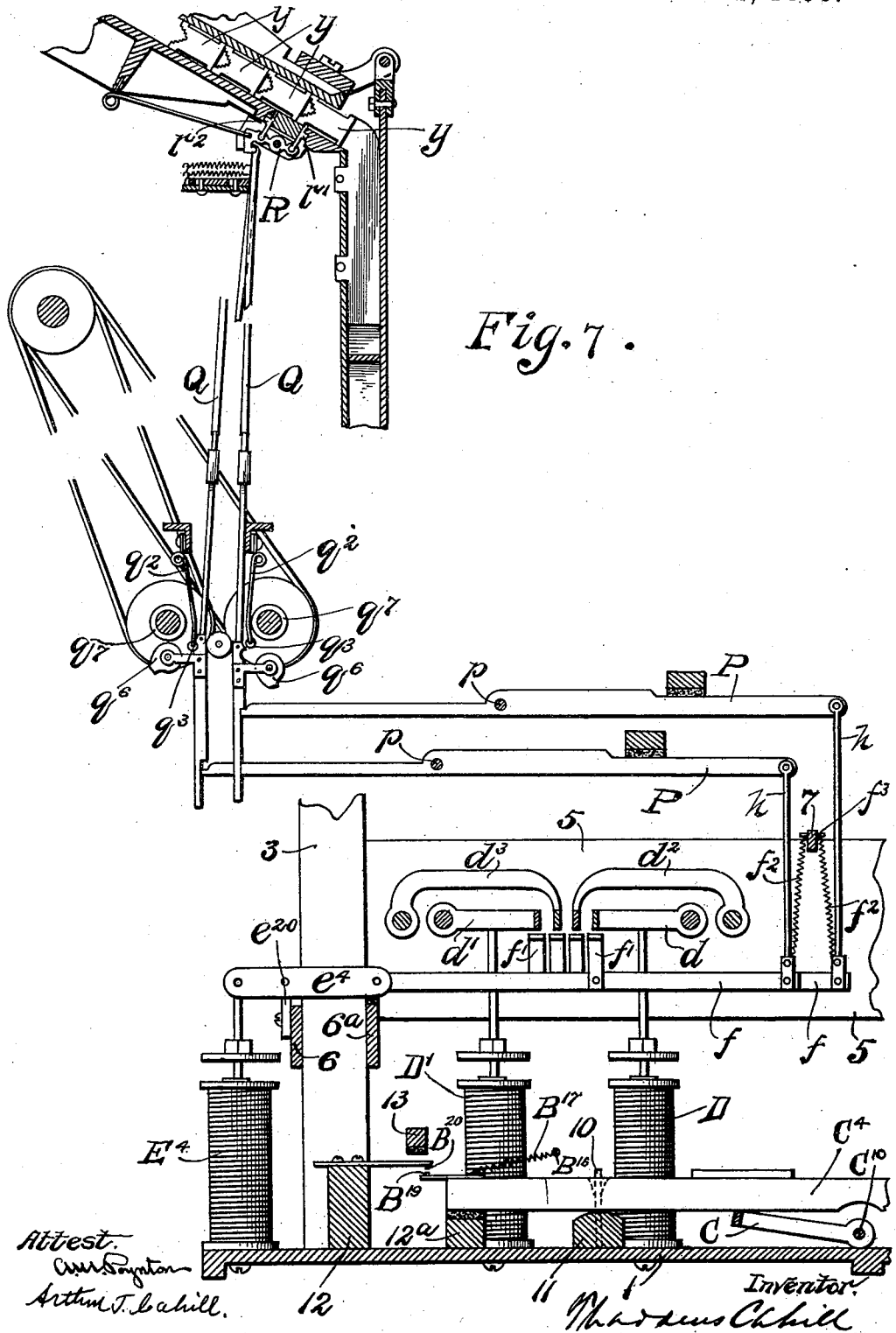

In the accompanying drawings, Figure 1 is a diagrammatic view illustrating the electrical connections of one form of apparatus constructed according to my invention, the keys being shown in plan. Fig. 1ª is a view similar to Fig. 1, illustrating a modification. Fig. 2 is a diagrammatic plan view, partly in section, illustrating the selecting mechanism, the paper-carriage, with the whole of the upper portion of the machine being removed and the keys and various other parts being omitted. Fig. 2ª is a diagrammatic plan view illustrating the two sets of type-bars, to wit: the set of type-bars $a\ a$, adapted to be operated by the left hand, and the set of type-bars $a'\ a'$, adapted to be operated by the right hand, the bars of each set being arranged to strike to a printing-point common to the bars of such set and the printing-points of the two sets of bars being arranged adjacent to each other. Fig. 3 is a sectional view, partly in elevation, on the line $x\ x$, Fig. 2. Fig. 3ª is a detail sectional elevation illustrating two type-bars, to wit: one belonging to the left-hand or quick-acting set of type-bars and the other belonging to the right-hand or slow-acting set of type-bars, each in its own proper printing position. Fig. 4 is a sectional view, partly in elevation, on the line $y\ y$, Fig. 2. Fig. 5 is a diagrammatic view, a detail rear elevation, illustrating the spacing mechanism. Fig. 6 is a diagrammatic view, a sectional elevation similar to Fig. 3, illustrating a modified construction. Fig. 7 is a sectional view, partly in elevation, illustrating one of my permutational character-selecting devices connected to operate the escapement or releasing devices of a Mergenthaler linotype-machine. Fig. 8 is a view similar to the preceding, but illustrating a simpler construction of the parts.

The drawings illustrate the essential features of the construction figured in them without attempting to show all the usual details well known in the art; nor do they attempt to show sizes and proportions of parts. Some of the figures are indeed quite diagrammatic, sacrificing to some extent form and proportion and occasionally even the relative positions of the parts to a clearer illustration of the essentials of the construction. This is particularly true of Fig. 1. Enough, in short, is shown to clearly illustrate the essential features of the construction, and no effort is made to show non-essential details of construction, which are entirely within the range of ordinary mechanical skill and which every constructor makes to suit himself.

The preferred form of type-writing machine illustrated in Figs. 1 to 5 consists, essentially, of (a) two sets of type-bars, the bars of each set being disposed around an arc and arranged so that they strike to a printing-point common to the set, the printing-points of the two sets being adjacent to each other; (b) two sets of keys controlling the two sets of type-bars above mentioned, the two sets of keys being adapted to be operated simultaneously by the operator for the making of two letters at the same time, one letter from each set of keys; (c) two permutational selecting devices, one for each set of keys, each such permutational selecting device being controlled by its own set of keys and serving to connect such keys with the corresponding set of type-bars; (e) releasing mechanism whereby the type-bars are left free to return to their normal positions after they have printed their letters, notwithstanding the fact that the keys which have caused them to act are still held down by the operator; (f) means whereby the two letters which are produced substantially simultaneously are made to print one a very short interval of time before the other, so that interference between the bars when coming into position to print is avoided; (g) a suitable paper-carriage, and (h) spacing mechanism, whereby the requisite spaces between the successive letters and words are obtained. The ribbon mechanism, alarm-bell, interlinear spacing mechanism, and other minor details, of which many forms are well known in the art and no particular one of which is essential to my invention, are not illustrated.

Such is the apparatus shown in Figs. 1 to 5 in illustration of my invention as applied to a type-writing machine; but some of the parts above enumerated may be omitted and many modifications may be made without departing from certain important points of my invention, hereinafter fully described and distinctly claimed, and at the outset I wish it to be understood that in describing the structure illustrated in Figs. 1 to 5 I am describing the construction of my preferred form of type-writing machine, so as to enable any person skilled in the art to carry out the invention in that mode which I consider as on the whole best, but that I am not setting out the dry essentials of the invention or distinguishing between what is new and what is old, such pointing out of the essentials of my invention and distinguishing between what is new and what is old being done in the latter part of this specification after the form of device figured in the drawings has been fully explained.

*The main frame.*—The main frame consists of a bed-plate 1, a top plate 2, four columns 3 3 3 3, attached to the bed-plate and serving to support the top plate, and front and back bars 5 5, attached to the columns 3 3 and serving to furnish a support for various rock-shafts and other parts hereinafter described. To the principal parts above mentioned of the main frame other parts are attached, as illustrated in the drawings and hereinafter described. Thus rails 6 6, lying transverse to the length of the platen and parallel with the length of the keys, are screwed fast to the columns 3 3 and serve to support flanges $e^{20}$, by which the frames $e$, $e'$, $e^2$, $e^3$, $e^4$, $e^5$, $e^6$, and $e^7$, hereinafter described, are fulcrumed. Other rails $6^a$ $6^a$, lying parallel to the rails 6 6 above described, serve to support the ends of said frames $e$ $e'$ $e^2$ $e^3$, &c., when said frames are in their normal positions. Rails 7 7, (omitted in Fig. 2, but shown in Fig. 3,) lying parallel to the rails 6 6 and $6^a$ $6^a$, but supported by the front and back bars 5 5, serve to support pins $f^3$ $f^3$, to which the fixed ends of the contractile springs $f^2$ $f^2$, hereinafter described, (by which the type-bars are returned to their normal positions,) are secured. Other rails 8 8, (also omitted in Fig. 2,) likewise attached to the front and back bars 5 5 and lying parallel to the rails 6 6, $6^a$ $6^a$, and 7 7, serve to carry guide-pins $f^5$ $f^5$, by which the type-bar-connected levers $ff$, hereinafter described, are kept each in its proper lateral position. Fulcrum-bars 11 11, extending transverse to the keys, are attached to the bed-plate and serve to support the fulcrum-pins 10 10, by which the various keys are centered. A bar of insulating material 12, suitably attached to the bed-plate, serves to carry the contact-springs $b$ $b'$ $c$ $c'$, &c., hereinafter described, and a similar bar 13, covered with felt on its lower surface and suitably attached to the bed-plate, lies above the front ends of said contact-springs $b$ $b'$ $c$ $c'$, &c., a short distance and serves to arrest the motion of the keys when the same are depressed in front of the center and after they have established connection with the corresponding contact-pieces $b$ $b'$ $c$ $c'$, &c., as the case may be. To the top plate 2 the various type-bar hangers, the paper-carriage, and the inking-ribbon mechanism (the last of which is not shown in the drawings) are attached in any suitable manner—say, for example, after the fashion employed in the machine long well known in the art and trade as the "Remington Standard Type-Writer No. 2" or in any other known or suitable manner. The top plate 2 is furnished with a downward extension $A^{41}$, to which the spacing mechanism is attached in a manner hereinafter described. Other details of the framework will be described hereinafter.

*The two sets of type-bars.*—I have said that I employ two sets of type-bars, the bars of each set being disposed around an arc and arranged so that they strike to a printing-point common to the set, the printing-points of the two sets being adjacent to each other. The construction is illustrated in Figs. 3 and 4, which are sectional views. $a$ $a$ are the type-bars of the one set, controlled by the keys of the left-hand set, and $a'$ $a'$ are the type-bars of the other set, controlled by the keys of the right-hand set. The dotted lines in Fig. 4, drawn from the type-bars $a'$ $a'$ to the printing-point $A'$, common to such bars, are intended to illustrate the fact that all the bars of a set strike to a printing-point common to such set, and the similar dotted lines in Fig. 3, drawn from the type-bars $a$ and $a'$, respectively, to the printing-points A and A', belonging, respectively, to the left-hand and right-hand sets of bars, are intended to illustrate the fact that the printing-points of the two sets of type-bars are adjacent to each other along the line of printing a distance apart equal to one letter-space, so that when letters are printed simultaneously, one from the set of bars $a\,a$ and the other from the set of bars $a'\,a'$, the two letters thus printed stand in proper consecutive order upon the line of printing, the letter printed by the bar $a$ standing first in the line and that printed by the bar $a'$ following it in proper order.

*The two sets of keys.*—It has been said that there are two sets of keys controlling the two sets of type-bars, the two sets of keys being adapted to be operated simultaneously by the operator for the making of two letters at the same time, one letter from each set of keys. The two sets of keys are similar, so that a description of one set is a description of both sets. Each set, as figured in the drawings, consists of (a) three keys marked, respectively, B', B², and B³, which, with a frame B, controlled by said keys B', B², and B³, control four frames, $d, d', d^2$, and $d^3$, hereinafter described, belonging to the permutational selecting device proper to such set of keys; (b) seven keys, C', C², C³, C⁴, C⁵, C⁶, and C⁷, which, with a frame C, controlled by said keys C' C², &c., control the eight frames $e, e', e^2, e^3, e^4, e^5, e^6$, and $e^7$, hereinafter described, which coact with the four frames $d, d', d^2$, and $d^3$, before mentioned, in selecting letters, as hereinafter described, and (c) a space-key G. For convenience sake the keys B', B², and B³ will sometimes be termed hereinafter the "B-group" keys or the keys of the "B group," and the keys C' C², C³, C⁴, C⁵, C⁶, and C⁷ will sometimes be termed hereinafter the keys of the "C group" or the "C-group" keys. The keys are preferably arranged somewhat like those of a pianoforte, as illustrated in the drawings. (See Fig. 1.) They may be centered by means of pins 10 10, driven into a fulcrum-bar 11, as in a pianoforte, or they may be fulcrumed in any other suitable manner whatever. The rear ends of the keys rest normally down upon a felted bar 12ª, Fig. 4. The frames B and C and the electrical connections will be described after the essential parts of the selecting device have been described.

*The permutational selecting devices.*—The function of the permutational selecting devices is to enable a large number of letters to be made by a smaller number of keys. There are two such selecting devices, one for the right-hand set of keys and the other for the left-hand set of keys. The two devices are similar, so that a description of one is a description of both. (See particularly Figs. 2 and 3.) $d', d^2, d^3$, and $d$ are frames corresponding, respectively, to the three keys B' B² B³ and the frame B. Said frames, as illustrated in the drawings, consist each of a center rod or shaft and a bent side and end portion firmly attached to the center rod. The center rod is fulcrumed by means of pointed screws $d^6\,d^6$, set in the front and back bars 5 5 and held in place by lock-nuts. $e', e^2, e^3, e^4, e^5, e^6, e^7$, and $e$ are other frames or levers corresponding, respectively, to the keys C' C² C³ C⁴ C⁵ C⁶ C⁷ and the frame C. The frames $d', d^2, d^3$, and $d$ are each operated by electromagnets D', D², D³, and D, hereinafter described, controlled, respectively, by the keys B' B² B³ and the frame B. In like manner the other frames or levers $e', e^2, e^3, e^4, e^5, e^6, e^7$, and $e$ are operated by other electromagnets E', E², E³, E⁴, E⁵, E⁶, E⁷, and E, controlled, respectively, by the keys C' C² C³ C⁴ C⁵ C⁶ C⁷ and the frame C.

$f\,f\,f\,f$ are levers corresponding to the type-bars of the set which they control, and said levers $f\,f\,f\,f$ are connected each by a pull-down wire $h$, attached to one end of said lever $f$, with the corresponding type-bar. The other end of each of said levers $f\,f\,f\,f$—that is to say, the end of said lever remote from the end to which the pull-down wire $h$ is connected—is pin-jointed to one of the frames $e, e', e^2, e^3, e^4, e^5, e^6$, or $e^7$, four of said levers $f\,f\,f\,f$ being pin-jointed to each of said frames $e', e^2, e^3, e^4, e^5, e^6$, and $e^7$ and three to the frame $e$. The frames $d, d', d^2$, and $d^3$ overlie the levers $f\,f$ intermediate the points at which said levers are connected (a) with the frames $e, e', e^2, e^3, e^4, e^5, e^6$, or $e^7$, as the case may be, and (b) with the pull-down wires $h\,h$, by which said levers are connected, it will be remembered, with the type-bars. Said levers $f\,f\,f\,f$ are operated each by the conjoint action of some one of the frames $d, d', d^2$, and $d^3$ corresponding to the B-group keys and some one of the frames $e, e', e^2, e^3, e^4, e^5, e^6$, and $e^7$ corresponding to the C-group keys, and each different lever $f$ is operated by a different combination of the frames above mentioned, and every different combination of two frames belonging one to the group of frames $d, d', d^2$, and $d^3$ (corresponding to the B-group keys) and the other to the group of frames $e, e', e^2, e^3, e^4, e^5, e^6$, and $e^7$ (corresponding to the C-group keys) operates a different lever and thereby a different type-bar.

Each of the frames $d, d', d^2$, and $d^3$ affects one of the levers $f\,f\,f\,f$ connected with each of the frames $e, e', e^2, e^3, e^4, e^5, e^6$, and $e^7$, (except that the frame $d$, for reasons which will appear hereinafter, does not affect any of the levers $f\,f\,f$ connected with the frame $e$,) and in each group of levers $f\,f\,f\,f$ belonging to one of the frames $e\,e'\,e^2$, &c., each of the frames $d, d', d^2$, and $d^3$ affects a different lever $f$ from what any other one of said frames affects. To this end a projection $f'$ is attached to each of the levers $f\,f$, &c., immediately underneath that one of the frames $d$, $d'$, $d^2$, or $d^3$ which is designed to operate the particular lever $f$ to which such projection is attached. The top surfaces of said projections $f'$ $f'$ stand above the top surfaces of the levers $f$ $f$ a distance somewhat greater than the maximum movement of the levers $f$ $f$ or of the frames $d$, $d'$, $d^2$, and $d^3$ at that point, so that any particular lever in one of the groups of levers $f$ $f$ carried by one of the frames $e$, $e'$, $e^2$, $e^3$, $e^4$, $e^5$, $e^6$, and $e^7$ can coact with the corresponding frame $d$, $d'$, $d^2$, or $d^3$, as the case may be, without affecting or being affected by any other of said frames.

In my preferred construction the frames $d$, $d'$, $d^2$, and $d^3$ lie normally with their lower surfaces in close proximity to the upper surfaces of the projections $f'$ $f'$, attached to the levers $f$ $f$. Contractile springs $f^2$ $f^2$, which are attached at one end to the levers $f$ $f$ at the points at which said levers are connected by the couplings $f^4$ $f^4$ with the pull-down wires $h$ $h$ and at the other end to pins $f^3$ $f^3$, driven into the bars 7 7, (which latter extend across the machine from the front bar 5 to the back bar 5,) serve to pull upwardly upon each of the levers $f$ $f$ with a force greater than is required to lift one of the frames $d$ $d'$ $d^2$ $d^3$. When, therefore, any of the frames $e$, $e'$, $e^2$, $e^3$, $e^4$, $e^5$, $e^6$, and $e^7$ is tilted by the action of the magnet E E' $E^2$, &c., controlling it, so that the end of said frame connected with the levers $f$ $f$ is raised, each of said levers $f$ $f$ connected with the frame that is tilted will move upon its point of connection with the pull-down wire $h$ as a fulcrum and will raise that one of the frames $d$, $d'$, $d^2$, or $d^3$ which lies over it (supposing said frame to be not held down by the action of the appropriate magnet D, D', $D^2$, or $D^3$, as the case may be) without at all affecting the pull-down wires $h$ $h$ or the type-bars with which said pull-down wires connect said levers $f$ $f$; but if when any of said frames $e$ $e'$ $e^2$, &c., is tilted in the manner above described any one of the frames $d$, $d'$, $d^2$, or $d^3$ be held at rest (by the action of the appropriate magnet D, D', $D^2$, or $D^3$ or in any other suitable manner) such frame so held at rest will give a fulcrum to that one of the levers $f$ lying under it which is raised by the frames $e$, $e'$, $e^2$, $e^3$, $e^4$, $e^5$, $e^6$, or $e^7$ that is tilted, said lever will move upon its point of bearing on said frame so held at rest, $d$, $d'$, $d^2$, or $d^3$, as the case may be, as a fulcrum, and the end of said lever $f$, connected with the pull-down wire $h$, will move down, thus, through the pull-down wire $h$, throwing up the corresponding type-bar, so that said type-bar prints its proper character; but the other three frames of the set of frames $d$, $d'$, $d^2$, and $d^3$ which are not held down will be raised by the levers $f$ $f$ $f$ underlying them, and the type-bars corresponding to such levers $f$ $f$ $f$ will be in no wise affected. Thus, it will be seen, each of the frames $e'$, $e^2$, $e^3$, $e^4$, $e^5$, $e^6$, and $e^7$ serves for the printing of four different letters, one by the coaction of the frame $d$ when said frame is held at rest, one by the coaction of the frame $d'$ when said frame is held at rest, another by the coaction of the frame $d^2$ when said frame is held at rest, and a fourth character by the action of the frame $d^3$ when said frame is held at rest; but the frame $e$ serves for the printing of three characters only, to wit: one by the coaction of the frame $d'$, another by the coaction of the frame $d^2$, and a third by the coaction of the frame $d^3$. In other words, the frame $e$, unlike the frames $e'$, $e^2$, $e^3$, $e^4$, $e^5$, $e^6$, and $e^7$, and for reasons which will clearly appear hereinafter, has no lever $f$ adapted to coact with the frame $d$.

In the preferred construction illustrated in the drawings electromagnets D', $D^2$, $D^3$, and D, connected with the frames $d'$, $d^2$, $d^3$, and $d$, respectively, and controlled by the keys B' $B^2$ $B^3$ and the frame B, respectively, serve to hold said frames at rest, each as required, with the magnet-connected arm $d^8$ held fast down upon the stop $d^9$, so that the frame thus held at rest affords an effective fulcrum to the lever $f$ in moving its type-bar, and electromagnets E', $E^2$, $E^3$, $E^4$, $E^5$, $E^6$, $E^7$, and E, controlled, respectively, by the keys C' $C^2$ $C^3$ $C^4$ $C^5$ $C^6$ $C^7$ and the frame C, are connected, respectively, with and serve to operate the frames $e'$, $e^2$, $e^3$, $e^4$, $e^5$, $e^6$, $e^7$, and $e$; but very obviously said frames $d$, $d'$, $d^2$, and $d^3$ and $e$, $e'$, $e^2$, $e^3$, $e^4$, $e^5$, $e^6$, and $e^7$ might be operated in other ways than by means of electromagnets. Very obviously each of said frames might, for example, be operated by a key of its own, each key acting upon its controlled frame entirely independently of electromagnets or other power devices.

I prefer, as before said, to have the frames $d$, $d'$, $d^2$, and $d^3$ lie in their normal positions, with their lower faces in close proximity to the upper surfaces of the projections $f'$ $f'$, attached to the type-bar-connected levers $f$ $f$, so that when any one of said frames $d$, $d'$, $d^2$, and $d^3$ is held down it furnishes an effective fulcrum for the lever $f$ underlying it, raised by the action of the proper frame $e$ $e'$ $e^2$, &c., and so that such of said frames $d$, $d'$, $d^2$, and $d^3$ as are not held down are lifted by the raising of those levers $f$ $f$ $f$ lying underneath them which are raised by the action of that one of the frames $e$ $e'$ $e^2$, &c., which acts to make a letter; but instead of employing this arrangement the frames $d$, $d'$, $d^2$, and $d^3$ may be made to lie each normally with its lower surface above the top surfaces of the projections $f'$ $f'$ a distance as great as or slightly greater than the distance which such projections $f'$ $f'$ are lifted by the tilting of the frames $e$ $e'$ $e^2$, &c., and each of the frames $d$, $d'$, $d^2$, and $d^3$ when it acts for the printing of a letter may be pulled down from such (its normal) position either by an electromagnet, as illustrated in the drawings, or in any other suitable manner, so that it will press down upon the lever $f$ to be operated in the middle at the same time that said lever $f$ is raised at one end by the action of the corresponding frame $e$ $e'$ $e^2$, &c., as the case may be.

It has now been made clear that each different combination of two frames belonging one to the group of frames $d$, $d'$, $d^2$, and $d^3$ and the other to the group of frames $e$, $e'$, $e^2$, $e^3$, $e^4$, $e^5$, $e^6$, and $e^7$ actuates a different one of the type-bar-connected levers $f f f$ and a different type-bar, thereby printing a different character. This statement, however, is to be taken subject to the exception that the frames $d$ and $e$, for reasons which will clearly appear hereinafter, are not adapted to act together in printing a character, the frame $e$ carrying but three of the levers $f f f$, which serve for the frames $d'$, $d^2$, and $d^3$, respectively, no lever $f$ being furnished by the frame $e$ for the frame $d$ to act upon.

It remains to describe the mechanism by which the keys control the frames $d$, $d'$, $d^2$, and $d^3$ and $e$, $e'$, $e^2$, $e^3$, $e^4$, $e^5$, $e^6$, and $e^7$. I shall first describe the arrangement of the left-hand keys, with their electrical connections, after which the arrangement of the right-hand keys and connections, being in most respects similar to those of the left-hand keys, will be easily explained.

*The electrical connections.*—Electromagnets D, D', $D^2$, and $D^3$, as before said, control the frames $d$, $d'$, $d^2$, and $d^3$, respectively, and other electromagnets E, E', $E^2$, $E^3$, $E^4$, $E^5$, $E^6$, and $E^7$, respectively, as before said, serve to control the frames $e$, $e'$, $e^2$, $e^3$, $e^4$, $e^5$, $e^6$, and $e^7$, respectively. The construction of these magnets is fully illustrated in the drawings and will be referred to hereinafter; but it is sufficient for my present purposes to call attention to the fact that each consists, essentially, of (a) a fixed core screwed fast to the bed-plate, (b) a movable armature connected to the frame with which such magnet corresponds and which it serves to actuate, and (c) an energizing-coil or solenoid wound about a hollow tube and surrounding both the fixed core and the movable armature. When a current is passed through said energizing-coil, the inclosed core and armature become magnetized and attract each other. The effect of energizing one of the magnets D D' $D^2$ $D^3$ is to cause said magnet to pull down upon the corresponding frame $d$, $d'$, $d^2$, or $d^3$, and the effect of energizing one of the magnets $e$ $e'$ $e^2$ $e^3$ $e^4$ $e^5$ $e^6$ $e^7$ is to cause such magnet to pull down upon that end of the frame $e$, $e'$, $e^2$, $e^3$, $e^4$, $e^5$, $e^6$, or $e^7$ with which said magnet is connected, thereby elevating the other end of said frame and the ends of the type-bar-connected levers $f f f f$ pin-jointed thereto.

The keys control the magnets before mentioned, closing their circuits. A separate key might obviously be employed for each of the magnets D, D', $D^2$, and $D^3$ and another separate key for each of the magnets E, E', $E^2$, $E^3$, $E^4$, $E^5$, $E^6$, and $E^7$, in which case no letter could be printed except by the simultaneous depressing of two keys, for no key acting singly would affect the type-bar. I have, however, contrived things in such a manner that a number of the most frequently-occurring letters of the alphabet (ten, with the construction illustrated in the drawings, constituting about seventy-six per-cent. of running letters) can be printed by the action of a single key, the other characters being produced by the simultaneous depressing of two keys. I employ in the construction figured in the drawings (a) three keys B', $B^2$, and $B^3$, which serve to close the circuits, respectively, of the magnets D', $D^2$, and $D^3$; (b) seven keys C', $C^2$, $C^3$, $C^4$, $C^5$, $C^6$, and $C^7$, which serve to close the circuits, respectively, of the magnets E, E', $E^2$, $E^3$, $E^4$, $E^5$, $E^6$, and $E^7$; (c) a frame B, lying underneath the keys B', $B^2$, and $B^3$, which serves to close the circuit of the magnet B when any of the keys E', $E^2$, $E^3$, $E^4$, $E^5$, $E^6$, or $E^7$ is depressed and when no one of the keys B' $B^2$ $B^3$ is depressed, which frame is acted on by any of the keys B', $B^2$, and $B^3$ when depressed, so that it breaks the circuit of its magnet D about the instant that the key B', $B^2$, or $B^3$ depressed closes the circuit of the magnet D', $D^2$, or $D^3$ corresponding to it, and (d) I employ a frame C, lying underneath the keys C', $C^2$, $C^3$, $C^4$, $C^5$, $C^6$, and $C^7$, which serves to close the circuit of the magnet E controlling the frame $e$, when any one of the keys B', $B^2$, or $B^3$ is depressed and when no one of the keys C, C', $C^2$, $C^3$, $C^4$, $C^5$, $C^6$, or $C^7$ is depressed, which frame is acted upon by any of the keys C, C', $C^2$, $C^3$, $C^4$, $C^5$, $C^6$, and $C^7$ when depressed, so that it breaks the circuit of its magnet E about the instant that the key C', $C^2$, $C^3$, $C^4$, $C^5$, $C^6$, or $C^7$ depressed closes the circuit of the magnet corresponding to it. There is also a space-key G, as before mentioned, and a rocking frame 15, the latter lying across all the keys, both those of the left-hand set and those of the right-hand set, which serves, when raised by the depressing of any key, to close the otherwise open battery-circuit; and by depressing a key, it may be well to say here, I mean the pressing down of the front end of it by the operator, which of course causes the rear part of the key which the frame 15 overlies to rise, thereby raising said frame 15.

It remains to describe the arrangement of the electrical circuits.

$B^{10}$ is a battery or other suitable source of electric current, one pole of which is connected by a wire $B^{11}$ with the metal shaft of the metal rocking frame 15, before mentioned. The other pole of said battery is connected through the space-magnet $H^{51}$, hereinafter described, and the wire $B^{12}$ with the contact-lever $B^{13}$, (which is centered at $B^{14}$,) and through said lever $B^{13}$ with the adjustable contact-screw $B^{15}$. Said adjustable contact-screw is connected by a wire $B^{16}$ with each and all of the keys C', $C^2$, $C^3$, G, $C^4$, $C^5$, $C^6$, and $C^7$ and with the frame C. The connection between said wire $B^{16}$ and said keys and frame may be made in any of the many ways well known to electricians. A convenient arrangement is illustrated in Fig. 4, in which the flexible wire $B^{17}$ leads from the principal wire $B^{16}$ to a contact-piece $B^{18}$, screwed fast to the rear end of the key and carrying a platinum point $B^{19}$, adapted to make and break connection with a corresponding platinum point $B^{20}$, carried by the contact-spring $c'$ $c^2$ $c^3$, &c., with which the key makes and breaks connection. These details—to wit, the flexible wire $B^{17}$ and the contact-piece $B^{18}$, screwed to the rear end of the key, with the platinum points $B^{19}$ and $B^{20}$—are omitted in the diagrammatic view Fig. 1, in which the key is for greater clearness and convenience of representation supposed to be (as it might well enough be if it were made of metal) itself connected with the battery $B^{10}$. The diagrammatic view Fig. 1 will be more readily understood in such simplified form than it would be if it attempted to show all the mechanical details of the wiring. Above the rear end of each of the keys $C'$, $C^2$, $C^3$, $C^4$, $C^5$, $C^6$, and $C^7$, respectively, and in make-and-break relation therewith, is a contact-piece $c'$, $c^2$, $c^3$, $c^4$, $c^5$, $c^6$, or $c^7$. With these contact-pieces the keys of the C group make connection when depressed; but said keys $C'$, $C^2$, $C^3$, $C^4$, $C^5$, $C^6$, and $C^7$ do not, when in their normal position, make connection with the corresponding contact-pieces $c'$, $c^2$, $c^3$, $c^4$, $c^5$, $c^6$, and $c^7$.

The frame C, before mentioned, is centered at $C^{10}$, being insulated from the main frame and placed underneath the C-group keys in such a position that no one of said keys can be depressed without depressing said frame, rocking it on its center rod. Immediately above the rear end of said frame is a contact-piece $c$, with which said frame, when in its normal position, makes connection; but when said frame is depressed by the depressing of any of the keys $C'$ $C^2$ $C^3$, &c., it breaks connection with its contact-piece $c$. With each of the contact-pieces $c$, $c'$, $c^2$, $c^3$, $c^4$, $c^5$, $c^6$, and $c^7$, before mentioned, respectively, is connected one terminal of each of the magnets E, E', $E^2$, $E^3$, $E^4$, $E^5$, $E^6$, and $E^7$, respectively, which magnets, it will be remembered, serve to actuate the frames $e$, $e'$, $e^2$, $e^3$, $e^4$, $e^5$, $e^6$, and $e^7$, respectively, and the other terminal of each of said magnets is connected with the wire $B^{21}$. One pole of the battery $B^{10}$, it has already been made clear, is connected with the metal center rod of the metal rocking frame 15, which frame, it will be remembered, overlies all the keys in such a position that when any key is depressed in front by the operator it rises behind and thus raises the rocking frame 15—that is to say, tilts said frame upwardly—on its center. When thus tilted upwardly by the depressing of a key, said frame (connected, as before described, by the wire $B^{11}$ with one pole of the battery $B^{10}$) comes in contact with the spring $B^{22}$ and establishes connection therewith. A wire $B^{23}$ serves to connect said spring with each and all of the keys B', $B^2$, and $B^3$ and with the frame B. The connection may be made in the manner illustrated in Fig. 4 with regard to wire $B^{16}$ and key C or in any other suitable manner whatever. The details of wiring are not illustrated in Fig. 1, which is, as before said, a diagrammatic view, intended only to illustrate the essential features of the electrical system, without obscuring them by non-essential details, which every designer arranges according to his own ideas. Above the rear end of each of said keys is a contact-piece $b'$, $b^2$, or $b^3$, with which the key, when depressed, makes connection; but the keys B', $B^2$, and $B^3$ (like the keys $C'$, $C^2$, $C^3$, $C^4$, $C^5$, $C^6$, and $C^7$) do not when in their normal positions make connection with the contact-pieces $b'$, $b^2$, and $b^3$. The frame B, before mentioned, is centered at $B^{10}$, being insulated from the main frame and placed underneath the keys B', $B^2$, and $B^3$ in such a position that none of said keys can be depressed without depressing said frame. Immediately above the rear end of said frame is a contact-piece $b$, with which said frame B, when in its normal position, makes connection; but when the said frame is depressed by the depressing of any of the keys B', $B^2$, or $B^3$ said frame breaks the connection with its contact-piece $b$. With each of the contact-pieces $b$, $b'$, $b^2$, and $b^3$, respectively, one terminal of each of the magnets D, D', $D^2$, and $D^3$, respectively, is connected, which magnets, it will be remembered, control the frames $d$, $d'$, $d^2$, and $d^3$, respectively, and the other terminal of each of said magnets D, D', $D^2$, and $D^3$ is connected with the same conductor $B^{21}$ with which the non-contact-piece-connected terminals of the magnets E, E', $E^2$, $E^3$, $E^4$, $E^5$, $E^6$, and $E^7$ (before mentioned as controlling the frames $e$, $e'$, $e^2$, $e^3$, $e^4$, $e^5$, $e^6$, and $e^7$) are connected.

We are now in a position to explain the actions which take place upon the depressing of a key. It will be convenient first to explain those actions by which a letter is made and afterward to explain the construction and operation of the spacing mechanism by which the carriage is advanced, the releasing mechanism, whereby the type-bars are left free to retreat from the printing-point so soon as they make an impression, although the keys controlling them are still held down, and the retarding mechanism, by which the printing of one of the two letters which are made substantially simultaneously is delayed an instant to avoid possible interference of the types when getting into printing position, and other details of construction; but to explain the actions which take place upon the depressing of a key let us suppose the key B' to be depressed. Said key, like all the other keys, when depressed by the operator in front of its center rises behind the center, thus tilting the frame 15 upwardly and establishing connection between one pole of the battery $B^{10}$ and the spring $B^{22}$, which is connected, it will be remembered, by the wire $B^{23}$ with the keys $B'$, $B^2$, $B^3$, and the frame B. Moreover said key $B'$, like the keys $B^2$ and $B^3$, when depressed depresses the frame B, lying underneath said keys $B'$, $B^2$, and $B^3$, breaking the electrical connection between said frame B and its contact-piece $b$ and magnet D. Lastly, said key $B'$ makes connection with the contact-piece $b'$ corresponding to it. The circuit of the battery $B^{10}$ is now closed through the magnets $D'$ and E. The current flows from the battery $B^{10}$ through the wire $B^{11}$ to the frame 15 and thence to the contact-spring $B^{22}$ and from that through the wire $B^{23}$ to the key $B'$ and thence to the contact-piece $b'$, magnet $D'$, controlling the frame $d'$, wire $B^{21}$, magnet E, controlling the frame $e$, to the contact-spring $c$, frame C, wire $B^{16}$, adjustable contact-screw $B^{15}$, contact-lever $B^{13}$, and wire $B^{12}$, and from thence through the spacing-magnet $H^{51}$ back to the other pole of the battery $B^{10}$. The magnet B becoming thus energized its armature draws down that end of the frame $e$ with which said armature is connected, thereby raising the other end of said frame $e$, to which the levers $f\,f\,f$ are pin-jointed. The magnet $D'$ becoming energized at the same time holds the frame $d'$ firm in its normal position, the magnet-connected arm $d^8$ resting firmly down upon the stop, the type-bar-connected lever $f$ underlying said frame $d'$, being thus afforded a fulcrum by said frame $d'$, tilts on said fulcrum as a center, its type-bar-connected end moving down as the end pin-jointed to the frame $e$ is moved up, and thus through the pull-down wire $h$ said lever $f$ throws up the corresponding type-bar, so that the proper letter is printed. The other levers $f\,f$, pin-jointed to said frame $e$, rise and lift the frames $d^2$ and $d^3$ which overlie them without at all affecting the type-bars with which said levers $f\,f$ are connected.

The magnet $B^{24}$ forms a parallel path to the main circuit hereinbefore traced of much higher resistance than the main circuit. Said magnet has one terminal connected with the wire $B^{12}$ and the other with the spring $B^{22}$, and it serves to break the main circuit by attracting the contact-lever $B^{13}$, before mentioned, (which is made of soft iron and serves as the armature of said magnet $B^{24}$,) away from its normal position of contact with the adjustable contact-screw $B^{15}$, thereby interrupting the main or working circuit, so that the magnets $D'$ and E lose their magnetism, and the various parts controlled by them return to their normal positions. The armature-lever $B^{13}$ is made to stand normally such a distance away from its magnet $B^{24}$ that the circuit is broken about the instant the type-bar strikes to print. By these means the type-bar is left free to retreat from the printing-point the instant that it strikes, without waiting for the keys to be released by the operator, which tends very materially to increase the possible speed of working and has also other important advantages. A contractile spring B urges the contact-lever $B^{13}$ to its normal position of contact with the screw $B^{15}$.

We have seen what takes place when the key $B'$ is depressed by itself alone. If either of the other keys of the B group were depressed by itself alone, similar actions to those above described would be produced; but the battery-circuit would now be closed either through the key $B^2$ or the key $B^3$, whichever was depressed, and thence through the contact-pieces $b^2$ or $b^3$, according to which key was depressed, to the magnet $D^2$ or the magnet $D^3$, so that the frame $d^2$ or the frame $d^3$ would afford a fulcrum to the lever $f$ underlying it, thereby printing the proper letter.

Now let us suppose one of the keys of the C group to be depressed by itself alone—say the key $C'$. This key, like every other key, when depressed in front of its center rises back of its center, thus tilting the frame 15 upwardly and establishing connection between one pole of the battery $B^{10}$ and the spring $B^{22}$, which is connected, it will be remembered, by the wire $B^{23}$ with the keys $B'$ $B^2$ $B^3$ and the frame B. Said key $C'$ also, like the other C group keys $C^2$, $C^3$, $C^4$, $C^5$, $C^6$, and $C^7$, when depressed depresses the frame C, lying underneath the C group keys, breaking the connection between said frame C and its contact-piece $c$ and electromagnet E, and, lastly, said key $C'$ makes connection with the contact-piece $c'$ corresponding to it. The circuit of the battery $B^{10}$ is now closed through the magnets $E'$ and D. The current flows from the battery through the wire $B^{11}$ to the frame 15 and thence to the contact-spring $B^{22}$, and from that through the wire $B^{23}$ to the frame B and thence to the contact-piece $b$ and magnet D, controlling the frame $d$, to the wire $B^{21}$, magnet $E'$, controlling the frame $e'$, and so to the contact-spring $c'$, key $C'$, wire $B^{16}$, adjustable contact-screw $B^{15}$, contact-lever $B^{13}$, and wire $B^{12}$, and thence through the spacing-magnet $H^{51}$ back to the other pole of the battery $B^{10}$. The magnet $E'$ becoming thus energized, its armature draws down upon that end of the frame $e'$ with which said armature is connected, thereby raising the other end of said frame or lever $e'$, to which the levers $f\,f\,f\,f$ are pin-jointed. The magnet D becoming energized at the same time, its armature holds the frame $d$ firm in its normal position, with the arm $d^8$ resting down upon the stop $d^9$. The type-bar-connected lever $f$ underlying said frame $d$, being thus afforded a fulcrum by said frame $d$, tilts on said fulcrum, its type-bar-connected end moving down as the end connected with the frame $e'$ is moved up, and thus through its pull-down wire $h$ throws up the corresponding type-bar, so that the proper letter is printed. The other levers $f\,f\,f$ carried by said frame $e'$ rise and lift the frames $d'$, $d^2$, and $d^3$, which overlie them, without at all affecting the type-bars with which said levers $f\,f$ are connected. At about the instant the type-bar makes its impression the releasing-magnet $B^{24}$, serving for the left-hand keys, breaks the circuit of the magnets D and E' in the manner already described, thus leaving the various parts free to return to their normal positions.

If any of the other keys of the C group, as $C^2$, $C^3$, $C^4$, $C^5$, $C^6$, or $C^7$, be depressed by itself alone, the circuit will be closed through the parts already described up to and including the magnet D, controlling the frame $d$, to the wire $B^{21}$, and thence through the magnet ($E^2$, $E^3$, $E^4$, $E^5$, $E^6$, or $E^7$, as the case may be) corresponding to the key depressed to the contact-spring ($c^2$, $c^3$, $c^4$, $c^5$, $c^6$, or $c^7$, as the case may be) corresponding to the key depressed, and so to the key ($C^2$, $C^3$, $C^4$, $C^5$, $C^6$, or $C^7$, as the case may be) depressed, and thence through the wire $B^{16}$ and the rest of the path before described back to the other pole of the battery $B^{10}$. Each different key of the C group, it will be observed, affects a different one of the magnets $E'$, $E^2$, $E^3$, $E^4$, $E^5$, $E^6$, and $E^7$, thereby operating a different one of the frames $e'$, $e^2$, $e^3$, $e^4$, $e^5$, $e^6$, and $e^7$; and when any key of the C group is depressed alone the circuit is closed through the frame B and the magnet D, which controls the frame $d$, which latter affords a fulcrum to that particular one of the levers $f f f f$, pin-jointed to the frame $e'$, $e^2$, or $e^3$, &c., operated by the key depressed, which underlies said frame $d$, while the other levers $f f f$, pin-jointed to the frame ($e'$, $e^2$, $e^3$, $e^4$, $e^5$, $e^6$, or $e^7$, as the case may be) operated by the C-group key depressed, having no fulcrum in the center, move upon their points of connection with the pull-down wires $h\ h$ as centers and raise the frames $d'$, $d^2$, and $d^3$ overlying them without in any wise affecting the corresponding type-bars. In like manner each of the keys $B'$, $B^2$, and $B^3$ when depressed closes circuit through the magnet $D'$, $D^2$, or $D^3$ which controls the frame $d'$, $d^2$, or $d^3$ corresponding to the key depressed; and when any key of the B group is depressed by itself alone the circuit is closed through the frame C and magnet E, controlling the frame $e$, which coöperates with the particular frame $d'$, $d^2$, or $d^3$ affected by the B-group key depressed to print the proper character. Thus the frame C, it will be seen, serves the function of a C-group key and enables the operator to print letters from the B-group keys, acting singly, without being to the necessity of depressing a C-group key to control a frame in the group of frames $e, e', e^2, e^3, e^4, e^5, e^6,$ and $e^7$; and in like manner the frame B, it will be seen, serves the function of a B-group key and enables the operator to print letters from the keys of the C group, acting singly, without being to the necessity of depressing a B-group key to control a frame in the group of frames $d, d', d^2,$ and $d^3$. Thus, while the printing of any character requires the coacting of two frames, one from the group of frames $d, d', d^2,$ and $d^3$ and the other from the group of frames $e, e', e^2, e^3, e^4, e^5, e^6,$ and $e^7$, I make it possible, it will be seen, to print from each of the keys, acting singly, and thereby, with the arrangement figured in the drawings, I in fact make the ten most frequently occurring letters of the alphabet, being about three-quarters of running letters, by the action of a single key.

Let us now see how letters are made by depressing different combinations of keys. Two keys of the same B group, with the construction figured in the drawings, should not be depressed simultaneously, nor should two keys of the same C group; but any two keys depressed simultaneously and belonging one to the B group and the other to the C group make a different character—a character peculiar to such combination of keys—for when any two keys belonging one to the B group and the other to the C group are depressed simultaneously the circuit is closed through the magnet $D'$, $D^2$, or $D^3$, as the case may be, corresponding to the B-group key depressed, and also through the magnet $E'$, $E^2$, $E^3$, $E^4$, $E^5$, $E^6$, or $E^7$, as the case may be, corresponding to the C-group key depressed. Thus the particular frame $d'$, $d^2$, or $d^3$, as the case may be, corresponding to the particular B-group key depressed is made to coact with the particular frame $e'$, $e^2$, $e^3$, $e^4$, $e^5$, $e^6$, or $e^7$, as the case may be, corresponding to the particular C-group key depressed, and each different combination of two such coacting frames affects, as we have already seen, a different one of the levers $f f f$ and a different one of the type-bars $a\ a$ and thus produces a different character.

The printing mechanism controlled by the left-hand set of keys has now been fully described. It remains to describe that controlled by the right-hand set of keys. In most respects the two are alike, as the drawings show. The type-bars $a'\ a'$, however, controlled by the right-hand keys, strike to the printing-point $A'$, standing one letter-space to the right of the printing-point A, to which the type-bars $a\ a\ a$, controlled by the keys of the left-hand set, strike. (See on this point Fig. 3.) The keys of the left-hand set serve, when two letters are produced simultaneously, to make the first letter of the simultaneously-produced pair of letters, and the keys of the right-hand set serve, when two letters are made simultaneously, to produce or make the second letter of such pair of simultaneously-produced letters. Hence the difference in the location of the two printing-points A and $A'$, serving, respectively, for the left-hand and right-hand sets of keys. The levers $f f f f$, frames $d$, $d'$, $d^2$, and $d^3$, $e$, $e'$, $e^2$, $e^3$, $e^4$, $e^5$, $e^6$, and $e^7$, magnets D, $D'$, $D^2$, and $D^3$, E, $E'$, $E^2$, $E^3$, $E^4$, $E^5$, $E^6$, and $E^7$, with the keys and electrical connections of the right-hand set, are preferably exactly like those of the left-hand set, as the drawings show, subject to certain differences in respect of the electrical connections, which will now be pointed out. The electrical connections of the left-hand set of keys and of the right-hand set of keys might indeed be made in every respect exactly alike; but for reasons which will appear clearly hereinafter it is advantageous to make certain differences between them, which I will now describe.

In constructing a type-writing machine it is advantageous to arrange matters in such a manner that the letters when printed will stand close together in the line, as in ordinary printed matter; but where two letters are printed simultaneously by means of two type-bars striking at the same time to adjacent printing-points it is obvious that without very delicate work the type-bars cannot be made always all of them to strike very close together without sometimes interfering, particularly after the joints have worn a little, as they inevitably do in practical use. It becomes necessary, therefore, to adjust the printing-points such a distance apart as admits of the free working of the bars of both sets without interference under ordinary circumstances and allowing a little for the inevitable wear and loosening of the joints resulting from practical use; but if we arrange matters so that one bar shall strike an instant before the other and retreat from the printing-point a short distance before the other reaches it it becomes possible to print the letters as close together as in ordinary typewriter work, and those imperfections in alinement which it is well known develop in the best machines in the course of time, as they are subjected to practical use, can exist without the bars of the one set striking or becoming entangled with those of the other set when two bars print together. I accomplish this result in the device illustrated in the drawings by making the circuits belonging to one set of keys a little slower acting than those of the other set of keys, so that, the keys of the two sets being depressed simultaneously, the type-bar operating belonging to one set strikes a little before that belonging to the other set, and in rebounding passes, at a little distance from the printing-point, where the bars diverge, the approaching type-bar of the other set, controlled by the slower-acting circuits of the other set of keys. In the drawings the circuits of the left-hand set, already described, are the quick-acting circuits, and the circuits of the right-hand set are the slow-acting circuits, though of course the arrangement might be reversed. The circuits of the right-hand set in the drawings, Fig. 1, are made slower-acting by putting a suitable self-induction 25 of small resistance and consisting of a coil wound about a mass of iron (which should preferably form a closed iron magnetic circuit) in the circuits of the right-hand set. The greater self-induction belonging to the circuits of the right-hand retards the rise of the current on closing circuit, so that the type-bars of the right-hand set begin to move an instant later than those of the left-hand set, and do not reach the printing-point (when the self-induction is properly adjusted to the circuit) until the left-hand-controlled type-bar has retreated a short distance therefrom. The amount of self-induction should be made such that the retreating bar of the left-hand-controlled set and the approaching bar of the right-hand-controlled set will pass each other a short distance—say from half an inch to an inch—below a horizontal line joining their centers, though of course a greater or a smaller retardation may be employed, as desired. In this way all interference between the type-bars as they approach their closely-adjacent printing-points is avoided, without any practical loss in speed and without in any wise complicating the mechanism, and it becomes possible to print the letters as close together as desired.

The different keys and the different combinations of keys may be made to print the different letters and other characters in any order desired. In other words, to each key and to each combination of keys may be assigned such letter or other character as the constructor thinks fit. The principle is simple, the variations endless. Probably no two designers acting independently of each other would assign the various characters to the different keys in exactly the same order; but whatever plan of assignment be pursued the whole arrangement should be in general such that the most frequently-occurring letters will be produced by the keys or combinations of keys most readily depressed, a regard being had to the normal position of the hand with reference to the various keys.

In making any desired arrangement one has only to remember the following simple rules: To produce any given letter by a given B-group key, acting singly, assign such letter to the type-bar connected with the particular lever $f$ that is operated by the conjoint action of the frame $e$ and the frame ($d'$, $d^2$, or $d^3$, as the case may be) controlled by such B-group key. To produce any given letter by a given C-group key, assign such letter to the type-bar connected with the particular lever $f$ that is operated by the conjoint action of the frame $d$ and the frame ($e'$, $e^2$, $e^3$, $e^4$, $e^5$, $e^6$, or $e^7$, as the case may be) controlled by such C-group key. To produce any given letter or other character by a given combination of two keys belonging one to the B-group and the other to the C-group, assign such character to the type-bar connected with the particular lever $f$ that is operated by the conjoint action of the frame ($d'$, $d^2$, or $d^3$, as the case may be) controlled by the B-group key belonging to such combination of keys and the frame ($e'$, $e^2$, $e^3$, $e^4$, $e^5$, $e^6$, or $e^7$, as the case may be) controlled by the C-group key belonging to such combination of keys.

*The spacing mechanism.*—$c^{37}$ is the space-rack, Fig. 5, attached to the carriage, so that it moves with it.

H is the dog-carrying lever, made in two parts adjustable with relation to each other, so as to bring the loose dog and the fast dog nearer together or farther apart, as required.

$H^3$ is the fast dog, and $H^4$ the loose dog.

H$^5$ is a bridle-lever connected with the fast dog and carrying an adjustable stop H$^{33}$.

H$^{62}$ is another lever carrying another adjustable stop H$^{34}$. Flanges H$^{41}$ H$^{41}$, &c., screwed fast to the downward extension of the top plate A$^{41}$, serve to fulcrum the various levers above mentioned, the armature-levers hereinafter described, &c. H$^{42}$ H$^{42}$ are adjustable stops serving to limit the play of these levers.

H$^{30}$ is a lever connected by a link H$^{31}$ with the dog-carrying lever and carrying a stop H$^{32}$, against which the loose dog H$^4$ rests when all the parts occupy their normal positions.

The other mechanical parts will require no description.

H$^{51}$ is the principal spacing-magnet. It is in circuit with the battery B$^{10}$, (see Fig. 1,) so that when the circuit of said battery is closed the current flows through the wire of the magnet H$^{51}$. H$^{52}$ is the armature of said magnet. When the current flows through the magnet H$^{51}$, it attracts the armature H$^{52}$, which thereupon tilts the dog-carrying lever H, raising the fast dog H$^3$ up into the teeth of the rack $c^{37}$ and withdrawing the loose dog H$^4$ from engagement with said rack, so that the loose dog when released from the rack moves under the influence of its contractile spring H$^{36}$ until it is arrested by the stop H$^{34}$, attached to the lever H$^{62}$. The parts are all adjusted in such a manner that this movement of the loose dog is just sufficient to admit of the carriage making two letter-spaces, and when the current is cut off from the magnet H$^{51}$ by the action of the magnet B$^{24}$ upon its armature B$^{13}$, in the manner before described, the armature H$^{52}$ returns to its normal position, the fast dog is withdrawn from engagement with the rack $c^{37}$, the loose dog is again brought into engagement with it, and the carriage, no longer held back by the fast dog, moves on until it is arrested by the loose dog H$^4$ coming in contact with the stop H$^{32}$, so making two letter-spaces. This operation takes place whenever a printing-key or a plurality of printing-keys is depressed. At the end of a word a space is needed between it and the next following word to separate the two. If the word contain an odd number of letters—as three, five, or seven letters—and the letters be printed, as they should be, in pairs, as far as possible, beginning with the first pair of letters in the word and so continuing, pair by pair, the final letter will be printed by itself alone and the two letter-spaces made by the spacing mechanism, in the manner already described, will thus give, without any action upon a space-key, the necessary space at the end of the word; but in writing words containing an even number of letters the operator must make the space at the end. To this end the keyboard is furnished with a space-key G, which serves, when acted upon by the operator, to make connection with the contact-piece $g$, which is connected through the auxiliary space-magnet 51 and the space-enlarging magnet H$^{61}$ with the spring B$^{22}$, and thence through the frame 15 with the other pole of the battery B$^{10}$. The key G is to be acted on by the operator simultaneously with the keys which make the last letters of a word, and when acted on it closes circuit through the space-enlarging magnet H$^{61}$ and the auxiliary space-magnet 51. The action of the auxiliary space-magnet 51 upon the armature H$^{52}$ and related parts is exactly the same as the action of the principal space-magnet H$^{51}$, before described. The space-enlarging magnet H$^{61}$ when energized attracts its armature H$^{62}$, which carries the stop H$^{34}$ down out of the way of the loose dog, so that the loose dog when freed from the rack $c^{37}$ now moves under the influence of its spring H$^{36}$ until it is arrested by the stop H$^{33}$, which stop is so set that the enlarged movement which it permits to the loose dog is sufficient to permit a movement of the carriage of three letter-spaces, when the various parts return to their normal positions. In a word, the space-magnets H$^{51}$ or 51, either or both, with the armature H$^{52}$, operate in the ordinary manner to actuate the spacing-dogs, and the space-enlarging magnet H$^{61}$, with its armature H$^{62}$, operates to enlarge the space by increasing the movement of the loose dog.

H$^{37}$ and H$^{38}$ are contractile returning-springs serving to return the dog-carrying levers and the armatures to their normal positions.

$m$ is the paper-roll or platen; $m'$, the frame of the paper-carriage; $m^2$, the back rod, on which the carriage runs, and $m^3$ the frame hinged to the carriage-frame and to which the space-rack $c^{37}$ is attached.

In respect to the details of construction of the paper-carriage, the arrangement of a shift (not shown in the drawings, being universally understood in the art) whereby the platen or paper-roll is moved from its lower-case position to its upper-case position, or vice versa, the interlinear spacing mechanism, and the ribbon mechanism the machine illustrated in the drawings is intended to follow the details of construction well known to the public in the old "Remington No. 2" machine; but none of these details forms any part of my invention and any suitable plan or construction whatever may be followed for them.

It will be observed from the drawings (see particularly Fig. 4) that I place two types on each bar of each set. I prefer to place on twenty-six of the bars $a\ a$, &c., the twenty-six letters of the alphabet, upper and lower case, and to place frequently-occurring marks of punctuation on the other bars of the set $a\ a$, and I prefer to place on twenty-six of the bars of the set $a'\ a'$, &c., lower-case letters in the lower-case position, and figures, marks of punctuation, and other characters on the same twenty-six bars in the upper-case position. On the other bars of the set $a'\ a'\ a'$ any suitable characters whatever may of course be placed; but I prefer to place on them, both in the upper-case and lower-case positions, the same marks of punctuation that are placed upon the corresponding bars of the other set. By this means the upper-case shift (which, being universally understood in the art, is not illustrated in detail in the drawings) is made to give capitals from the set of bars $a$ $a$ $a$, which print the first letter of two simultaneously-produced letters, and figures and marks of punctuation, &c., from the bars $a'$ $a'$ $a'$, and thus with a moderate number of bars (sixty-two for the device figured in the drawings) all the letters of the alphabet, both upper-case and lower-case, all the figures, all the usual marks of punctuation, and all other necessary marks and characters are readily obtained, and that with a device having two sets of bars adapted to play simultaneously to adjacent printing-points for the printing of consecutive letters simultaneously; but a different arrangement from that which I have described may of course be employed, if desired. Instead of employing four frames $d$, $d'$, $d^2$, and $d^3$ obviously a greater or smaller number may be employed, as desired, and so with the set of frames $e$, $e'$, $e^2$, $e^3$, $e^4$, $e^5$, $e^6$, and $e^7$ a greater or less number of such frames may be employed, as desired. If frames of either set be added, corresponding keys should be added, with controlling-magnets, (B-group keys for frames of the set $d$ $d'$ $d^2$, &c., and C-group keys for frames of the set $e$ $e'$ $e^2$, &c.,) and if the number of frames of either set be diminished the number of keys and controlling-magnets of the corresponding set should be in like manner diminished. The proper number of levers $f f f$, it will be seen on an inspection of the drawings, is equal to the number of frames in the one set multiplied by the number of frames in the other set, one being subtracted from the product.

Instead of connecting the levers $f f$ with the pull-down wires $h$ $h$ at one end and with the frames $e$ $e'$ $e^2$, &c., at the other end, the frames $d$ $d'$ $d^2$ $d^3$, &c., being arranged to act upon said levers intermediate such points of connection the frames $d$, $d'$, $d^2$, and $d^3$ might obviously be arranged to act upon the ends of the levers $f f f$ remote from the frames $e$ $e'$ $e^2$, &c., the pull-down wires $h$ $h$ being connected to such levers $f f f$ intermediate the points of connection of the frames $d$, $d'$, $d^2$, and $d^3$ and the frames $e$ $e'$ $e^2$ $e^3$, &c., and in any form of the device obviously the positions of the frames $d$ $d'$ $d^2$ $d^3$ and the other frames $e$ $e'$ $e^2$ $e^3$ $e^4$ $e^5$ $e^6$ $e^7$ might be interchanged.

A somewhat different arrangement of cooperating frames is illustrated in Fig. 6. $e'$ is one of the frames of the group of frames $e$, $e'$, $e^2$, $e^3$, $e^4$, $e^5$, $e^6$, and $e^7$, already described. It is shaped as shown and is hung by means of bridle-levers I I, which are fulcrumed by means of flanges or hangers I' I', screwed fast to the rail I². A contractile spring I³ holds the frame I normally in contact with a stop I⁴. Another stop I⁵ serves to limit the movement in the opposite direction of said frame under the impulse of the magnet E'. The pull-down wires $h$ $h$ are attached to the levers $f f f$, near their free ends, which lie normally in close proximity to, but out of the path of movement of, the frames $d$, $d'$, $d^2$, and $d^3$. The effect of passing a sufficient current through the coil of the electromagnet E' is to move the frame $e'$, so that it thrusts the free ends of the levers $f f f f$ under the respective frames $d$, $d'$, $d^2$, and $d^3$, respectively, so that whatever one of said frames is moved by the corresponding electromagnet (D, D', D², or D³, as the case may be) will pull down the free end of the lever $f$, thrust under it by the action of the magnet E' and frame $e'$, thereby pulling down the pull-down wire $h$ and throwing up the corresponding type-bar, so that it prints.

It has been said hereinbefore that I prefer to use the various frames $d$, $d'$, $d^2$, and $d^3$, each in its turn, as fixed fulcrums, their magnets serving simply to hold them firm as fulcrums, because with this arrangement of the parts the noise is less than it is when the working frame $d$, $d'$, $d^2$, or $d^3$, as the case may be, moves positively down upon the lever $f$ to be operated at the same time that such lever is lifted at its non-type-bar-connected end by the proper frame $e$ $e'$ $e^2$, &c. If the arrangement which I prefer be used, in which the frames $d$, $d'$, $d^2$, and $d^3$ each when operating serves merely as a fulcrum to the lever $f$, raised by the proper frame $e$ $e'$ $e^2$, &c., the construction of the magnets D, D', D², and D³ should to secure the best results be made somewhat different from that of the magnets E E' E² E³ E⁴, &c. The magnets D, D', D², and D³ should be what we may term "clutch-magnets," capable of exerting a considerable attraction at a short range, while the magnets E E' E², &c., which do the work, should be made to exert a moderate force through a greater space. To this end I employ what we may term a "direct-approach" magnet for the frames $d$, $d'$, $d^2$, and $d^3$ and what we may term "lateral-approach" magnets for the frames $e$ $e'$ $e^2$ $e^3$, &c.

By a "direct-approach" magnet I mean a magnet in which the armature moves toward the core along the lines or along the general trend of the lines of magnetic flux joining the two, and by a "lateral-approach" magnet I mean a magnet in which the armature approaches the core upon lines transverse to the general trend of the lines of magnetic flux joining the two.

A very simple, cheap, and effective direct-approach magnet is illustrated in section in Fig. 3, (marked D.) The magnets D', D², and D³ are like unto it. Said magnet D consists of two cylinders of soft iron, one attached to the bed-plate and serving as a fixed core, the other connected with the frame $d$ and serving as an armature. Both cylinders lie within a non-ferruginous tube, outside which the magnetizing-coil is wound, and each cylinder is furnished outside the coil with an enlarged head, which serves to conduct the lines of magnetic force from the iron to the air. The air-gap between the armature and fixed core, being in the center of the magnetizing-coil, is in a strong magnetic field, where the leakage is a minimum, and the large heads outside the coil reduce the reluctance of the magnetic circuit, which being composed largely of air demagnetizes rapidly. When the adjacent faces of the two soft-iron cylinders stand close together within the magnetizing-coil, a very moderate magneto motive force gives a strong attraction, so that the magnet-connected arm $d^8$ of the frame $d$ is held firmly down upon the stop $d^9$, and the frame made to afford a firm fulcrum to the lever $f$, which is being raised by the proper one of the frames $e$, $e'$, $e^2$, $e^3$, $e^4$, $e^5$, $e^6$, or $e^7$.

A convenient form of lateral-approach magnet is illustrated in Fig. 3, (marked $E^4$.) The magnets E, E', $E^2$, $E^3$, $E^5$, $E^6$, and $E^7$ are like unto it. Instead of having two solid cylinders of similar cross-section facing each other within the bobbin a soft-iron cylinder is used, lying inside the tube for one part of the magnetic system, and another hollow cylinder of soft iron lying outside the tube is used for the other portion of the magnetic system. The magnetizing-coil surrounds both cylinders, and when a current is passed through it the iron cylinder of smaller diameter tends to move inside the larger iron cylinder. By this construction a gradual pull is obtained over a considerable space; but any other suitable form of lateral-approach magnet may be used instead of it. Indeed direct-approach magnets might be used for the frames $e$ $e'$ $e^2$, &c., but they would make more noise and would rack all the joints.

If the frames $d$, $d'$, $d^2$, and $d^3$ were made to operate by moving positively down upon the lever $f$ at the same time that such lever is being raised by the proper one of the frames $e$ $e'$ $e^2$, &c., it would be advantageous to employ suitable lateral-approach magnets for the frames $d$, $d'$, $d^2$, and $d^3$, and in the modified construction illustrated in Fig. 6, in which the principal work is done by the magnets controlling the frames $d$, $d'$, $d^2$, and $d^3$, lateral-approach magnets should be used for the impelling of said frames to secure the best results.

Instead of using a separate magnet for each of the frames $e$, $e'$, $e^2$, $e^3$, $e^4$, $e^5$, $e^6$, and $e^7$ a single key-controlled power device of any suitable sort may be used for all. I have, in fact, made a machine upon this plan, an application for a patent upon which is in course of preparation. The single power mechanism operating all said frames has some advantages. The separate magnets for each frame have other advantages. The combination or subcombination of the one set of frames with the other set is the same and is useful whether said frames be worked by the keys through separate magnets or through a single motor device, or by the keys directly, as before pointed out.

In like manner the frames $d$, $d'$, $d^2$, and $d^3$ may be worked from a single power mechanism instead of by separate magnets, or they might be worked, as before pointed out, by the keys directly.

I show two sets of type-bars and a set of keys and selecting mechanism for each set of type-bars in the drawings. Such a machine is best for rapid writing; but obviously a single set of type-bars with a single set of keys and selecting mechanism to control said bars might be used instead. I in fact contemplate using a single set of type-bars with the necessary keys (a single set) and selecting mechanism in simple machines intended for the use of clergymen, lawyers, journalists, and others who think closely as they write.

It is not necessary that the printing-points of the two sets of type-bars $a\ a\ a$ and $a'\ a'\ a'$ should be separate. A single printing-point might be used for all the bars of both sets by making the set of bars $a'\ a'\ a'$ so much slower acting than the set $a\ a\ a$—for example, by giving a large self-induction to the coil 25—that the bars of the set $a\ a\ a$ will have time to retreat from the printing-point before the bars of the set $a'\ a'\ a'$ reach it when keys of the two sets are depressed simultaneously, the carriage being advanced in such case a letter-space between the time of striking of the first bar and the time of striking of the second. For this latter purpose the normal play of the loose dog $H^4$ should be reduced, so that it will make a single letter-space, and everything should be so adjusted that the circuit of the left-hand-controlled magnets will be broken (by the action of the left-hand releasing-magnet $B^{24}$ upon its armature $B^{13}$) at or before the rise of current in the left-hand-controlled magnets has reached the effective point for the moving of their armatures, and the space-magnet $H^{51}$ should be wound with two coils, one outside the other, one serving for the left-hand-controlled circuits and the other for the right-hand-controlled circuits, said coils being oppositely wound, so that the current in passing through from the right-hand keys will reverse the magnetism produced by the previous current passing through from the left-hand keys; but it is more advantageous to have separate printing-points for the two sets of type-bars, for thereby either ($a$) less rapid movements of the type-bars are required, the bars of the two sets moving at the same time, but one a little in advance of the other, or ($b$) the work can be done more rapidly when two blows are delivered and two letters printed almost at the same instant than when one type-bar has to completely clear the printing-point before the other can come up to print. On the other hand, it is not at all indispensable that the bars of the one set be slower acting than the bars of the other set. The inductance 25 might be omitted and the time-constants of the circuits of the two sets made to be the same. It would not be possible to print the letters quite so close together nor to make so neat a page, but, notwithstanding, the machine would be capable of doing useful work and of writing with great speed.

Instead of making the circuits of the one set slower acting than the circuits of the other set by giving them a greater amount of self-induction the same effect may be produced by arranging matters so that the completing of the circuits of the one set will be postponed a little after the completing of the circuits of the other set when keys of the two sets are depressed simultaneously. Several arrangements for this purpose are described in the patent granted to me on August 25, 1896, for improvements in type-writing machines, type-setting machines, and other similar instruments. A very convenient arrangement is illustrated in the diagrammatic detail view Fig. 1$^a$, which is similar to Fig. 1 and illustrates a modification of the apparatus illustrated in Fig. 1. Connection from the battery $B^{10}$ to the wire $B^{23}$, leading to the B-group keys of the right-hand set, is made from said battery $B^{10}$ by the wire $B^{11}$ to the contact-spring $B^{22}$, as in Fig. 1; but the current instead of flowing, as in Fig. 1, direct from the spring $B^{22}$ to the wire $B^{23}$, serving for the right-hand keys of the B group, goes from the contact-spring $B^{22}$ through a wire $B^{29}$ to a connection-lever $B^{30}$, which normally stands away from the corresponding contact-screw $B^{31}$, which latter is connected by the wire $B^{23}$ with the B-group keys and by another wire with the releasing-magnet $B^{24}$, serving for the right-hand-controlled circuits. The lever $B^{30}$, it will be seen, makes a gap in the working circuit of the right-hand-controlled keys. Said lever $B^{30}$ is normally held away from the contact-screw $B^{31}$, with which it closes circuit, by a contractile spring $B^{32}$, which holds said lever normally against the stop $B^{33}$. A magnet $B^{34}$ forms a parallel path to the main or working circuit of the right-hand-controlled keys, one terminal of said magnet being connected with the contact-spring $B^{22}$ and the other with the wire $B^{12}$. Said magnet becomes magnetized when the keys are depressed and the circuit closed from the battery $B^{10}$ through the frame 15 to the contact-spring $B^{22}$ and through the magnet $B^{34}$ back to the other pole of the battery, and when so magnetized said magnet $B^{34}$ attracts the connection-lever $B^{30}$, which is of soft iron, and serves as its armature, so that said lever makes connection with the contact-screw $B^{31}$, thus leaving the current free to flow from the battery $B^{10}$ through the wire $B^{23}$ to the right-hand keys and the magnets controlled thereby. Some time elapses between the closing of the left-hand-controlled circuits and the circuit of the magnet $B^{34}$, on the one hand, (both of which are closed the instant the frame 15 comes in contact with the spring $B^{22}$,) and the closing, on the other hand, of the right-hand-controlled working circuit through the action of the magnet $B^{34}$ upon the lever $B^{30}$. This interval of time may be made greater or less, as desired, ($a$,) by varying the time-constant of the circuit of the magnet $B^{34}$, or ($b$) by regulating the play of the armature of the magnet $B^{30}$ and the strength of its spring $B^{32}$.

The permutational selecting devices illustrated in the drawings are electromagnetic in the sense that they include electromagnetic motor mechanism, and they are mechanical in the sense that the permutations or combinations result from the coacting of the different frames or levers $e$ $e'$ $e^2$, &c., with the corresponding frames or levers $d$ $d'$ $d^2$ $d^3$ or with the variable connection devices of Figs. 7 and 7$^a$; but instead of using a permutational selecting device partly or chiefly mechanical one wholly electromagnetic may be used in carrying out certain of the broad features of my invention set forth in the statement of claim at the end hereof, a separate magnet, say, being provided for each type-bar and permutational circuit-selecting mechanism of any suitable sort being used to bring the individual type-bars of a set into action, each as desired. One suitable form of permutational circuit-selecting mechanism which might be used for this purpose is described and claimed in a prior application of mine, Serial No. 572,121, filed December 14, 1895, and any other suitable form of permutational character-selecting mechanism whatever may be used in the carrying out of certain important portions of my invention.

"Permutational character-selecting mechanism," or "permutational type-bar-selecting mechanism," or "permutational letter-selecting devices," or "permutational letter-controlling devices" are terms sometimes used in this specification and particularly in the statement of claim at the end hereof. By such and similar expressions I refer generally to such devices, of which many forms are known in the art, and I do not restrict myself in the carrying out of certain of the broader combinations and subcombinations of my invention to the particular forms of permutational character-selecting devices, or permutational letter-selecting devices, or permutational letter-controlling devices, or permutational type-bar selecting or controlling devices illustrated in the drawings.

The various terms "printing characters," "letter-selecting mechanism," "letter-selecting devices," "letter-controlling mechanism," "letter-controlling devices," "a set of ultimate letter-controlling devices," "quick-acting connections," "slow-acting connections," "quick-acting letter-selecting mechanism," "slow-acting letter-selecting mechanism," "quick-acting letter-controlling mechanism," "slow-acting letter-controlling mechanism," and other similar phrases are all used in this specification, and particularly in the statement of claim at the end hereof, in the sense defined or explained in the prior patent to me, No. 566,442, dated August 25, 1896, for improvements in type-writing machines, typesetting machines, and other similar instruments.

So far as certain of the most important combinations and subcombinations of my invention are concerned we might use a separate key and a separate magnet for each type-bar of at least one set, the magnet being connected with the type-bar in any suitable manner—as, for example, that illustrated in the pending application, Serial No. 572,121, filed December 14, 1895—the circuit of the magnet being controlled by the corresponding key, the other set of type-bars being controlled by permutational letter-selecting devices of some suitable sort; or separate keys and magnets might be used for the type-bars of each set, one set being made quick acting and the other set slow acting; but I consider it on the whole better to use permutational character-selecting devices for each set of bars and keys, for thereby the number of keys required to be operated by the hands is reduced to a minimum, a matter of the greatest importance when letters are made two at a time.

Frequently in this specification, and particularly in the statement of claim at the end hereof, I speak of a set of type-bars, a set of printing characters, a set of ultimate letter-controlling devices, &c. By the word "set" in such and similar phrases I do not mean to limit myself to using a whole alphabet of characters, for less than an alphabet will constitute a useful working set.

A permutational character-selecting device of the sort hereinbefore described may be used in other machines than type-writing machines. It may, in fact, be used generally in a wide class of keyboard instruments. Thus, for example, it may be used as well for operating the escapement or releasing devices of the well-known Mergenthaler linotype-machine, by the action of which escapement devices the matrices corresponding to the various letters and other characters are released, so that they fall one by one upon the conveying-belt, by which they are carried to the assembling-block. The levers $f f$ in the drawings or their equivalents may be used to control the matrices of a linotype-machine either (a) by connecting said levers $f f$ (by the rods $h\, h$ or otherwise) to the key-levers of a linotype-machine, by which the escapement devices thereof are controlled, or (b) by connecting said levers $f f$ (through said rods $h\, h$ or otherwise) directly to the escapement devices of a linotype-machine.

Fig. 7 illustrates the levers $f f$ of one of my permutational character-selecting devices connected through the pull-down rods or wires $h\, h$ to operate the levers P P, (answering to the key-levers of the present Mergenthaler linotype-machine,) which, through the other parts shown, operate the escapement devices. The upper part of Fig. 7—to wit, all from and including the levers P P up—illustrating the peculiar linotype parts, is taken from the well-known patent to Mergenthaler, No. 436,532, in which a full description of the various linotype parts may be found and to which patent reference is hereby had and made for such description. The lettering of the parts, however, in my Fig. 7 is different from that used in the patent above mentioned to Mergenthaler. P P are levers (centered at $p\, p$) corresponding to the key-levers of the well-known Mergenthaler linotype-machine and which serve to operate the rods Q Q and the escapement devices R $r'\ r^2$ (whereby the matrices $y\, y$ are released) and the other parts shown in a manner well known to those skilled in the art and fully described in the patent above mentioned, No. 436,532. The shafts or drums $q^7\, q^7$, with the cams $q^6\, q^6$ and the springs $q^2\, q^2$, carrying the little rollers $q^3\, q^3$, may be dispensed with and the pull-downs $h\, h$ connected direct to the escapement-lever R, as illustrated in Fig. 8.

In like manner the permutational character-selecting mechanism illustrated in the drawings may be used in other machines, such as matrix-making and type-setting machines, and in fact in keyboard instruments generally. For all the uses of my permutational character-selecting mechanism, whether applied to the working of type-bars in a type-writing machine or to the working of matrix-controlling escapements in a linotype-machine or to the working of other letter-controlling devices of any sort whatever in any other sort of keyboard instrument, I desire full protection.

In various places in this specification I speak of two sets of type-bars. By the word "type-bar" or "type-bars," as the same is used in this specification, I refer to the things used in type-writing machines and called "type-bars," whether the same be pivoted swinging bars, as used in the Remington and many other machines, or whether they be sliding bars, tilting bars, or thrust-bars, as used in some other type-writing machines; but I use the word always with reference to an element of a type-writing machine or other instrument similar to a type-writing machine in that the writing or printing is done by impressions produced by the bars acting individually and in succession to print or indent or impress a line. The slugs or linotypes produced by a linotype or line-casting machine are sometimes called "type-bars;" but I do not use the word "type-bar" in this specification in any such sense. So, also, the circulating-matrices or type-plates of a linotype or line-casting machine are sometimes called "type-bars;" but I do not use the word "type-bar" in any such sense in this specification. I use the word always with reference to the familiar elements of a type-writing machine (whether such elements be type-levers, sliding type-bars, or thrust type-bars called "type-bars") or to the similar elements of other machines, which, like a type-writing machine, print or indent the successive letters upon the line singly or in pairs in contradistinction to those machines, like the linotype, in which a whole line is cast, impressed, or otherwise produced at once.

"Character-corresponding devices," "letter-controlling mechanism," "letter-controlling devices," and "ultimate letter-controlling devices" are also terms frequently used in the statement of claim at the end hereof. By these terms I refer to and include as well (a) the escapement devices of a linotype-machine (by which the matrix-pieces are released one by one and left free to fall upon the conveying-belt) as (b) the type-bars of a type-writing machine.

In various places in this specification, and particularly in the statement of claim at the end hereof, I speak of producing consecutive letters by simultaneous actions of the operator and of an organization for producing consecutive letters by simultaneous actions of the operator. By "consecutive letters" I mean letters which follow one another in order in a word or on the line of printing, and I do not use the word "consecutive" in the phrases above mentioned and other similar phrases with reference to sequence in time. The consecutive letters produced by simultaneous actions of the operator may, indeed, be successive, in point of time, if the type-bars of the one set be made quick-acting and the type-bars of the other set be made slow-acting, or said consecutive letters may be printed simultaneously, in point of time, if the two sets of bars be made (as it has already been pointed out they may) to act simultaneously; but whether the one construction or the other be followed two letters, one of which follows the other in due order in a word in position on the line of printing, with no letter interposed between them, are consecutive letters, I wish it to be very clearly understood, in the sense in which I use the words "consecutive letters" in the statement of claim at the end hereof, whether those letters be produced simultaneously or successively.

In various places in this specification, and particularly in the statement of claim at the end hereof, I speak of "character-corresponding devices" and of "character-corresponding levers." By a "character-corresponding device" I mean a device corresponding to a character. A type-bar of a type-writing machine is a character-corresponding device, for it corresponds to a character. So in a linotyping-machine the matrix-controlling escapements are character-corresponding devices in the sense in which I use the language in this specification, for each such device corresponds to a character and serves when actuated to cause the matrix upon which the character to which it corresponds is formed to start toward the matrix-assembling mechanism, in consequence of which such character takes its proper place in the line of matrices being assembled and is eventually produced in the slug, and by a "character-corresponding lever," as the language is used in the statement of claim at the end hereof, I mean a lever corresponding to a character. A type-lever such as the levers $a$ or $a'$ in the drawings is a character-corresponding lever. The levers $fff$ in the drawings are also character-corresponding levers. The key-levers of an ordinary Remington type-writer, for example, or the key-levers of a Mergenthaler linotype-machine are character-corresponding levers, for each of them corresponds to a character and serves by its action to cause or assist in causing the production of the character to which it corresponds.

In various places in this specification, and particularly in the statement of claim at the end hereof, I speak of "character-controlling devices" and of "character-controlling levers." By a "character-controlling device" I mean a device serving to control a character, and by a "character-controlling lever" I mean a mean a lever serving to control a character. The levers $ff$, for example, in the drawings are character-controlling devices. The matrix-controlling escapements of a Mergenthaler linotype-machine are character-controlling devices; so are the key-levers of a Remington type-writer or a Mergenthaler linotype-machine. I refer to the foregoing merely as convenient examples and not by way of an exhaustive enumeration of character-controlling devices, and when I speak in the statement of claim of different character-controlling devices serving for different characters, or serving for the production of different characters, I mean that the character produced by one character-controlling device is a different character from the characters produced by the other character-controlling devices of the same set.

In various places in this specification, and particularly in the statement of claim at the end hereof, I speak of "permutational character-selecting mechanism," and sometimes, more shortly, of "permutational selecting mechanism." By "permutational character-selecting mechanism," or by the abbreviated term "permutational selecting mechanism," I mean mechanism in which a few keys control a much larger number of characters, said keys being adapted to act simultaneously in different combinations or permutations to produce different characters. It is difficult to give an exact and rigid definition of such a term, and the foregoing is intended rather as an indication or explanation than as an exact and rigid definition. Permutational character-selecting mechanisms are of various sorts. Among the forms of permutational character-selecting mechanism heretofore proposed I would mention as illustrations those described, for example, in the patents to Munson, No. 246,411, dated August 30, 1881, and No. 352,143, dated November 9, 1886; in the patent to Beyerlen, No. 331,275, dated December 1, 1885; in the patent to me, No. 566,442, dated August 25, 1896, and in the patents to Ganse, No. 331,629, dated December 1, 1885; No. 382,298, dated May 8, 1888; No. 386,776, dated July 24, 1886, and Nos. 390,768 and 390,769, dated October 9, 1888. I refer to the foregoing merely as illustrations of the character of the permutational character-selecting mechanisms heretofore proposed in the art and not as expressing any opinion as to the utility or practicability of any of said proposed mechanisms.

In various places in this specification, and particularly in the statement of claim at the end hereof, I speak of "permutational type-bar-selecting mechanism." By "permutational type-bar-selecting mechanism" I refer to permutational character-selecting mechanism of the sort in which the characters controlled are formed upon or attached to type-bars. "Permutational type-bar-selecting mechanism" is a narrower term than "permutational character-selecting mechanism." The latter term is a broad one, referring as well, for example, among other things, to a permutational character-selecting mechanism operating the matrix-controlling escapements of a linotype-machine as to a permutational character-selecting mechanism operating the type-bars of a type-writing machine.

In various places in this specification, and particularly in the statement of claim at the end hereof, I speak of "controlling elements" or "controlling devices" belonging to or forming parts of the permutational character-selecting or the permutational type-bar-selecting mechanism, and in other places I speak of the "controlled parts" or "controlled elements" of said mechanism. I use the terms "controlling elements" and "controlling devices" synonymously. The terms "controlled elements" and "controlled parts" I also use synonymously. Without attempting an exact and rigid definition, I would say, by way of indication, that the controlling elements of a permutational character-selecting mechanism are those parts which operate by their varying combinations to determine what one of the controlled elements shall be brought into action, and the controlled parts are those parts for the operating of which one by one the controlling elements act.

To illustrate: In the patent to Munson, before mentioned, No. 246,411, dated August 30, 1881, the controlling elements are the plates B C, and the controlled elements are either the circuit-closing pins $m$ or the electromagnets corresponding to and controlled by said pins. So in Munson's other patent, No. 352,143, above mentioned, the plates B C are again the controlling elements. In the patent to Beyerlen, before mentioned, No. 331,275, the slide-bars $e'$, $e^2$, $e^3$, $e^4$, and $e^5$ are the controlling elements and the electromagnets Q Q' are the controlled elements. In the patent to Ganse, No. 331,629, before mentioned, the frames $B'$, $B^2$, $B^3$, $B^4$, $B^5$, and $B^6$ are the controlling elements and the levers F are the controlled parts. In the patent to Ganse, No. 390,768, before mentioned, the notched slides $D'$, $D^2$, $D^3$, $D^4$, $D^5$, and $D^6$ are the controlling elements and the levers $B'$ $B^2$ $B^3$, &c., are the controlled elements. In the device illustrated in Figs. 2 and 3 and in the modification illustrated in Fig. 6 of the accompanying drawings the levers or frames $e$, $e'$, $e^2$, $e^3$, $e^4$, $e^5$, $e^6$, and $e^7$ constitute one set or group of controlling elements and the levers or frames $d$, $d'$, $d^2$, and $d^3$ constitute another group or set of controlling elements, and the levers $f$ $f$, &c., are the controlled elements.

All the forms of permutational character-selecting devices hereinbefore described and referred to fall, it will be found, into two broad classes, to wit: (a) permutational circuit-selecting devices in which the permutation mechanism is essentially electrical and operates by selecting different circuits, and (b) mechanical permutation devices in which the permutations are produced by mechanical as distinguished from electrical mechanism. Of the first sort are the permutational devices of Munson, Patents Nos. 246,411 and 352,143; Beyerlen, No. 331,275, and Cahill, No. 566,442, before referred to, in all of which the permutational actions result in selecting different circuits for the controlling of some one electromagnet out of a multiplicity of electromagnets corresponding to the character required. In the latter class are the various devices of Ganse, before referred to, Patents Nos. 331,629, 382,298, 386,776, 390,768, and 390,769, and the various forms of device illustrated (a) in Figs. 2 and 3 and (b) in Fig. 6 of the accompanying drawings. The forms of permutational character-selecting mechanism illustrated in the present case belong, it should be understood, to the class of mechanical as distinguished from electrical or circuit-selecting permutational mechanisms, for though electromagnets are preferably used, as illustrated in the drawings, to operate the controlling elements $e$, $e'$, $e^2$, $e^3$, $e^4$, $e^5$, $e^6$, $e^7$, $d$, $d'$, $d^2$, and $d^3$ the permutational mechanism is, in an important sense, complete without such electromagnets, for obviously, as before pointed out, said electromagnets might be omitted and the controlling elements $e$, $e'$, $e^2$, $e^3$, $e^4$, $e^5$, $e^6$, $e^7$, $d$, $d'$, $d^2$, and $d^3$ might be operated by the keys direct, a separate key being provided for each controlling element, said keys being, for example, directly connected with the controlling elements to produce the actions thereon which the key-controlled electromagnets produce in the structure illustrated in the drawings.

Among the distinguishing features of the preferred form of permutational selecting mechanism illustrated in the drawings are the following:

(a) The controlling elements form two distinct groups or sets, and every character is formed by the coacting of two controlling elements belonging one to one set and the other to the other set. This, it is thought, is broadly new. By this feature it is never necessary to bring more than two controlling elements into action nor to depress more than two keys to make any character. In former permutational character-selecting mechanisms an indefinite number of controlling elements—often three, and sometimes four, five, or six—are brought into action and a corresponding number of keys depressed in order to produce the character desired; but while I consider this feature of invention to be broadly new with me it is not claimed, broadly, in this application, for in a prior application, Serial No. 572,121, filed December 14, 1895, the same broad feature of invention is illustrated and claimed, but the permutational character-selecting mechanism illustrated and described in said application of December 14, 1895, Serial No. 572,121, is a circuit-selecting mechanism and it has a separate electromagnet for each different type-bar. The permutational actions are effected entirely by means essentially electrical by sending the electric current through different circuits, as required, and the controlling elements of the permutational selecting mechanism illustrated in the before-mentioned application, Serial No. 572,121, are circuit-closing devices. They are essentially electrical rather than mechanical elements; but the permutational character-selecting mechanism described in this present application, although it has electromagnets serving as motor devices to actuate its controlling elements, (which controlling elements might, however, as before pointed out, be actuated directly by the keys,) is distinctly a mechanical permutational mechanism as distinguished from an electrical or circuit-selecting permutational mechanism in the sense already explained. Its permutational actions are effected directly by the action of mechanical controlling elements—for example, the frames or levers $e$ $e'$ $e^2$ $d$ $d'$ $d^2$, &c.—whether these controlling elements be actuated by electromagnets or by some other form of motor device or by the keys directly, and the controlling elements or controlling devices, as $e$ $e'$ $e^2$, &c., $d$ $d'$ $d^2$, &c., are distinctly mechanical controlling elements or mechanical controlling devices as distinguished from the electrical controlling elements belonging to the permutational character-selecting mechanism described in the before-mentioned application, Serial No. 572, 121, which act primarily by selecting different circuits. When, therefore, I speak in the statement of claim at the end hereof of "mechanical controlling elements," or "mechanical controlling devices," or "mechanical group-controlling elements," or "mechanical group-controlling devices," or use other similar language, I use the adjective "mechanical" in such phrases as limiting the expression to devices that operate by means and in modes mechanical as distinguished from devices that operate by selecting electrical circuits, and the feature of invention referred to at the beginning of this paragraph—to wit, the controlling elements forming two distinct sets or groups, the different characters being formed each by the coacting of two controlling elements belonging one to one set and the other to the other set—is to the best of my knowledge broadly new with me in this present application in a mechanical permutational device as distinguished from a circuit-selecting permutational device, and in the latter aspect it is believed to be broadly new with me in the before-mentioned application, Serial No. 572, 121, filed December 14, 1895, in which application, as before said, it is described and generically claimed.

(b) The controlling elements serve by their movement to communicate movement to the character-corresponding devices, and they act simultaneously both to select the type-bar to be moved and to impel the same from its normal position to the printing-center. In prior mechanical (as distinguished from circuit-selecting) permutational devices several actions precede the moving of the type-bar. Thus in some the controlling elements must first be positioned. When this is done, another part or sets of parts acts, and when that action is completed, and not before, the type-bar is set in motion. By arranging the device in such manner that the permutational selecting mechanism acts simultaneously both to select the type-bar to be impelled and to impel the same from its normal position to the printing-center I adapt the permutational character-selecting mechanism to the requirements of ordinary work by enabling it to act with the requisite rapidity. In the drawings (see, for example, Figs. 2 and 3) the selecting of a character depends upon what one of the frames $d$, $d'$, $d^2$, and $d^3$ acts and upon what one of the frames or levers $e$ $e'$, $e^2$, $e^3$, $e^4$, $e^5$, $e^6$, or $e^7$ acts at the same time. So soon as any two frames belonging one to the set $d$ $d'$ $d^2$ $d^3$ and the other to the set $e$ $e'$ $e^2$ $e^3$ $e^4$ $e^5$ $e^6$ $e^7$ act the letter is selected, and the type-bar, it will be observed, moves simultaneously with this selecting action, and where I speak, in the statement of claim, of permutational selecting or permutational character-selecting mechanism having controlling elements acting simultaneously both to select the type-bar to be moved and to impel the same from its normal position to the printing-center I use the adverb "simultaneously" to refer to simultaneousness existing between the selecting action and the type-bar-impelling action and not with reference to simultaneousness of action of a plurality of the controlling elements.

(c) Another important feature of the mechanism illustrated in the drawings is that motor mechanism is employed to act upon the controlling elements of the permutational character-selecting mechanism and that said motor mechanism acts through said controlling elements upon the type-bars or other parts to be moved. The motor mechanism and the other parts of the permutational character-selecting mechanism are alike simple, and by the use of the motor mechanism the touch is made as light as possible, the speed of the machine is materially increased, and other important advantages are gained.

In the drawings I show, in illustration of motor mechanism, a plurality of electromagnets, each controlling a plurality of type-bars. The motor mechanism illustrated is simple and efficacious; but other motor devices than electromagnets might be used instead of said electromagnets. Moreover, whether the form of motor device employed be electromagnetic or be not electromagnetic it is not at all indispensable to use a separate motor device, for example, for each of the frames $e$ $e'$ $e^2$ $e^3$ $e^4$ $e^5$ $e^6$ $e^7$, for I have in fact found it possible to use one motor device for the whole set. I have constructed a machine on that principle, an application for a patent on which is in course of preparation.

(d) Another important feature of the permutational character-selecting mechanism illustrated in the drawings consists in using the same motor device to actuate a plurality of type-bars or other character-corresponding devices, the keys serving only to connect the proper character-corresponding device with the motor. By this feature the keys, as they do not at all impel the type-bar or other character-corresponding device, but merely serve to connect it with the motor device and to bring the motor device into action for the impelling of it, have a very small depression or dip and a very light touch, which greatly increases the speed with which the machine can be operated and the amount of work that can be turned out with it. The keys, it will be observed, serve only to control the action of the motor mechanism upon the part to be moved, and the instant the keys are depressed the motor mechanism does the work.

The means of connecting the different type-bars or other character-corresponding devices actuated by the motor mechanism with the motor mechanism illustrated in the drawings (see Figs. 2, 3, and 6) are as good as any that I know; but I do not at all limit myself to them, for obviously many modifications may be made without at all departing from certain of the essentials of my invention set forth in the statement of claim at the end hereof.

(e) Another important feature of the various forms of permutational selecting mechanism illustrated in the accompanying drawings, resulting, perhaps, in part from what has been already described, is (a) the groups into which the character-corresponding devices naturally resolve themselves and (b) the group-controlling devices, each controlling a group of the character-corresponding devices. In the device of Figs. 2 and 3, with the frames $d$, $d'$, $d^2$, and $d^3$ arranged to operate in the preferred manner hereinbefore fully pointed out, the frames $e$, $e'$, $e^2$, $e^3$, $e^4$, $e^5$, $e^6$, and $e^7$ (and the same is equally true of the corresponding electromagnets E, E', $E^2$, $E^3$, $E^4$, $E^5$, $E^6$, and $E^7$) each controls a group of the character-corresponding levers $f$ $f$, by which the type-bars of a type-writing machine or the matrix-controlling escapements of a linotype-machine, as before explained, are operated. In the device of Fig. 6 each of the frames $e'$, $e^2$, $e^3$, $e^4$, $e^5$, $e^6$, and $e^7$ (and the same is true of the electromagnets E', $E^2$, $E^3$, $E^4$, $E^5$, $E^6$, and $E^7$) controls a group of four of the levers $f f f f$, while the lever $e$ controls a group of three of said levers $f f$. Viewing said device in another aspect, each of the frames $d$ $d'$ $d^2$ $d^3$ (and the same is true of the magnets D, D', $D^2$, and $D^3$) controls a group of the levers $f f$, serving to give movement to whatever one of said levers may be thrust in its path of movement by the action of the frames $e$, $e'$, $e^2$, $e^3$, $e^4$, $e^5$, $e^6$, and $e^7$. The levers $e$, $e'$, $e^2$, $e^3$, $e^4$, $e^5$, $e^6$, and $e^7$ (and the same is equally true of the electromagnets E, E', $E^2$, $E^3$, $E^4$, $E^5$, $E^6$, and $E^7$) are group-controlling devices, since each of them controls a group of characters and of character-corresponding levers, and the frames $d$ $d'$ $d^2$ $d^3$ are also group-controlling devices. So are the electromagnets D, D', $D^2$, and $D^3$; but I do not limit or restrict the term "group-controlling device" to the particular kind or construction of group-controlling devices illustrated in the drawings, for obviously other forms of group-controlling devices might be used instead of those shown in the drawings; but the group-controlling devices of this present application are mechanical group-controlling devices, as distinguished from the electrical group-controlling devices illustrated in the before-mentioned prior application, Serial No. 572,121, filed December 14, 1895, for the group-controlling devices of the present application (whether we consider the frames $e$ $e'$ $e^2$ $e^{2c}$ $d$ $d'$, &c., or the electromagnets E E' $E^2$ D D', &c., as group-controlling devices) act mechanically to give movement to the parts upon which they act, where the corresponding controlling elements—the circuit-closing devices—of the permutational character-selecting mechanism illustrated in the before-mentioned application, Serial No. 572,121, act primarily by making or breaking electrical connection—an action purely electrical—and it is in the sense just explained that I use the adjective "mechanical" to limit such expressions as "group-controlling devices" in the statement of claim at the end hereof.

(f) Another important feature of the permutational character-selecting mechanism illustrated in the drawings consists in employing in one set of the controlling devices or in both sets of the controlling devices, as in the mechanism of Figs. 1, 2, and 3 and in the mechanism of Fig. 6, a controlling element, normally adapted to act when one of the controlling elements of the other set acts and no other controlling element of its own set acts. By this feature of construction (see, for example, the preferred device illustrated in Figs. 1, 2, and 3) it is made possible to produce letters from the keys $C'$, $C^2$, $C^3$, $C^4$, $C^5$, $C^6$, and $C^7$ without depressing any B-group key at the same time, because the frame $d$ is adapted to coact with the controlling elements $e'$ $e^2$ $e^3$, &c., of the other set so long as no one of the frames $d'$ $d^2$ $d^3$ coacts, and in like manner it is made possible to produce letters from the keys $B'$ $B^2$ $B^3$ without depressing any C-group key at the same time, because the frame or lever $e$ is adapted to coact with any one of the frames $d'$ $d^2$ $d^3$ so long as no one of the frames or levers $e'$ $e^2 e^3 e^4 e^5 e^6 e^7$ is brought into action, and the same is true of the device illustrated in Fig. 6, and everything is arranged in such manner, it will be seen, in the different forms of device illustrated in the drawings that the normally-coacting element is caused not to coact when any other controlling element of the same set or group is brought into action. By this feature of my invention I make it possible to produce with the keyboard illustrated in the drawings (having three B-group keys and seven C-group keys) the ten most frequently-occurring letters of the alphabet (being about three-fourths of letters as they come in actual use) with the depressing of a single finger, where otherwise it would be necessary to depress two keys for every letter.

In various places in this specification, and particularly in the statement of claim at the end hereof, I speak of "retreating fulcrums." The frames $d$, $d'$, $d^2$, and $d^3$, it has already been fully pointed out, may be used in the preferred device illustrated in Figs. 2 and 3 in either of two ways, to wit: (a) Said frames may lie normally remote from or up off of the levers $fff$, said frames $d$ $d'$ $d^2$ $d^3$ moving positively down, each as required, upon the levers $ff$ at the same time that said levers are raised at the back by the action of the frames $e$ $e'$ $e^2$, &c.; or (b) said frames $d$, $d'$, $d^2$, and $d^3$ may lie normally in close proximity to said levers $fff$, the mode of operation being that one of said frames is held when one of the frames $e$ $e'$ $e^2$, &c., acts, while the other three of said frames $d$ $d'$ $d^2$ $d^3$ are not held and lift lightly with the levers $fff$ without disturbing the type-bars or other parts with which they are connected by the wires $h$ $h$. In the latter mode of working the frames $d$ $d'$ $d^2$ $d^3$ constitute, it will be seen, what we may, for lack of a better name, call "retreating fulcrums," and the magnets $D$ $D'$ $D^2$ $D^3$ are locking devices whereby said fulcrums are locked, each as required; but I wish it to be understood that the frames $d$ $d'$ $d^2$ $d^3$ are only one form of retreating fulcrum that may be used and the electromagnets $D$ $D'$ $D^2$ $D^3$ are only one form of locking device that may be used, for, in fact, various other forms or arrangements of retreating fulcrums than the frames aforesaid and various other locking devices than the electromagnets aforesaid might be used in place of them. I have, in fact, contrived several other forms of retreating-fulcrum device and several other forms of locking device, but have contented myself with describing and illustrating in this specification and the accompanying drawings the one form of each which I consider on the whole most convenient; but I do not at all limit myself, it will be understood, either to the particular form of retreating fulcrum or to the particular form of locking device shown.

In various places in this specification, particularly in the statement of claim at the end hereof, I use the numeral "one" in an inclusive and not in an exclusive sense. Thus, for example, in some of the paragraphs of claim I speak of two sets of type-bars and of "type-bar-controlling mechanisms for each of the sets of type-bars above mentioned, one of the type-bar-controlling mechanisms above mentioned being a permutational type-bar-selecting device," &c. I mean here that one at least of the type-bar-controlling mechanisms shall be a permutational type-bar-selecting device, and I do not mean at all to imply that the other type-bar-controlling mechanism shall not be a permutational type-bar-selecting device. By such language I mean to imply nothing as to what the other type-bar-controlling mechanism shall be, for in fact while I prefer that it shall be a permutational type-bar-selecting device also it may be something else—the key mechanism of an ordinary Remington type-writer, for example. So in some of the other paragraphs of claim I speak of "keys and controlling elements," or "keys and group-controlling devices," &c., the keys each corresponding to and serving to control one of said controlling elements or one of said group-controlling devices, &c. I mean here that each such key shall correspond to and control at least one controlling element or group-controlling device, &c. By the preferred construction, indeed, each key corresponds to and peculiarly controls only one controlling element or group-controlling device, but in fact it would be possible for each key to correspond to and control not one only, but two or three or more controlling elements or group-controlling devices. Now obviously any key which corresponds to and controls two similar things corresponds to and controls each of those things and therefore corresponds to and controls one of them, and I use the word "one" in all such cases and generally in the claims in an inclusive and not in an exclusive sense, according to the common practice of the draftsmen of the claims of patents.

I use the words "linotype-machine" and "linotyping-machine" synonymously in this specification and in the statement of claim at the end hereof.

I do not claim in this application any part of the subject-matter of my prior application, Serial No. 572,121, filed December 14, 1895.

In various places in this specification and particularly in the statement of claim at the end hereof I speak of "type-writing machines, type-setting machines, and other similar instruments," or of "type-writing machines, linotyping-machines, type-setting machines, and other similar instruments", the two forms of expression being used synonymously. By this language I refer to the whole genus or family of machines employed to produce printed matter by the successive production of the several words and characters as substitutes for writing by hand and also to the whole genus or family of machines employed to set type, or to produce type, or to make up type as substitutes for setting up the types by hand, and in particular I refer by the language above quoted as well (a) to those machines which are technically called "matrix-making machines," and (b) to those machines which are technically termed "linotype-machines," and (c) to those machines which are technically termed "monotype-machines" and "type-bar machines," as to those which actually make up the whole form of type out of foundry type set together, and for all the uses of my invention, whether applied to type-writing machines or type-setting machines of one kind or of another, I desire full protection.

What I claim as my invention, and desire to secure by Letters Patent, is—

1. In a type-writing machine, or other similar instrument, an organization for producing consecutive letters by simultaneous actions of the operator, said organization including (a) two sets of type-bars; (b) two sets of keys; (c) quick-acting connections between the one set of keys and the set of type-bars controlled thereby; and (d) slow-acting connections between the other set of keys and the set of type-bars controlled by such keys; the quick-acting connections and the slow-acting connections aforesaid having such differing rapidities of action that when keys of the two sets are depressed simultaneously, the type-bars controlled respectively by them print in rapid succession.

2. In a type-writing machine, or other similar instrument, an organization for producing consecutive letters by simultaneous actions of the operator, said organization including (a) two sets of type-bars; the bars of each set striking to a printing-point common to the bars of such set, the printing-points of the two sets of bars being adjacent to each other; (b) two sets of keys; (c) quick-acting connections between the one set of keys and the set of type-bars controlled thereby; and (d) slow-acting connections between the other set of keys and the set of type-bars controlled by such keys; the quick-acting connections and the slow-acting connections aforesaid having such differing rapidities of action that when keys of the two sets are depressed simultaneously, the type-bars controlled respectively by them print in rapid succession.

3. In a type-writing machine, or other similar instrument, an organization for producing consecutive letters by simultaneous actions of the operator, said organization including (a) two sets of type-bars; (b) two sets of keys; (c) quick-acting connections between the keys of one set and the type-bars controlled by such keys; said quick-acting connections including suitable motor mechanism controlled by said keys and serving to impel the type-bars controlled by such keys; and (d) slow-acting connections between the keys of the other set and the type-bars controlled by such keys; said slow-acting connections including suitable motor mechanism controlled by said keys and serving to impel the type-bars controlled by such keys; the quick-acting connections and the slow-acting connections aforesaid having such differing rapidities of action that when keys of the two sets are depressed simultaneously, the type-bars brought into action respectively by them print in rapid succession.

4. In a type-writing machine, or other similar instrument, an organization for producing consecutive letters by simultaneous actions of the operator, said organization including (a) two sets of type-bars; the bars of each set striking to a printing-point common to the bars of such set, the printing-points of the two sets of bars being adjacent to each other; (b) two sets of keys; (c) quick-acting connections between the keys of one set and the type-bars controlled by such keys; said quick-acting connections including suitable motor mechanism controlled by said keys and serving to impel the type-bars controlled by such keys; and (d) slow-acting connections between the keys of the other set and the type-bars controlled by such keys; said slow-acting connections including suitable motor mechanism controlled by said keys and serving to impel the type-bars controlled by such keys; the quick-acting connections and the slow-acting connections aforesaid having such differing rapidities of action that when keys of the two sets are depressed simultaneously, the type-bars brought into action respectively by them print in rapid succession.

5. In a type-writing machine, or other similar instrument, an organization for producing consecutive letters by simultaneous actions of the operator, said organization including, in combination, two sets of type-bars; a quick-acting type-bar-controlling mechanism, operating upon the type-bars of one of the sets before mentioned, and serving to bring the bars of such set into action individually; and a slow-acting type-bar-controlling mechanism, operating upon the type-bars of the other set, and serving to bring the bars of such set into action individually; one of said type-bar-controlling mechanisms being a permutational type-bar-selecting device, having a number of keys less than the number of type-bars controlled by it, said permutational type-bar-selecting device being constructed and arranged in such a manner that its small number of keys, operating in various permutations or combinations, serves to bring into action the various type-bars controlled by it, each as required.

6. In a type-writing machine or other similar instrument, an organization for producing consecutive letters by simultaneous actions of the operator, said organization including, in combination, two sets of type-bars; a quick-acting type-bar-controlling mechanism, operating upon the type-bars of one of the sets before mentioned, and serving to bring the bars of such set into action individually; and a slow-acting type-bar-controlling mechanism, operating upon the type-bars of the other set, and serving to bring the bars of such set into action individually; each of said type-bar-controlling mechanisms being a permutational type-bar-selecting device, having a number of keys less than the number of type-bars controlled by it, said permutational type-bar-selecting device being constructed and arranged in such a manner that its small number of keys, operating in various permutations or combinations, serves to bring into action the various type-bars controlled by it, each as required.

7. In a type-writing machine or other similar instrument, an organization for producing consecutive letters by simultaneous actions of the operator, said organization including, in combination, two sets of type-bars; a quick-acting type-bar-controlling mechanism, operating upon the type-bars of one of the sets before mentioned, and serving to bring the bars of such set into action individually; and a slow-acting type-bar-controlling mechanism, operating upon the type-bars of the other set, and serving to bring the bars of such set into action individually; one of said type-bar-controlling mechanisms being a permutational type-bar-selecting device, having a number of keys less than the number of type-bars controlled by it; said permutational type-bar-selecting device being constructed and arranged in such a manner that its small number of keys, operating in various permutations or combinations, serves to bring the various type-bars controlled by it into action individually; said permutational type-bar-selecting device including a motor device acting to impel a plurality of the type-bars aforesaid, each as required.

8. In a type-writing machine or other similar instrument, an organization for producing consecutive letters by simultaneous actions of the operator, said organization including, in combination, two sets of type-bars; a quick-acting type-bar-controlling mechanism, operating upon the type-bars of one of the sets before mentioned, and serving to bring the bars of such set into action individually; and a slow-acting type-bar-controlling mechanism, operating upon the type-bars of the other set, and serving to bring the bars of such set into action individually; one of said type-bar-controlling mechanisms being a permutational type-bar-selecting device, having a number of keys less than the number of type-bars controlled by it; said permutational type-bar-selecting device being constructed and arranged in such a manner that its small number of keys, operating in various permutations or combinations, serves to bring the various type-bars controlled by it into action individually; said permutational type-bar-selecting device including (a) motor mechanism whereby the type-bars aforesaid are impelled, each as required; said type-bars being normally disconnected from said motor mechanism, and (b) means whereby said type-bars are connected, each as required, with the motor mechanism aforesaid.

9. In a type-writing machine or other similar instrument, an organization for producing consecutive letters by simultaneous actions of the operator, said organization including, in combination, two sets of type-bars; a quick-acting type-bar-controlling mechanism, operating upon the type-bars of one of the sets before mentioned and serving to bring the bars of such set into action individually; and a slow-acting type-bar-controlling mechanism, operating upon the type-bars of the other set, and serving to bring the bars of such set into action individually; one of said type-bar-controlling mechanisms being a permutational type-bar-selecting device; said permutational selecting device including controlling elements, by the coacting of which the different type-bars aforesaid are brought into action, each as required; and motor mechanism serving to actuate a plurality of the controlling elements aforesaid.

10. In a type-writing machine or other similar instrument, an organization for producing consecutive letters by simultaneous actions of the operator, said organization including, in combination, two sets of type-bars; a quick-acting type-bar-controlling mechanism, operating upon the type-bars of one of the sets before mentioned, and serving to bring the bars of such set into action individually, and a slow-acting type-bar-controlling mechanism, operating upon the type-bars of the other set, and serving to bring the bars of such set into action individually; one of said type-bar-controlling mechanisms being a permutational type-bar-selecting device, having controlling elements fewer in number than the type-bars operated thereby, and motor mechanism, acting through controlling elements of the permutational selecting mechanism aforesaid, upon the type-bars above mentioned.

11. In a type-writing machine, or other similar instrument, and in combination, two sets of type-bars; a quick-acting electromagnetic type-bar-controlling mechanism, operating one set of bars, and serving for the production of letters individually; and a slow-acting electromagnetic type-bar-controlling mechanism, operating the other set of type-bars, and likewise serving for the production of letters individually; one of the type-bar-controlling mechanisms above mentioned being an electromagnetic permutational type-bar-selecting device, having a number of keys less than the number of type-bars controlled by it; said permutational type-bar-selecting device being constructed and arranged in such a manner that its small number of keys, operating in various combinations or permutations, serves to bring the various type-bars controlled by it into action individually.

12. In a type-writing machine, or other similar instrument, and in combination, two sets of type-bars, the bars of each set being arranged in such a manner that they strike to a printing-point common to the bars of such set, the printing-points of the two sets of bars being adjacent to each other; a quick-acting electromagnetic type-bar-controlling mechanism, operating one of the sets of type-bars before mentioned and serving for the production of letters individually; and a slow-acting electromagnetic type-bar-controlling mechanism, operating the other set of type-bars before mentioned and likewise serving for the production of letters individually; one of the type-bar-controlling mechanisms above mentioned being a permutational electromagnetic type-bar-selecting device, having a number of keys less than the number of type-bars controlled by them; said permutational type-bar-selecting device being constructed and arranged in such a manner that its small number of keys, operating in various combinations or permutations, serves to bring the various type-bars controlled by it into action individually.

13. In a type-writing machine or other similar instrument, an organization for producing consecutive letters by simultaneous actions of the operator, said organization including, in combination, two sets of type-bars, the bars of each set being arranged in such a manner that they strike to a printing-point common to the bars of such set, the printing-points of the two sets of bars being adjacent to each other; and type-bar-controlling mechanisms for each of the sets of type-bars above mentioned; one of the type-bar-controlling mechanisms above mentioned being a permutational type-bar-selecting device, having a number of keys less than the number of type-bars controlled by it; said permutational type-bar-selecting device being constructed and arranged in such a manner that its small number of keys, operating in various permutations or combinations, serve to bring the various type-bars controlled by it into action individually; said permutational type-bar-selecting device including (a) a motor device acting to impel a plurality of the type-bars aforesaid, each as required; a plurality of the type-bars impelled by said motor device being normally disconnected from said motor device; and (b) means whereby said type-bars are connected, each as required, with the motor device aforesaid.

14. In a type-writing machine or other similar instrument, an organization for producing consecutive letters by simultaneous actions of the operator, said organization including, in combination, two sets of type-bars, the bars of each set being arranged in such a manner that they strike to a printing-point common to the bars of such set, the printing-points of the two sets of bars being adjacent to each other; and type-bar-controlling mechanisms for each of the sets of type-bars above mentioned; each of the type-bar-controlling mechanisms above mentioned being a permutational type-bar-selecting device, having a number of keys less than the number of type-bars controlled by it; said permutational type-bar-selecting device being constructed and arranged in such a manner that its small number of keys, operating in various permutations or combinations, serves to bring the various type-bars controlled by it into action individually; said permutational type-bar-selecting device including (a) a motor device acting to impel a plurality of the type-bars aforesaid, each as required; a plurality of the type-bars impelled by said motor device being normally disconnected from said motor device; and (b) means whereby said type-bars are connected, each as required, with the motor device aforesaid.

15. In a type-writing machine, linotyping-machine, type-setting machine, or other similar instrument, and in combination therewith suitable character-corresponding devices, permutational selecting mechanism, having (a) a plurality of controlling elements, acting in different combinations for the operating of the different character-corresponding devices aforesaid; (b) keys; and (c) motor mechanism, controlled by said keys, and acting upon controlling elements of the permutational selecting mechanism aforesaid to bring said controlling elements into operation.

16. In a type-writing machine, linotyping-machine, type-setting machine, or other similar instrument, and in combination therewith suitable character-corresponding devices, permutational selecting mechanism, having (a) controlling elements fewer in number than the character-corresponding devices operated thereby; (b) keys; and (c) motor mechanism, controlled by said keys and acting through controlling elements of the permutational selecting mechanism before mentioned, upon the character-corresponding devices aforesaid.

17. In a type-writing machine, or other similar instrument, and in combination therein with the character-corresponding devices, permutational character-selecting mechanism, having controlling elements fewer in number than the character-corresponding devices controlled thereby, said controlling elements serving in different combinations to bring the controlled elements into action, each as required; a plurality of the controlling elements aforesaid acting, each when moved, to communicate movement to the proper character-corresponding device.

18. In a type-writing machine, or other similar instrument, and in combination therein with the character-corresponding devices, permutational character-selecting mechanism, having controlling elements fewer in number than the character-corresponding devices controlled thereby, said controlling elements serving, in different combinations, to bring the controlled elements into action, each as required, and motor mechanism, acting to give movement to a plurality of the controlling elements before mentioned; said controlling elements serving, when thus moved by the motor mechanism, to communicate movement to the proper character-corresponding device.

19. In a type-writing machine, linotyping-machine, type-setting machine, or other similar instrument, and in combination therein with suitable character-corresponding devices, permutational selecting mechanism, having keys fewer in number than the character-corresponding devices controlled thereby; and motor mechanism, whereby the character-corresponding devices aforesaid are actuated, each as required, said character-corresponding devices being normally disconnected from said motor mechanism; means whereby said character-corresponding devices are connected, each as required, with the motor mechanism aforesaid; said motor mechanism being brought into action by the key mechanism before mentioned, and operating thereupon independently of said key mechanism to actuate the character-corresponding device proper to the key or combination of keys depressed.

20. In a type-writing machine, type-setting machine, linotyping-machine, or other similar instrument, and in combination therein with suitable character-corresponding devices, permutational selecting mechanism, including controlled elements; controlling elements, less in number than said controlled elements, keys; key-controlled motor mechanism, whereby the character-corresponding devices aforesaid are actuated, each as required; said character-corresponding devices being normally disconnected from said motor mechanism; means whereby said character-corresponding devices are connected, each as required, with the motor mechanism aforesaid; and means whereby the keys are arrested; the keys serving, when depressed, to bring the motor mechanism into action; said motor mechanism acting, after the keys have been depressed and arrested, to impel the character-corresponding devices independently of the keys.

21. In a type-writing machine, linotyping-machine, type-setting machine, or other similar instrument, and in combination, character-corresponding devices; permutational character-selecting mechanism, serving to actuate the character-corresponding devices aforesaid; said permutational character-selecting mechanism including a plurality of electromagnets, each serving to control a plurality of the character-corresponding devices aforesaid.

22. In a type-writing machine, linotyping-machine, type-setting machine, or other similar instrument, and in combination, character-corresponding devices; permutational character-selecting mechanism, serving to actuate the character-corresponding devices aforesaid; said permutational character-selecting mechanism including a plurality of electromagnets, each serving to control a different group of the character-corresponding devices aforesaid; a plurality of the character-corresponding devices in each group being normally disconnected from the electromagnet controlling such group; and keys, operating to connect said character-corresponding devices, each as required, with the corresponding electromagnet.

23. In a type-writing machine, linotyping-machine, type-setting machine, or other similar instrument, and in combination, character-corresponding devices; different-character-corresponding devices, serving for the production of different characters; permutational character-selecting mechanism, serving to actuate the character-corresponding devices aforesaid; said permutational character-selecting mechanism including a plurality of electromagnets, each serving to actuate a plurality of the character-corresponding devices aforesaid; and keys controlling the electromagnets aforesaid.

24. In a type-writing machine, linotyping-machine, type-setting machine, or other similar instrument, and in combination, character-corresponding devices; different-character-corresponding devices, serving for the production of different characters; permutational character-selecting mechanism, serving to actuate the character-corresponding devices aforesaid; said permutational character-selecting mechanism including a plurality of electromagnets, each serving to actuate a different group of the character-corresponding devices aforesaid; a plurality of the character-corresponding devices in each group being normally disconnected from the electromagnet controlling such group; keys controlling said electromagnets; and other keys, operating to connect different-character-corresponding devices of a group, each as required, with the corresponding electromagnet.

25. In a type-writing machine or other similar instrument, and in combination therein with the type-bars, permutational selecting mechanism, having controlling elements, fewer in number than the type-bars controlled by them; motor mechanism, acting upon controlling elements of the permutational selecting mechanism aforesaid, and keys, controlling the action of said motor mechanism upon the permutational selecting mechanism to bring said controlling elements into operation.

26. In a type-writing machine or other similar instrument, and in combination therein with the type-bars, permutational selecting mechanism, having controlling elements, fewer in number than the type-bars controlled by them; motor mechanism, acting through controlling elements of the permutational selecting mechanism aforesaid upon the type-bars aforesaid; and keys, controlling said motor mechanism.

27. In a type-writing machine or other similar instrument, and in combination therein with the type-bars, permutational character-selecting mechanism having controlling elements fewer in number than the type-bars operated thereby; said controlling elements serving, in different combinations, to bring the type-bars aforesaid into action, each as required; a plurality of the controlling elements aforesaid acting each, when moved, to communicate motion to the proper type-bar.

28. In a type-writing machine or other similar instrument, and in combination therein with the type-bars, permutational character-selecting mechanism having controlling elements fewer in number than the type-bars operated thereby; said controlling elements serving, in different combinations, to bring the type-bars aforesaid into action, each as required; and motor mechanism acting to give movement to a plurality of the controlling elements before mentioned, said controlling elements serving, when thus moved by the motor mechanism, to communicate motion to the proper type-bar.

29. In a type-writing machine or other similar instrument, and in combination therein with the type-bars, permutational selecting mechanism, having keys fewer in number than the type-bars controlled thereby, and motor mechanism, whereby the type-bars aforesaid are actuated, each as required; a plurality of said type-bars being normally disconnected from said motor mechanism; means whereby said type-bars are connected, each as required, with the motor mechanism aforesaid; said motor mechanism being brought into action by the key mechanism before mentioned, and thereupon operating independently of said key mechanism to impel the type-bar corresponding to the key or combination of keys depressed.

30. In a type-writing machine or other similar instrument, and in combination therein with the type-bars, permutational selecting mechanism, acting simultaneously both to select the type-bar to be moved and to impel the same from its normal position to the printing-center.

31. In a type-writing machine or other similar instrument, and in combination therein with the type-bars, permutational selecting mechanism, having controlling elements acting simultaneously both to select the type-bar to be moved and to impel the same from its normal position to the printing-center.

32. In a type-writing machine or other similar instrument, and in combination, (a) a multiplicity of type-bars; (b) permutational selecting mechanism, serving to operate the type-bars aforesaid, and having controlling elements fewer in number than the type-bars operated thereby; (c) a plurality of electromagnets acting respectively upon different controlling elements of the permutational selecting mechanism aforesaid; and (d) keys, controlling the electromagnets aforesaid.

33. In a type-writing machine or other similar instrument, and in combination, type-bars; a plurality of electromagnets, each controlling a group of the type-bars aforesaid; a plurality of the type-bars of each group being normally disconnected from the electromagnet controlling such group; and means operating to connect the type-bars in a group, each as required, with the corresponding electromagnet.

34. In a type-writing machine or other similar instrument, and in combination, type-bars; a plurality of electromagnets, each controlling a group of the type-bars beforesaid, a plurality of the type-bars of each group being normally disconnected from the electromagnet controlling such group; keys controlling said electromagnets; and other keys operating to connect different type-bars of a group, each as required, with the electromagnet corresponding to such group; said electromagnet thereupon operating for the impelling of the type-bar thus connected with it, from its normal position to the printing-center.

35. In a type-writing machine or other similar instrument, and in combination, type-bars; a plurality of electromagnets, each controlling a group of the type-bars aforesaid; a plurality of the type-bars of each group being normally disconnected from the electromagnet controlling such group; keys controlling said electromagnets; and key mechanism and electromagnets controlled thereby operating to connect the different type-bars of a group, each as required, with the electromagnet corresponding to such group; said electromagnet thereupon operating for the impelling of the type-bar thus connected with it from its normal position to the printing-center.

36. In a type-writing machine or other similar instrument, an organization for producing consecutive letters by simultaneous actions of the operator, said organization including (a) two sets of type-bars, the bars of each set striking to a printing-point common to the bars of such set, the printing-points of the two sets of bars being adjacent to each other; (b) permutational character-selecting mechanism having a plurality of controlling elements, acting in different combinations to operate the type-bars of one of the two sets aforesaid; keys; and motor mechanism, controlled by said keys, and acting upon controlling elements of the permutational character-selecting mechanism aforesaid; and (*c*) suitable means for operating the type-bars of the other one of the two sets above mentioned.

37. In a type-writing machine or other similar instrument, an organization for producing consecutive letters by simultaneous actions of the operator, said organization including (*a*) two sets of type-bars, the bars of each set striking to a printing-point common to the bars of such set, the printing-points of the two sets of bars being adjacent to each other; (*b*) permutational character-selecting mechanism, serving to operate the type-bars of one of the two sets aforesaid; said permutational character-selecting mechanism having controlling elements fewer in number than the type-bars operated thereby; keys; and motor mechanism controlled by said keys; said motor mechanism acting through controlling elements of the permutational selecting mechanism before mentioned upon the type-bars controlled thereby; and (*c*) suitable means for operating the type-bars of the other one of the two sets above mentioned.

38. In a type-writing machine or other similar instrument, an organization for producing consecutive letters by simultaneous actions of the operator, said organization including (*a*) two sets of type-bars, the bars of each set striking to a printing-point common to the bars of such set, the printing-points of the two sets of bars being adjacent to each other; (*b*) permutational character-selecting mechanism, serving to operate the type-bars of one of the two sets before mentioned; said permutational character-selecting mechanism including controlling elements, less in number than the type-bars operated thereby, the controlling elements serving, in different combinations, to bring said type-bars into action, each as required, a plurality of the controlling elements aforesaid acting, when moved, to communicate movement to the proper type-bar; and (*c*) suitable means for operating the type-bars of the other one of the two sets above mentioned.

39. In a type-writing machine or other similar instrument, an organization for producing consecutive letters by simultaneous actions of the operator, said organization including (*a*) two sets of type-bars, the bars of each set striking to a printing-point common to the bars of such set, the printing-points of the two sets of bars being adjacent to each other; (*b*) permutational character-selecting mechanism, serving to operate the type-bars of one of the two sets before mentioned; said permutational character-selecting mechanism including controlling elements less in number than the type-bars operated thereby, the controlling elements serving in different combinations to bring said type-bars into action, each as required, and motor mechanism acting to give movement to a plurality of the controlling elements above mentioned, said controlling elements acting, when thus moved by the motor mechanism, to communicate movement to the proper type-bar; and (*c*) suitable means for operating the type-bars of the other one of the two sets above mentioned.

40. In a type-writing machine or other similar instrument, an organization for producing consecutive letters by simultaneous actions of the operator, said organization including (*a*) two sets of type-bars, the bars of each set striking to a printing-point common to the bars of such set, the printing-points of the two sets of bars being adjacent to each other; (*b*) permutational selecting mechanism, serving to operate the type-bars of one of the two sets above mentioned; said permutational selecting mechanism having keys fewer in number than the type-bars controlled thereby, and a motor device, serving to impel a plurality of the type-bars before mentioned, each as required; said motor device being brought into action, by the key mechanism, and thereupon operating independently of said key mechanism to impel the type-bar corresponding to the key or combination of keys depressed; and (*c*) suitable means for operating the type-bars of the other one of the two sets before mentioned.

41. In a type-writing machine or other similar instrument, an organization for producing consecutive letters by simultaneous actions of the operator, said organization including (*a*) two sets of type-bars, the bars of each set striking to a printing-point common to the bars of such set, the printing-points of the two sets being adjacent to each other; (*b*) permutational selecting mechanism, serving to operate the type-bars of one of the two sets above mentioned, said permutational selecting mechanism acting with a single operation both to select the type-bar to be moved and to impel the same from its normal position to the printing-center; and (*c*) suitable means for operating the type-bars of the other one of the two sets before mentioned.

42. In a type-writing machine or other similar instrument, an organization for producing consecutive letters by simultaneous actions of the operator, said organization including (*a*) two sets of type-bars, the bars of each set striking to a printing-point common to the bars of such set, the printing-points of the two sets being adjacent to each other; (*b*) permutational selecting mechanism, serving to operate the type-bars of one of the two sets above mentioned, said permutational selecting mechanism having controlling elements, fewer in number than the type-bars operated thereby, acting with a single operation both to select the type-bar to be moved and to impel the same from its normal position to the printing-center; and (*c*) suitable means for operating the type-bars of the other one of the two sets before mentioned.

43. In a type-writing machine or other similar instrument, an organization for producing consecutive letters by simultaneous actions of the operator, said organization including (*a*) two sets of type-bars, the bars of each set striking to a printing-point common to the bars of such set, the printing-points of the two sets of bars being adjacent to each other; (b) permutational selecting mechanism, serving to operate the type-bars of one of the two sets above mentioned; said permutational type-bar-selecting mechanism including a plurality of electromagnets, each controlling a group of the type-bars aforesaid; a plurality of the type-bars in each group being normally disconnected from the electromagnet controlling such group; and means operating to connect the type-bars in a group, each as required, with the corresponding electromagnet; and (c) suitable means for operating the type-bars of the other one of the two groups above mentioned.

44. In a type-writing machine or other similar instrument, an organization for producing consecutive letters by simultaneous actions of the operator, said organization including (a) two sets of type-bars, the bars of each set striking to a printing-point common to the bars of such set, the printing-points of the two sets of bars being adjacent to each other; (b) permutational selecting mechanism, serving to operate the type-bars of one of the two sets above mentioned; said permutational type-bar-selecting mechanism including a plurality of electromagnets, each controlling a group of the type-bars aforesaid; a plurality of the type-bars in each group being normally disconnected from the electromagnet controlling such group; keys, controlling said electromagnets; and other keys operating to connect the different type-bars of a group, each type-bar as required, with the electromagnet corresponding to such group; said electromagnet thereupon operating for the impelling of the type-bar thus connected with it from its normal position to the printing-center; and (c) suitable means for operating the type-bars of the other one of the two groups above mentioned.

45. In a type-writing machine or other similar instrument, an organization for producing consecutive letters by simultaneous actions of the operator, said organization including (a) two sets of type-bars, the bars of each set striking to a printing-point common to the bars of such set, the printing-points of the two sets of bars being adjacent to each other; (b) permutational selecting mechanism, serving to operate the type-bars of one of the two sets above mentioned; said permutational type-bar-selecting mechanism including a plurality of electromagnets, each controlling a group of the type-bars aforesaid; a plurality of the type-bars in each group being normally disconnected from the electromagnet controlling such group; keys, controlling said electromagnets; and key mechanism and electromagnets controlled thereby operating to connect the different type-bars of a group, each as required, with the electromagnet corresponding to such group; said electromagnet thereupon operating for the impelling of the type-bar thus connected with it from its normal position to the printing-center; and (c) suitable means for operating the type-bars of the other one of the two groups above mentioned.

46. In a type-writing machine, linotyping-machine, type-setting machine, or other similar instrument, permutational character-selecting mechanism including in combination with a set of controlled parts, two sets of mechanical controlling devices, coacting to operate the controlled parts aforesaid; each of said controlled parts being operated by the coacting of two controlling devices, belonging one to one of the sets of controlling devices before mentioned and the other to the other set of controlling devices before mentioned.

47. In a type-writing machine, linotype-machine, type-setting machine, or other similar instrument, permutational character-selecting mechanism, including in combination with a set of controlled parts, two sets of motor devices, coacting to operate the controlled parts aforesaid; each of said controlled parts being operated by the coacting of two motor devices, belonging one to one of the sets of motor devices before mentioned, and the other to the other set of motor devices before mentioned.

48. In a type-writing machine, linotyping-machine, type-setting machine, or other similar instrument, permutational character-selecting mechanism including, in combination with a set of controlled parts, two sets of frames coacting upon said controlled parts.

49. In a type-writing machine, linotyping-machine, type-setting machine, or other similar instrument, permutational character-selecting mechanism including in combination with a set of controlled levers, two sets of frames, coacting upon said levers, to operate each lever individually, as required.

50. In a type-writing machine, linotyping-machine, type-setting machine, or other similar instrument, permutational character-selecting mechanism, including in combination with a set of controlled parts, two sets of mechanical controlling devices, coacting to operate the controlled parts before mentioned, each of said controlled parts being operated by the coacting of two controlling devices, belonging one to one of the sets of controlling devices before mentioned and the other to the other set of controlling devices before mentioned; a normally-coacting device in one of the sets of controlling devices before mentioned; and means whereby said normally-coacting device is thrown out of action when any other controlling device of the same set is brought into action.

51. In a type-writing machine, linotype-machine, type-setting machine, or other similar instrument, permutational character-selecting mechanism, including in combination, (a) a set of controlled parts; (b) two sets of motor devices, coacting to operate the controlled parts before mentioned, each of said controlled parts being operated by the coacting of two motor devices, belonging one to one of the sets of motor devices before mentioned, and the other to the other set of motor devices before mentioned; (c) a normally-coacting motor device in one of the sets of motor devices before mentioned; and (d) means whereby said normally-coacting motor device is thrown out of action when any other motor device of the same set is brought into action.

52. In a type-writing machine, linotyping-machine, type-setting machine, or other similar instrument, permutational character-selecting mechanism, including in combination with a set of controlled parts, two sets of mechanical controlling devices, coacting to operate the controlled parts before mentioned, each of said controlled parts being operated by the coacting of two controlling devices belonging one to one of the sets of controlling devices before mentioned and the other to the other set of controlling devices before mentioned; a normally-coacting device, in each of the sets of controlling devices before mentioned; and means whereby the normally-coacting device of each set is thrown out of action when any other controlling device of the same set is brought into action.

53. In a type-writing machine, linotype-machine, type-setting machine, or other similar instrument, permutational character-selecting mechanism, including in combination with a set of controlled parts, (a) two sets of motor devices coacting to operate the controlled parts before mentioned, each of said controlled parts being operated by the coacting of two motor devices, belonging one to one of the sets of motor devices before mentioned, and the other to the other set of motor devices before mentioned; (b) a normally-coacting motor device in each of the sets of motor devices before mentioned; and means whereby the normally-coacting motor device of each set is thrown out of action when any other controlling device of the same set is brought into action.

54. In a type-writing machine, linotyping-machine, type-setting machine, or other similar instrument, permutational character-selecting mechanism including in combination, keys; a set of controlled parts; two sets of controlling devices, coacting to control said controlled parts; and power mechanism, controlled by the keys, and serving to actuate the controlling devices before mentioned, and thereby to actuate the controlled parts before mentioned.

55. In a type-writing machine, linotyping-machine, type-setting machine, or other similar instrument, permutational character-selecting mechanism including in combination with keys and a set of controlled parts, two sets of controlling devices, coacting to control said controlled parts; and electromagnetic power mechanism, controlled by the keys and serving to actuate the controlling devices before mentioned and thereby to actuate the controlled parts before mentioned.

56. In a type-writing machine, linotyping-machine, type-setting machine, or other similar instrument, permutational character-selecting mechanism including in combination with a set of controlled parts, two sets of controlling devices, coacting to control said controlled parts, each of said controlled parts being operated by the coacting of two controlling devices belonging one to one of the sets of controlling devices before mentioned and the other to the other set of controlling devices before mentioned; electromagnetic power mechanism, controlling one set of the controlling devices before mentioned; and keys, controlling said electromagnetic power mechanism.

57. In a type-writing machine, linotyping-machine, type-setting machine, or other similar instrument, permutational character-selecting mechanism including in combination with a set of controlled parts, two sets of controlling devices, coacting to control said controlled parts, each of said controlled parts being operated by the coacting of two controlling devices, belonging one to one of the sets of controlling devices aforesaid and the other to the other set of controlling devices aforesaid; and a set of electromagnets controlling one of the sets of controlling devices aforesaid; and keys controlling said electromagnets.

58. In a type-writing machine, linotyping-machine, type-setting machine, or other similar instrument, permutational character-selecting mechanism including in combination with a set of controlled parts, two sets of controlling devices, coacting to control said controlled parts, each of said controlled parts being operated by the coacting of two controlling devices, belonging one to one of the sets of controlling devices before mentioned and the other to the other set of controlling devices before mentioned; electromagnetic power mechanism serving to operate the controlling devices of the two sets before mentioned; and keys controlling said electromagnetic power mechanism.

59. In a type-writing machine, linotyping-machine, type-setting machine, or other similar instrument, permutational character-selecting mechanism including in combination with a set of controlled parts, two sets of controlling devices, coacting to control said controlled parts, each of said controlled parts being operated by the coacting of two controlling devices belonging one to one of the sets of controlling devices before mentioned and the other to the other set of controlling devices before mentioned; a set of electromagnets controlling one of the sets of controlling devices aforesaid; another set of electromagnets, controlling the other set of controlling devices before mentioned; and keys controlling said electromagnets.

60. In a type-writing machine or other similar instrument, and in combination therein with the type-bars, permutational character-selecting mechanism having two sets of mechanical controlling elements coacting to operate the type-bars aforesaid; each of said type-bars being operated by the coacting of two controlling elements, belonging one to one of the sets of controlling elements before mentioned, and the other to the other set of controlling elements before mentioned.

61. In a type-writing machine or other similar instrument, and in combination therein with the type-bars, permutational selecting mechanism having two sets of motor devices coacting to operate the type-bars aforesaid; each of said type-bars being operated by the coacting of two motor devices, belonging one to one of the sets of motor devices before mentioned, and the other to the other set of motor devices before mentioned.

62. In a type-writing machine or other similar instrument, and in combination therein with the type-bars, permutational selecting mechanism, having two sets of frames or levers coacting to operate the type-bars aforesaid, each type-bar being operated by the coacting of two frames or levers, belonging one to one of the two sets before mentioned, and the other to the other one of said two sets.

63. In a type-writing machine or other similar instrument, and in combination therein with the type-bars, permutational selecting mechanism having a set of controlling-levers, corresponding to and connected with the type-bars; and two sets of frames, coacting upon the controlling-levers aforesaid to operate said controlling-levers, each as required.

64. In a type-writing machine or other similar instrument, and in combination therein with the type-bars, permutational selecting mechanism having two sets of mechanical controlling elements coacting to operate the type-bars aforesaid; each of said type-bars being operated by the coacting of two controlling elements, belonging one to one of the sets of controlling elements before mentioned and the other to the other set of controlling elements; a normally-coacting controlling element in one of the sets of controlling elements before mentioned, and means whereby said normally-coacting controlling element is thrown out of action when any other controlling element of the same set is brought into action.

65. In a type-writing machine or other similar instrument, and in combination therein with the type-bars, permutational selecting mechanism having two sets of motor devices, coacting to operate the type-bars aforesaid; each of said type-bars being operated by the coacting of two motor devices, belonging one to one of the sets of motor devices before mentioned, and the other to the other set of motor devices before mentioned; a normally-coacting motor device in one of the sets of motor devices before mentioned; and means whereby said normally coacting motor device is thrown out of action when any other motor device of the same set is brought into action.

66. In a type-writing machine or other suitable instrument, and in combination therein with the type-bars, permutational selecting mechanism having two sets of mechanical controlling elements coacting to operate the type-bars aforesaid; each of said type-bars being operated by the coacting of two controlling elements, belonging one to one of the sets of controlling elements before mentioned, and the other to the other set of controlling elements before mentioned; a normally-coacting controlling element in each of the sets of controlling elements before mentioned; and means whereby the normally-coacting controlling element in each set is thrown out of action whenever any other controlling element of the same set is brought into action.

67. In a type-writing machine or other similar instrument, and in combination therein with the type-bars, permutational selecting mechanism having two sets of motor devices coacting to operate the type-bars aforesaid; each of said type-bars being operated by the coacting of two motor devices, belonging one to one of the sets of motor devices before mentioned, and the other to the other set of motor devices before mentioned; a normally-coacting motor device in each of the sets of motor devices before mentioned; and means whereby the normally-coacting motor device in each set is thrown out of action whenever any other motor device of the same set is brought into action.

68. In a type-writing machine or other similar instrument, and in combination therein with the type-bars, permutational selecting mechanism having two sets of controlling elements coacting to operate the type-bars aforesaid; each of said type-bars being operated by the coacting of two controlling elements, belonging one to one of the sets of controlling elements before mentioned, and the other to the other set of controlling elements before mentioned; and motor mechanism controlled by the keys, and serving to actuate a plurality of the controlling elements before mentioned, thereby to actuate the type-bars aforesaid.

69. In a type-writing machine or other similar instrument, and in combination therein with the type-bars, permutational selecting mechanism having two sets of controlling elements coacting to operate the type-bars aforesaid; each of said type-bars being operated by the coacting of two controlling elements, belonging one to one of the sets of controlling elements before mentioned, and the other to the other set of controlling elements before mentioned; and electromagnetic motor mechanism controlled by the keys, and serving to actuate a plurality of the controlling elements before mentioned, thereby to actuate the type-bars aforesaid.

70. In a type-writing machine or other similar instrument, and in combination therein with the type-bars, permutational selecting mechanism having two sets of controlling elements coacting to operate the type-bars aforesaid; each of said type-bars being operated by the coacting of two controlling elements, belonging one to one of the sets of controlling elements before mentioned and the other to the other set of controlling elements before mentioned; electromagnetic motor mechanism, controlling one set of the controlling elements before mentioned; and keys, controlling said electromagnetic motor mechanism.

71. In a type-writing machine or other similar instrument, and in combination therein with the type-bars, permutational selecting mechanism having two sets of controlling elements coacting to operate the type-bars aforesaid; each of said type-bars being operated by the coacting of two controlling elements, belonging one to one of the sets of controlling elements before mentioned and the other to the other set of controlling elements before mentioned; a set of electromagnets controlling one of the two sets of controlling elements aforesaid; and key mechanism controlling said electromagnets.

72. In a type-writing machine or other similar instrument, and in combination therein with the type-bars, permutational selecting mechanism having two sets of controlling elements coacting to operate the type-bars aforesaid; each of said type-bars being operated by the coacting of two controlling elements, belonging one to one of the sets of controlling elements before mentioned and the other to the other set of controlling elements before mentioned; electromagnetic motor mechanism serving to operate the controlling elements of the two sets above mentioned; and keys controlling said electromagnetic motor mechanism.

73. In a type-writing machine or other similar instrument, and in combination therein with the type-bars, permutational selecting mechanism having two sets of controlling elements coacting to operate the type-bars aforesaid; each of said type-bars being operated by the coacting of two controlling elements, belonging one to one of the sets of controlling elements before mentioned and the other to the other set of controlling elements before mentioned; a set of electromagnets, controlling one of the two sets of controlling elements aforesaid, and other electromagnets controlling the other set of controlling elements aforesaid; and keys controlling said electromagnets.

74. In a type-writing machine, linotyping-machine, type-setting machine, or other similar instrument, a mechanical permutational character-selecting mechanism, including in combination with a multiplicity of controlled parts, a set of controlling devices, each in general controlling a group of the controlled parts before mentioned; detachable connections between the different members of each group of controlled parts and the corresponding controlling device; and keys controlling said detachable connections.

75. In a type-writing machine, linotyping-machine, type-setting machine, or other similar instrument, a mechanical permutational character-selecting mechanism including in combination with a multiplicity of controlled parts, a set of controlling devices, each in general controlling a group of the controlled parts above mentioned; detachable connections between the different members of a group of controlled parts and the corresponding controlling device; and keys controlling said controlling devices.

76. In a type-writing machine, linotyping-machine, type-setting machine, or other similar instrument, a mechanical permutational character-selecting mechanism, including in combination with a multiplicity of controlled parts, a set of controlling devices, each in general controlling a group of the controlled parts before mentioned; detachable connections between the different members of a group of controlled parts and the corresponding controlling device; and keys controlling the controlling devices and the detachable connections aforesaid.

77. In a permutational character-selecting mechanism, for use in a type-writing machine, linotyping-machine, type-setting machine, or other similar instrument, the combination, with the character-corresponding levers, of mechanical group-controlling devices, each serving to control a group of the levers aforesaid.

78. In a permutational character-selecting mechanism, for use in a type-writing machine, linotyping-machine, type-setting machine, or other similar instrument, the combination, with the character-corresponding levers, of devices whereby movement is given to the character-corresponding levers aforesaid, in groups; the different devices aforesaid serving each to give movement to a different group of the character-corresponding levers aforesaid.

79. In a permutational character-selecting mechanism, for use in a type-writing machine, linotyping-machine, type-setting machine, or other similar instrument, the combination, with the character-corresponding levers of devices whereby movement is given to the character-corresponding levers aforesaid, in groups, and coacting frames or levers whereby the different members of a group of character-corresponding levers are brought into action, each as required.

80. In a permutational character-selecting mechanism, for use in a type-writing machine, linotyping-machine, type-setting machine, or other similar instrument, the combination, with the groups of character-corresponding levers and the frames or levers equal in number to the number of character-corresponding levers in a group, of mechanical group-controlling devices, whereby the different groups of character-corresponding levers aforesaid are brought into action, each as required.

81. In a permutational character-selecting mechanism, for use in a type-writing machine, linotyping-machine, type-setting machine, or other similar instrument, the combination, with the groups of character-corresponding levers, of mechanical group-controlling devices, each controlling a different group of the character-corresponding levers aforesaid; and means whereby the different levers of a group are brought into action, each as required.

82. In a permutational character-selecting mechanism, for use in a type-writing machine, linotyping-machine, type-setting machine, or other similar instrument, the combination, with the groups of character-corresponding levers, of mechanical selecting devices acting to select the group of levers out of which one is to be brought into action; and other mechanical selecting devices, acting to select the lever in such group which shall be brought into action.

83. In a permutational type-bar-selecting mechanism, for a type-writing machine or other similar instrument, the combination, with the type-bars and the type-bar-corresponding levers, of mechanical group-controlling devices, each serving to control a group of the levers aforesaid.

84. In a permutational type-bar-selecting mechanism, for a type-writing machine, or other similar instrument, the combination with the type-bars and the type-bar-corresponding levers, of the devices whereby movement is given to the type-bar-corresponding levers, in groups, the different devices aforesaid serving each to give movement to a different group of the type-bar-corresponding levers before mentioned.

85. In a permutational type-bar-selecting mechanism, for a type-writing machine, or other similar instrument, the combination, with the type-bars and the type-bar-corresponding levers, of the devices whereby movement is given to the type-bar-corresponding levers aforesaid, in groups, and the coacting frames or levers, whereby the different members of a group of type-bar-corresponding levers are brought into action, each as required.

86. In a permutational type-bar-selecting mechanism, for a type-writing machine, or other similar instrument, the combination, with the type-bars and the groups of type-bar-corresponding levers, of the frames or levers, equal in number to the number of the type-bar-corresponding levers in a group, and the mechanical group-controlling devices, whereby the different groups of type-bar-corresponding levers are brought into action, each as required.

87. In a permutational type-bar-selecting mechanism, for a type-writing machine, or other similar instrument, the combination, with the type-bars, and the groups of type-corresponding levers, connected with the type-bars, of mechanical group-controlling devices, each controlling a different group of the type-bar-corresponding levers aforesaid; and means whereby the different levers of a group are brought into action, each as required.

88. In a permutational type-bar-selecting mechanism, for a type-writing machine, or other similar instrument, the combination with the groups of type-bars and the levers corresponding thereto and connected therewith, of two groups of mechanical selecting elements, the selecting elements of the one group acting to select the group of type-bars out of which one is to be brought into action, and the selecting elements of the other group acting to determine which type-bar in the group selected as before mentioned, shall be brought into action.

89. In a permutational type-bar-selecting mechanism, for a type-writing machine, or other similar instrument, the combination, with the type-bars and motor devices, less in number than the type-bars of the keys, each controlling a group of said type-bars, and means whereby the different type-bars of a group are brought into action, each as required.

90. In a permutational type-bar-selecting mechanism, for a type-writing machine or other similar instrument, the combination, with the type-bars and motor devices, less in number than the type-bars of (a) keys, less in number than the groups of type-bars above mentioned, said keys each corresponding to and serving to control one of the groups of type-bars above mentioned; and (b) a device controlling one of the groups of type-bars above mentioned to which no one of the keys above mentioned corresponds; the keys above mentioned serving to control the device last above mentioned.

91. In a permutational type-bar-selecting mechanism, for a type-writing machine or other similar instrument, the combination with the group of type-bars and motor devices, less in number than the type-bars, of (a) keys, less in number than the groups of type-bars above mentioned, each key corresponding to and serving to control one of said groups of type-bars; (b) a device controlling one of the groups of type-bars above mentioned with which no one of the keys above mentioned corresponds; the keys above mentioned controlling the device last above mentioned; and (c) means whereby the different type-bars of a group are brought into action, each as required.

92. In a permutational character-selecting mechanism, for use in a type-writing machine, linotyping-machine, type-setting machine or other similar instrument, the combination with the groups of controlled parts and motor devices, less in number than said controlled parts, of the group-controlling keys, less numerous than the groups of controlled parts, each of said keys corresponding to and serving to control one of said groups of controlled parts; and a device, controlled by all said keys, and operating to control one of the groups of the controlled parts aforesaid, with which no one of the keys above mentioned corresponds.

93. In a permutational character-selecting mechanism, for use in a type-writing machine, linotyping-machine, type-setting machine, or other similar instrument, the combination with a plurality of groups of character-corresponding levers, and motor devices less in number than said character-controlling levers, of keys, each controlling a different group of said levers, and means whereby the different levers of a group are brought into action, each as required.

94. In a permutational character-selecting mechanism, for use in a type-writing machine, linotyping-machine, type-setting machine, or other similar instrument, the combination, with a plurality of groups of character-corresponding levers, and motor devices less in number than said character-controlling levers, of group-controlling keys, less in number than the groups of character-corresponding levers, each of such keys corresponding to and serving to control one of said groups of levers; and a device, controlled by all said keys, and operating to control one of the groups of the levers aforesaid with which no one of the keys before mentioned corresponds.

95. In a permutational character-selecting mechanism, for use in a type-writing machine, linotyping-machine, type-setting machine, or other similar instrument, a plurality of groups of character-corresponding levers and motor devices less in number than said character-controlling levers; keys, less in number than the groups of character-corresponding levers aforesaid, each key corresponding to and serving to control one of the groups of character-corresponding levers aforesaid; a device controlling one of the groups of levers above mentioned, to which no one of the keys above mentioned corresponds; the keys above mentioned serving to control the device last above mentioned; and means whereby the different levers of a group are brought into action, each as required.

96. In a permutational character-selecting mechanism, for use in a type-writing machine, linotyping-machine, type-setting machine, or other similar instrument, the combination with the character-corresponding levers and motor devices less in number than said character-corresponding levers, of the group-controlling devices whereby movement is given to the character-corresponding levers aforesaid, in groups, of the group-controlling keys, less numerous than the group-controlling devices aforesaid; each key corresponding to and serving to control one of said group-controlling devices; and a device controlled by said keys and serving to control one of the group-controlling devices aforesaid, with which no one of the keys above mentioned corresponds.

97. In a permutational character-selecting mechanism, the combination with a group of mechanical controlling elements of a group of keys less in number than the controlling elements of the group aforesaid, each key corresponding to and serving to control one of the controlling elements of the group before mentioned; and means, controlled by said keys acting to control one of the controlling elements of the group above mentioned to which no one of the keys above mentioned corresponds.

98. In a permutational character-selecting mechanism, for use in a type-writing machine, linotype-machine, type-setting machine, or other similar instrument, the combination with a group of motor devices, of a group of keys less in number than the motor devices aforesaid, each key corresponding to and serving to control one of the motor devices of the group before mentioned; and means controlled by said keys acting to control one of the controlling elements of the group above mentioned to which no one of the keys above mentioned corresponds.

99. In a permutational character-selecting mechanism, for use in a type-writing machine, linotyping-machine, type-setting machine, or other similar instrument, and in combination, (a) a group of mechanical controlling elements; (b) a group of keys, less in number than the controlling elements of a group aforesaid, each key corresponding to and serving to control one of the controlling elements of the group above mentioned; (c) means controlled by all said keys, acting to control one of the controlling elements of the groups above mentioned to which no one of the keys above mentioned corresponds; (d) another group of mechanical controlling elements, adapted to coact with the controlling elements of the group first above mentioned, in selecting the characters to be produced; (e) one or more keys, each corresponding to and serving to control one of the controlling elements of the group second in this paragraph mentioned; and (f) a device operated by the key or keys last above mentioned, and serving to control another one of the controlling elements of the group second in this paragraph mentioned.

100. In a permutational character-selecting mechanism, for use in a type-writing machine, linotype-machine, type-setting machine, or other similar instrument, and in combination, (a) a group of motor devices; (b) a group of keys, less in number than the motor devices aforesaid, each key corresponding to and serving to control one of the motor devices of the group above mentioned; (c) means controlled by all said keys acting to control one of the motor devices of the group above mentioned to which no one of the keys above mentioned corresponds; (d) another group of devices adapted to coact with the motor devices of the group first above mentioned in selecting the characters to be produced; (e) one or more keys, each corresponding to and serving to control one of the devices of the group in the last clause mentioned; and (f) a device operated by the key or keys last above mentioned, and serving to control one of the devices of the group second in this paragraph mentioned.

101. In a permutational character-selecting mechanism, for use in a type-writing machine, linotyping-machine, type-setting machine, or other similar instrument, the combination, with the set of frames or levers, as $e$, $e'$, $e^2$, &c., of keys, less in number than the frames or levers aforesaid, such keys each corresponding to and serving to control a different one of the frames aforesaid; and a device controlled by the keys aforesaid, corresponding to and serving to control one of the frames or levers of the set aforesaid, with which no one of the keys above mentioned corresponds.

102. In a permutational character-selecting mechanism, for use in a type-writing machine, linotyping-machine, type-setting machine, or other similar instrument, the combination, with the frames or levers, as $d$, $d'$, &c., of keys, less in number than the frames aforesaid, such key or keys, if more than one be used, each corresponding to and serving to control some one of the frames aforesaid; and a device controlled by the key or keys before mentioned, said device corresponding to and serving to control one of the frames or levers, $d$, $d'$, &c., before mentioned, with which no one of the keys before mentioned corresponds.

103. In a permutational type-bar-selecting mechanism, and in combination therein with a plurality of groups of type-bars, group-controlling devices, each adapted to give movement to all the type-bars of one of the groups before mentioned, each type-bar as required, a plurality of the type-bars of each group being normally disconnected from the device serving to give movement to them; different group-controlling devices acting upon different groups of type-bars.

104. In a permutational type-bar-selecting mechanism, and in combination therein with a plurality of groups of type-bars, group-controlling devices, each adapted to give movement to all the type-bars of one of the groups above mentioned, each as required; a plurality of the type-bars in each group being normally disconnected from the device serving to give movement to them; and means serving to connect the type-bars of a group, each type-bar as required, with the group-controlling device serving to give movement to them.

105. In a permutational type-bar-selecting mechanism, and in combination therein with a plurality of groups of type-bars, group-controlling devices, each adapted to give movement to all the type-bars of one of the groups before mentioned, each as required; and devices each serving to connect one type-bar in each of a plurality of the groups aforesaid with the group-controlling device that serves to give movement to the bars of such group.

106. In a permutational type-bar-selecting mechanism, and in combination therein with a plurality of groups of type-bars, group-controlling devices, each adapted to give movement to all the type-bars of one of the groups before mentioned, each as required; a plurality of the type-bars in each group being normally disconnected from the group-controlling device serving to give movement to them; and keys controlling the group-controlling devices aforesaid.

107. In a permutational type-bar-selecting mechanism, and in combination therein with a plurality of groups of type-bars, group-controlling devices, each adapted to give movement to all the type-bars of one of the groups before mentioned, each as required; a plurality of the type-bars in each group being normally disconnected from the device serving to give movement to them; keys, controlling the group-controlling devices aforesaid; and means serving to connect the type-bars of a group, each type-bar as required, with the group-controlling device serving to give movement to them.

108. In a permutational type-bar-selecting mechanism, and in combination therein with a plurality of groups of type-bars, group-controlling devices, each adapted to give movement to all the type-bars of one of the groups before mentioned, each as required; keys, controlling the group-controlling devices aforesaid; and devices, each serving to connect one type-bar in each of a plurality of the groups aforesaid with the group-controlling device that serves to give movement to the bars of such group.

109. In a type-writing machine or other similar instrument, the combination, with the type-bar-impelling frames or levers, of the corresponding groups of type-bars, motor mechanism, serving to give movement to the type-bar-impelling frames or levers before mentioned, each as required; keys, serving to bring the motor mechanism into action for the moving of said parts; and means whereby the type-bars of a group are connected, each as required, with the type-bar-impelling frame or lever corresponding thereto.

110. In a permutational character-selecting mechanism, the combination with a multiplicity of character-corresponding levers, and devices each controlling a different group of said character-corresponding levers, of retreating fulcrums for said character-corresponding levers, adapted to coact with the group-controlling devices aforesaid.

111. In a permutational character-selecting mechanism, the combination with a multiplicity of character-corresponding levers, and devices each controlling a different group of said levers, of the retreating fulcrums for said character-corresponding levers; and means whereby said retreating fulcrums are locked, each as required.

112. In a permutational character-selecting mechanism, the combination with a multiplicity of character-corresponding levers, and devices each controlling a different group of said levers, of the retreating fulcrums for said character-corresponding levers; and electromagnets, whereby said retreating fulcrums are locked, each as required.

113. In a permutational character-selecting mechanism, the combination with a multiplicity of character-corresponding levers, and devices each controlling a different group of said levers, of retreating fulcrums for said character-corresponding levers; and keys, and means controlled by the keys, serving to lock the retreating fulcrums aforesaid, each as required.

114. In a permutational character-selecting mechanism, the combination with a multiplicity of character-corresponding levers, and devices each controlling a different group of said levers, of retreating fulcrums for said character-corresponding levers; and keys, and electromagnets controlled by the keys serving to lock the retreating fulcrums aforesaid, each as required.

115. In a permutational character-selecting mechanism, the combination with a multiplicity of character-corresponding levers, and devices each controlling a different group of said character-corresponding levers, of the frames or levers, as $d$, $d'$, arranged to serve as retreating fulcrums for the character-corresponding levers aforesaid.

116. In a permutational character-selecting mechanism, the combination with a multiplicity of character-corresponding levers, and devices each controlling a different group of said character-corresponding levers, of the frames or levers, as $d$, $d'$; and key-controlled devices, whereby the different frames aforesaid are locked, each as required.

117. In a type-writing machine or other similar instrument, the combination with the frames or levers, as $d$, $d'$, &c., of the corresponding groups of type-bars, the bars of each group being normally disconnected from the frame or lever aforementioned corresponding thereto; and means whereby the type-bars of a group are connected, each as required, with the frame or lever aforementioned corresponding thereto.

118. In a type-writing machine, or other similar instrument, the combination with the frames or levers, as $d$, $d'$, &c., of the corresponding groups of type-bars, the type-bars of each group being normally disconnected from the frame or lever aforementioned corresponding thereto; motor mechanism, serving to control said frames or levers $d$, $d'$, &c.; keys serving to bring the motor mechanism into action for the controlling of said frames or levers; and means whereby the type-bars of a group are connected, each as required, with the frame or lever aforementioned corresponding thereto.

119. In a type-writing machine, or other similar instrument, the combination with the frames or levers, as $d$, $d'$, &c., of the corresponding groups of type-bars; electromagnets controlling the frames or levers $d$, $d'$, &c., and one or more keys controlling said electromagnets.

120. In a type-writing machine, or other similar instrument, the combination with the frames or levers, as $d$, $d'$, &c., of the corresponding groups of type-bars, the type-bars of each group being normally disconnected from the frame or lever aforementioned corresponding thereto; electromagnets controlling the parts $d$, $d'$, &c.; one or more keys controlling said electromagnets; and means whereby the type-bars of a group are connected, each as required, with the frame or lever aforementioned corresponding thereto.

121. A permutational character-selecting mechanism, for use in a type-writing machine, linotyping-machine, type-setting machine, or other similar instrument, including a group of electromagnets; keys less in number than said electromagnets, each key corresponding to and operating to control one of said electromagnets; and a device operating to control one of said electromagnets to which no one of the keys above mentioned corresponds; said device being itself controlled by the keys aforesaid.

122. A permutational character-selecting mechanism, for use in a type-writing machine, linotyping-machine, type-setting machine, or other similar instrument, including in combination with suitable character-controlling devices, a group of electromagnets, each serving to control a group of the character-controlling devices aforesaid; keys, less in number than said electromagnets, each key corresponding to and operating to control one of said electromagnets; and a device operating to control one of said electromagnets to which no one of the keys above mentioned corresponds; said device being itself controlled by the keys aforesaid.

123. A permutational character-selecting mechanism, for use in a type-writing machine, or other similar instrument, including in combination with the type-bars, a group of electromagnets, each serving to control a group of the type-bars aforesaid; keys, less in number than said electromagnets, each key corresponding to and operating to control one of said electromagnets; and a device operating to control one of said electromagnets to which no one of the keys above mentioned corresponds; said device being itself controlled by the keys aforesaid.

124. A permutational character-selecting mechanism, for use in a type-writing machine, linotyping-machine, type-setting machine, or other similar instrument, including in combination with suitable character-controlling devices, a group of electromagnets, each serving to control a group of the character-controlling devices aforesaid; a plurality of the character-controlling devices in each group being normally disconnected from the electromagnet controlling said group; keys, less in number than said electromagnets, each key corresponding to and serving to control one of said electromagnets; a device serving to control one of the electromagnets aforesaid to which no one of the keys aforesaid corresponds; said device being itself controlled by the keys aforesaid; and means operating to connect the different character-controlling devices, controlled by an electromagnet with such electromagnet, each as required.

125. A permutational character-selecting mechanism, for use in a type-writing machine, linotyping-machine, type-setting machine, or other similar instrument, including in combination with suitable character-controlling devices, a group of electromagnets, each serving to control a group of the character-controlling devices aforesaid; a plurality of the character-controlling devices in each group being normally disconnected from the electromagnet controlling said group; keys, less in number than said electromagnets, each key corresponding to and serving to control one of said electromagnets; a device serving to control one of the electromagnets aforesaid to which no one of the keys aforesaid corresponds; said device being itself controlled by the keys aforesaid; and devices, each serving to connect a different character-controlling device in each of the groups aforesaid with the electromagnet controlling such group.

126. A permutational character-selecting mechanism, for use in a type-writing machine, or other similar instrument, including in combination with suitable type-bars, a group of electromagnets, each serving to control a group of the type-bars aforesaid; a plurality of the type-bars being in each group normally disconnected from the electromagnet controlling said group; keys, less in number than said electromagnets, each key corresponding to and serving to control one of said electromagnets; a device serving to control one of the electromagnets aforesaid to which no one of the keys aforesaid corresponds; said device being itself controlled by the keys aforesaid; and means operating to connect the different type-bars controlled by an electromagnet with such electromagnet, each as required.

127. A permutational character-selecting mechanism, for use in a type-writing machine, or other similar instrument, including in combination with suitable type-bars, a group of electromagnets, each serving to control a group of the type-bars aforesaid; a plurality of the type-bars of each group being normally disconnected from the electromagnet controlling said group; keys, less in number than said electromagnets, each key corresponding to and serving to control one of said electromagnets; a device serving to control one of the electromagnets aforesaid to which no one of the keys aforesaid corresponds; said device being itself controlled by the keys aforesaid; and devices, each serving to connect a different type-bar in each of the groups aforesaid with the electromagnet controlling such group.

128. In a type-writing machine, linotyping-machine, type-setting machine or other similar instrument, an organization for producing consecutive letters by simultaneous actions of the operator, including in combination (a) two sets of suitable printing characters; (b) quick-acting letter-selecting mechanism, controlling one of said sets of printing characters, and adapted to afford facility to the operator to produce by its manipulation various letters singly, each as desired; and (c) slow-acting letter-selecting mechanism, controlling the other one of the two sets of printing characters aforesaid, and also adapted to afford facility to the operator to produce by its manipulation, various letters singly, each as desired.

129. In a type-writing machine, linotyping-machine, type-setting machine, or other similar instrument, an organization for producing consecutive letters by the simultaneous depressing of different keys, including in combination (a) two sets of suitable printing characters; (b) two sets of keys, one set of keys controlling one of the sets of printing characters before mentioned, and the other set of keys controlling the other set of printing characters above mentioned; the keys of the two sets being arranged in such juxtaposition that keys of each set can be depressed by the operator at the same instant, keys of the two sets operating when thus depressed simultaneously for the production of consecutive letters, one letter from each of the two sets of printing characters above mentioned; (c) quick-acting letter-controlling mechanism connected with one of the sets of keys before mentioned and operating upon one of the sets of printing characters before mentioned; and (d) slow-acting letter-controlling mechanism, connected with the other set of keys above mentioned, and operating upon the other set of printing characters above mentioned.

130. In a type-writing machine, linotyping-machine, type-setting machine, or other similar instrument, an organization for producing consecutive letters by the simultaneous depressing of different keys, including in combination, (a) two sets of ultimate letter-controlling devices; (b) two sets of keys, one set of keys controlling one of the two sets of ultimate letter-controlling devices above mentioned and the other set of keys controlling the other set of ultimate letter-controlling devices above mentioned; the keys of each set being adapted to afford facility to the operator to produce by its manipulation various letters individually, each as desired; the keys of the two sets being arranged in such juxtaposition that keys of each set can be depressed by the operator at the same instant; keys of the two sets operating, when thus depressed simultaneously for the production of consecutive letters, one letter from each of the sets of ultimate letter-controlling devices above mentioned; (c) quick-acting connections intermediate one set of keys and the ultimate letter-controlling devices controlled by such keys; and (d) slow-acting connections intermediate the other set of keys and the set of ultimate letter-controlling devices controlled by such keys.

131. In a type-writing machine, type-setting machine, or other similar instrument, and in combination, two sets of printing characters, the different characters in each set being movable independently of each other; a quick-acting letter-controlling mechanism, operating upon one of the sets of printing characters above mentioned; and a slow-acting letter-controlling mechanism operating upon the other set of printing characters above mentioned, each of said letter-controlling mechanisms serving to afford facility to the operator to produce various letters singly, each as required; one of the letter-controlling mechanisms above mentioned being a permutational letter-selecting device, having a number of keys less than the number of characters controlled by it, said keys operating in various combinations or permutations to produce a large number of characters.

132. In a type-writing machine, linotyping-machine, type-setting machine, or other similar instrument, and in combination, two sets of printing characters, the different characters in each set being movable and controllable independently of each other; two sets of ultimate letter-controlling devices, the ultimate letter-controlling devices of one set controlling one of the sets of printing characters above mentioned and the ultimate letter-controlling devices of the other set, controlling the other set of printing characters above mentioned; quick-acting letter-controlling mechanism operating upon one of the sets of ultimate letter-controlling devices before mentioned; and slow-acting letter-controlling mechanism, operating upon the other set of ultimate letter-controlling devices before mentioned; each of said letter-controlling mechanisms serving to afford facility to the operator to select letters singly; one of the letter-controlling mechanisms above mentioned being a permutational letter-selecting device, having a number of keys less than the number of characters controlled by it, said keys operating in various combinations or permutations to produce a large number of characters.

133. In a type-writing machine or other similar instrument, an organization for producing consecutive letters by simultaneous actions of the operator, said organization including, in combination, two sets of type-bars, the bars of each set being arranged so that they strike to a printing-point common to the bars of such set, the printing-points of the two sets of bars being adjacent to each other; and type-bar-controlling mechanisms for each of the sets of type-bars above mentioned; one of said type-bar-controlling mechanisms being a permutational type-bar-selecting device, having a number of keys less than the number of type-bars controlled by it; said permutational type-bar-selecting device being constructed and arranged in such a manner that its small number of keys, operating in various permutations or combinations, serve to bring into action individually the various type-bars controlled by it, each as required; a traveling paper-carriage; means whereby said carriage is advanced as the letters are printed; and a space-key adapted to be operated simultaneously with the type-bar-controlling keys; said space-key controlling mechanism whereby the interverbal space is made; the whole being arranged in such a manner that the operator can make the interverbal space by acting upon the space-key at the same instant that he acts upon the type-bar-controlling keys to make a letter.

134. In a type-writing machine or other similar instrument, an organization for producing consecutive letters by simultaneous actions of the operator, said organization including, in combination, two sets of type-bars, the bars of each set being arranged so that they strike to a printing-point common to the bars of such set, the printing-points of the two sets of bars being adjacent to each other; type-bar-controlling mechanisms for each of the sets of type-bars above mentioned; one of said type-bar-controlling mechanisms being a permutational type-bar-selecting device, having a number of keys less than the number of type-bars controlled by it; said permutational type-bar-selecting device being constructed and arranged in such a manner that its small number of keys, operating in various permutations or combinations, serve to bring into action individually the various type-bars controlled by it, each as required; a traveling paper-carriage; means whereby said carriage is advanced two letter-spaces, when two type-bars, belonging one to one of the sets and the other to the other of the two sets before mentioned, act simultaneously; and a space-key, adapted to be acted upon by the operator simultaneously with the keys which produce the last two letters of a word, said space-key controlling mechanism whereby the interverbal space is made.

135. In a type-writing machine or other similar instrument, an organization for producing consecutive letters by simultaneous actions of the operator, said organization including, in combination, two sets of type-bars, the bars of each set being arranged so that they strike to a printing-point common to the bars of such set, the printing-points of the two sets of bars being adjacent to each other; type-bar-controlling mechanisms for each of the sets of type-bars above mentioned; one of said type-bar-controlling mechanisms being a permutational type-bar-selecting device, having a number of keys less than the number of type-bars controlled by it; said permutational type-bar-selecting device being constructed and arranged in such a manner that its small number of keys, operating in various permutations or combinations, serve to bring into action individually the various type-bars controlled by it, each as required; a traveling paper-carriage; spacing mechanism therefor, including a loose dog; a space-enlarger serving to increase the play of said loose dog; and a space-key, adapted to be depressed simultaneously with type-bar-controlling keys and serving to control the space-enlarger aforesaid.

136. In a type-writing machine or other similar instrument, an organization for producing consecutive letters by simultaneous actions of the operator, said organization including, in combination, two sets of type-bars, the bars of each set being arranged in such a manner that they strike to a printing-point common to the bars of such set, the printing-points of the two sets of bars being adjacent to each other; and type-bar-controlling mechanisms for each of the sets of type-bars above mentioned; one of the type-bar-controlling mechanisms above mentioned being a permutational type-bar-selecting device, having a number of keys less than the number of type-bars controlled by it; said permutational type-bar-selecting device being constructed and arranged in such a manner that its small number of keys, operating in various permutations or combinations, serve to bring the various type-bars controlled by it into action individually; said permutational type-bar-selecting device including a motor device acting to impel a plurality of the type-bars aforesaid, each as required; a traveling paper-carriage; means whereby said carriage is advanced as the letters are printed; and a space-key adapted to be operated simultaneously with the type-bar-controlling keys; said space-key controlling mechanism whereby the interverbal space is made; the whole being arranged in such a manner that the operator can make the interverbal space by acting upon the space-key at the same instant that he acts upon the type-bar-controlling keys to make a letter.

137. In a type-writing machine or other similar instrument, an organization for producing consecutive letters by simultaneous actions of the operator, said organization including, in combination, two sets of type-bars, the bars of each set being arranged in such a manner that they strike to a printing-point common to the bars of such set, the printing-points of the two sets of bars being adjacent to each other; and type-bar-controlling mechanisms for each of the sets of type-bars above mentioned; one of the type-bar-controlling mechanisms above mentioned being a permutational type-bar-selecting device, having a number of keys less than the number of type-bars controlled by it; said permutational type-bar-selecting device being constructed and arranged in such a manner that its small number of keys, operating in various permutations or combinations, serve to bring the various type-bars controlled by it into action individually; said permutational type-bar-selecting device including a motor device acting to impel a plurality of the type-bars aforesaid, each as required; a traveling paper-carriage; means whereby said carriage is advanced two letter-spaces, when two type-bars, belonging one to one of the two sets and the other to the other of the two sets before mentioned, act simultaneously; and a space-key, adapted to be acted upon by the operator simultaneously with the keys which produce the last two letters of a word, said space-key controlling mechanism whereby the interverbal space is made.

138. In a type-writing machine or other similar instrument, an organization for producing consecutive letters by simultaneous actions of the operator, said organization including, in combination, two sets of type-bars, the bars of each set being arranged in such a manner that they strike to a printing-point common to the bars of such set, the printing-points of the two sets of bars being adjacent to each other; and type-bar-controlling mechanisms for each of the sets of type-bars above mentioned; one of the type-bar-controlling mechanisms above mentioned being a permutational type-bar-selecting device, having a number of keys less than the number of type-bars controlled by it; said permutational type-bar-selecting device being constructed and arranged in such a manner that its small number of keys, operating in various permutations or combinations, serve to bring the various type-bars controlled by it into action individually; said permutational type-bar-selecting device including a motor device acting to impel a plurality of the type-bars aforesaid, each as required; a traveling paper-carriage; spacing mechanism therefor, including a loose dog; a space-enlarger serving to increase the play of said loose dog; and a space-key, adapted to be depressed simultaneously with type-bar-controlling keys and serving to control the space-enlarger aforesaid.

139. In a type-writing machine or other similar instrument, and in combination therein with the type-bars, permutational selecting mechanism, having (a) controlling elements, fewer in number than the type-bars controlled by them; (b) motor mechanism, acting upon controlling elements of the permutational selecting mechanism aforesaid; and (c) keys, controlling the action of said motor mechanism upon the permutational selecting mechanism; said keys thereby controlling the type-bars aforesaid; a traveling paper-carriage; means whereby said carriage is advanced, as the letters are printed; and a space-key, adapted to be operated simultaneously with the type-bar-controlling keys;

said space-key controlling mechanism whereby the interverbal space is made; the whole being arranged in such a manner that the operator can make the interverbal space by acting upon the space-key at the same instant that he acts upon the type-bar-controlling keys to make a letter.

140. In a type-writing machine or other similar instrument, and in combination therein with the type-bars, permutational selecting mechanism, having (a) controlling elements, fewer in number than the type-bars controlled by them; (b) motor mechanism, acting upon controlling elements of the permutational selecting mechanism aforesaid; and (c) keys, controlling the action of said motor mechanism upon the permutational selecting mechanism; said keys thereby controlling the type-bars aforesaid; a traveling paper-carriage; spacing mechanism therefor, including a loose dog; a space-enlarger serving to increase the play of said loose dog; and a space-key adapted to be depressed simultaneously with type-bar-controlling keys, and serving to control the space-enlarger aforesaid.

141. In a type-writing machine or other similar instrument, and in combination therein with the type-bars, permutational selecting mechanism, having (a) controlling elements, fewer in number than the type-bars controlled by them, (b) motor mechanism, acting through controlling elements of the permutational selecting mechanism aforesaid upon the type-bars aforesaid, and (c) keys, controlling said motor mechanism; said keys thereby controlling the type-bars aforesaid; a traveling paper-carriage; means whereby said carriage is advanced, as the letters are printed; and a space-key, adapted to be operated simultaneously with the type-bar-controlling keys; said space-key controlling mechanism whereby the interverbal space is made; the whole being arranged in such a manner that the operator can make the interverbal space by acting upon the space-key at the same instant that he acts upon the type-bar-controlling keys to make a letter.

142. In a type-writing machine or other similar instrument, and in combination therein with the type-bars, permutational selecting mechanism, having (a) controlling elements, fewer in number than the type-bars controlled by them, (b) motor mechanism, acting through controlling elements of the permutational selecting mechanism aforesaid upon the type-bars aforesaid, and (c) keys, controlling said motor mechanism; said keys thereby controlling the type-bars aforesaid; a traveling paper-carriage; spacing mechanism therefor, including a loose dog; a space-enlarger serving to increase the play of said loose dog; and a space-key, adapted to be depressed simultaneously with type-bar-controlling keys and serving to control the space-enlarger aforesaid.

143. In a type-writing machine or other similar instrument, an organization for producing consecutive letters by simultaneous actions of the operator, said organization including (A) two sets of type-bars, the bars of each set striking to a printing-point common to the bars of such set, the printing-points of the two sets of bars being adjacent to each other; (B) permutational character-selecting mechanism, serving to operate the type-bars of one of the two sets aforesaid; said permutational character-selecting mechanism having (a) controlling elements fewer in number than the type-bars operated thereby; (b) type-bar-controlling keys; (c) motor mechanism controlled by said keys; said motor mechanism acting through controlling elements of the permutational selecting mechanism before mentioned upon the type-bars controlled thereby; (C) suitable means for operating the type-bars of the other one of the two sets above mentioned; (D) a traveling paper-carriage; (E) means whereby said carriage is advanced, as the letters are printed; and (F) a space-key, adapted to be operated simultaneously with the type-bar-controlling keys; said space-key controlling mechanism whereby the interverbal space is made; the whole being arranged in such a manner that the operator can make the interverbal space by acting upon the space-key at the same instant that he acts upon the type-bar-controlling keys to make a letter.

144. In a type-writing machine or other similar instrument, an organization for producing consecutive letters by simultaneous actions of the operator, said organization including (A) two sets of type-bars, the bars of each set striking to a printing-point common to the bars of such set, the printing-points of the two sets of bars being adjacent to each other; (B) permutational character-selecting mechanism, serving to operate the type-bars of one of the two sets aforesaid; said permutational character-selecting mechanism having (a) controlling elements fewer in number than the type-bars operated thereby; (b) type-bar-controlling keys; and (c) motor mechanism controlled by said keys; said motor mechanism acting through controlling elements of the permutational selecting mechanism before mentioned upon the type-bars controlled thereby; (C) suitable means for operating the type-bars of the other one of the two sets above mentioned; (D) a traveling paper-carriage; (E) means whereby said carriage is advanced two letter-spaces, when two type-bars, belonging one to one of the two sets and the other to the other of the two sets before mentioned, act simultaneously; and (F) a space-key, adapted to be acted upon by the operator simultaneously with the keys which produce the last two letters of a word, said space-key controlling mechanism whereby the interverbal space is made.

145. In a type-writing machine or other similar instrument, an organization for producing consecutive letters by simultaneous actions of the operator, said organization including (A) two sets of type-bars, the bars of each set striking to a printing-point common to the bars of such set, the printing-points of the two sets of bars being adjacent to each other; (B) permutational character-selecting mechanism, serving to operate the type-bars of one of the two sets aforesaid; said permutational character-selecting mechanism having (a) controlling elements fewer in number than the type-bars operated thereby; (b) type-bar-controlling keys; (c) motor mechanism controlled by said keys; said motor mechanism acting through controlling elements of the permutational selecting mechanism before mentioned upon the type-bars controlled thereby; (C) suitable means for operating the type-bars of the other one of the two sets above mentioned; (D) a traveling paper-carriage; (E) spacing mechanism therefor, including a loose dog; (F) a space-enlarger, serving to increase the play of said loose dog; and (G) a space-key, adapted to be depressed simultaneously with type-bar-controlling keys, and serving to control the space-enlarger aforesaid.

146. In a type-writing machine or other similar instrument, an organization for producing consecutive letters by simultaneous actions of the operator, said organization including (a) two sets of type-bars; (b) two sets of keys; (c) quick-acting connections between the one set of keys and the set of type-bars controlled thereby; (d) slow-acting connections between the other set of keys and the set of type-bars controlled by such keys; the quick-acting connections and the slow-acting connections aforesaid having such differing rapidities of action that when keys of the two sets are depressed simultaneously, the type-bars controlled respectively by them print in rapid succession; and releasing mechanism for the type-bars of the quick-acting set, whereby said type-bars are left free to retreat from the printing-point, before the keys controlling them are released.

147. In a type-writing machine or other similar instrument, an organization for producing consecutive letters by simultaneous actions of the operator, said organization including (a) two sets of type-bars; (b) two sets of keys; (c) quick-acting connections between the one set of keys and the set of type-bars controlled thereby; (d) slow-acting connections between the other set of keys and the set of type-bars controlled by such keys; the quick-acting connections and the slow-acting connections aforesaid having such differing rapidities of action that when keys of the two sets are depressed simultaneously, the type-bars controlled respectively by them print in rapid succession; and releasing mechanism for the type-bars of each of the two sets above mentioned, whereby said type-bars are left free to retreat from the printing-point before the keys controlling them are released.

148. In a type-writing machine or other similar instrument, an organization for producing consecutive letters by simultaneous actions of the operator, said organization including, in combination, two sets of type-bars, the bars of each set being arranged in such a manner that they strike to a printing-point common to the bars of such set, the printing-points of the two sets of bars being adjacent to each other; and type-bar-controlling mechanisms for each of the sets of type-bars above mentioned; one of the type-bar-controlling mechanisms above mentioned being a permutational type-bar-selecting device, having a number of keys less than the number of type-bars controlled by it; said permutational type-bar-selecting device being constructed and arranged in such a manner that its small number of keys, operating in various permutations or combinations, serve to bring the various type-bars controlled by it into action individually; said permutational type-bar-selecting device including (a) a motor device acting to impel a plurality of the type-bars aforesaid, each as required; said type-bars being normally disconnected from said motor device; and (b) means whereby said type-bars are connected, each as required, with the motor device aforesaid; and releasing mechanism for the type-bars of one at least of the sets before mentioned, whereby said type-bars are left free to retreat from the printing-point before the keys controlling them are released.

149. In a type-writing machine, linotyping-machine, type-setting machine, or other similar instrument, and in combination therein with suitable character-corresponding devices, permutational selecting mechanism, having (a) a plurality of controlling elements, acting in different combinations for the operating of the different-character-corresponding devices aforesaid; (b) keys; (c) a motor device, controlled by said keys and acting to impel a plurality of the type-bars aforesaid, each as required; and releasing mechanism, whereby the type-bars impelled by the motor device above mentioned are left free to retreat from the printing-point before the keys controlling them are released.

150. In a type-writing machine, and in combination therein with the type-bars, permutational selecting mechanism, having (a) a plurality of controlling elements, acting in different combinations for the operating of the different type-bars aforesaid; (b) keys; (c) an electromagnetic motor device, controlled by said keys and acting to impel a plurality of the type-bars aforesaid, each as required; and releasing mechanism, operating to free the type-bars by cutting off current from the electromagnetic motor aforesaid, whereby the type-bars are left free to retreat from the printing-point before the keys controlled by them are released.

151. In a type-writing machine or other similar instrument, and in combination, type-bars striking to a common center; electromagnetic motor mechanism serving for the impelling of said type-bars; keys controlling the other parts before mentioned; and releasing mechanism for the type-bars, said releasing mechanism including an electromagnet situated in a circuit distinct from the working circuit or circuits of the motor mechanism aforesaid; said electromagnet in the circuit before mentioned as distinct from the working circuit or circuits of the mechanism, operating to cut off current from said working circuit or circuits.

152. In a type-writing machine or other similar instrument, and in combination, type-bars striking to a common center; electromagnetic motor mechanism serving for the impelling of said type-bars; keys, controlling the other parts before mentioned; and releasing mechanism for the type-bars, said releasing mechanism including an electromagnet situated in a circuit distinct from the working circuit or circuits of the motor mechanism aforesaid; said electromagnet in the circuit before mentioned as distinct from the working circuit or circuits of the motor mechanism, operating to cut off current from said working circuit or circuits; and means for adjusting the quickness of action of the magnet before mentioned as forming part of the releasing mechanism.

153. In a type-writing machine, linotyping-machine, type-setting machine, or other similar instrument, and in combination, character-corresponding devices; permutational character-selecting mechanism, serving to actuate the character-corresponding devices aforesaid; said permutational character-selecting mechanism including a plurality of motor devices, each serving to control a plurality of the character-corresponding devices aforesaid.

154. In a type-writing machine, linotyping-machine, type-setting machine, or other similar instrument, and in combination, character-corresponding devices; permutational character-selecting mechanism, serving to actuate the character-corresponding devices aforesaid; said permutational character-selecting mechanism including a plurality of motor devices, each serving to control a different group of the character-corresponding devices aforesaid; a plurality of character-corresponding devices in each group being normally disconnected from the motor device controlling such group; and keys, operating to connect said character-corresponding devices, each as required, with the corresponding motor device.

155. In a type-writing machine, linotyping-machine, type-setting machine, or other similar instrument, and in combination, character-corresponding devices; different-character-corresponding devices serving for the production of different characters; permutational character-selecting mechanism, serving to actuate the character-corresponding devices aforesaid; said permutational character-selecting mechanism including a plurality of motor devices, each serving to actuate a plurality of the character-corresponding devices aforesaid; and keys controlling the motor devices aforesaid.

156. In a type-writing machine, linotyping-machine, type-setting machine, or other similar instrument, and in combination, character-corresponding devices; different-character-corresponding devices serving for the production of different characters; permutational character-selecting mechanism, serving to actuate the character-corresponding devices aforesaid; said permutational character-selecting mechanism including a plurality of motor devices, each serving to actuate a different group of the character-corresponding devices aforesaid; a plurality of the character-corresponding devices in each group being normally disconnected from the motor device controlling such group; keys controlling said motor devices, and other keys, operating to connect different character-corresponding devices of a group, each as required, with the corresponding motor device.

157. In a type-writing machine or other similar instrument, and in combination, (a) a multiplicity of type-bars; (b) permutational selecting mechanism, serving to operate the type-bars aforesaid, and having controlling elements fewer in number than the type-bars operated thereby; (c) a plurality of motor devices acting respectively upon different controlling elements of the permutational selecting mechanism aforesaid; and (d) keys, controlling the motor devices aforesaid.

158. In a type-writing machine or other similar instrument, an organization for producing consecutive letters by simultaneous actions of the operator, said organization including (a) two sets of type-bars, the bars of each set striking to a printing-point common to the bars of such set, the printing-points of the two sets of bars being adjacent to each other; (b) permutational selecting mechanism serving to operate the type-bars of one of the two sets above mentioned; said permutational type-bar-selecting mechanism including a plurality of motor devices, each controlling a group of the type-bars aforesaid; a plurality of the type-bars in each group being normally disconnected from the motor device controlling such group; and means operating to connect the type-bars in a group, each as required, with the corresponding motor device; and (c) suitable means for operating the type-bars of the other one of the two sets above mentioned.

159. In a type-writing machine or other similar instrument, an organization for producing consecutive letters by simultaneous actions of the operator, said organization including (a) two sets of type-bars, the bars of each set striking to a printing-point common to the bars of such set, the printing-points of the two sets of bars being adjacent to each other; (b) permutational selecting mechanism, serving to operate the type-bars of one of the two sets above mentioned; said permutational type-bar-selecting mechanism including a plurality of motor devices, each controlling a group of the type-bars aforesaid; a plurality of the type-bars in each group being normally disconnected from the motor device controlling such group; keys, controlling said motor devices; and other keys operating to connect the different type-bars of a group, each type-bar as required, with the motor device corresponding to such group; said motor device thereupon operating for the impelling of the type-bar thus connected with it from its normal position to the printing-center; and (c) suitable means for operating the type-bars of the other one of the two sets above mentioned.

160. A permutational character-selecting mechanism, for use in a type-writing machine, linotyping-machine, type-setting machine, or other similar instrument, including a group of motor devices; keys, less in number than said motor devices, each key corresponding to and operating to control one of said motor devices; and a device operating to control one of said motor devices to which no one of the keys above mentioned corresponds; said motor-controlling device being itself controlled by the keys aforesaid.

161. A permutational character-selecting mechanism, for use in a type-writing machine, linotyping-machine, type-setting machine, or other similar instrument, including in combination with suitable character-controlling devices, a group of motor devices, each serving to control a group of the character-controlling devices aforesaid; keys, less in number than said motor devices, each key corresponding to and operating to control one of said motor devices; and a device operating to control one of said motor devices to which no one of the keys above mentioned corresponds; said motor-controlling device being itself controlled by the keys aforesaid.

162. A permutational character-selecting mechanism, for use in a type-writing machine, or other similar instrument, including, in combination with the type-bars, a group of motor devices, each serving to control a group of the type-bars aforesaid; keys, less in number than said motor devices, each key corresponding to and operating to control one of said motor devices; and a device operating to control one of said motor devices to which no one of the keys above mentioned corresponds; said motor-controlling device being itself controlled by the keys aforesaid.

163. A permutational character-selecting mechanism, for use in a type-writing machine, linotyping-machine, type-setting machine, or other similar instrument, including, in combination with suitable character-controlling devices, a group of motor devices, each serving to control a group of the character-controlling devices aforesaid; a plurality of the character-controlling devices in each group being normally disconnected from the motor device controlling said group; keys, less in number than said motor devices, each key corresponding to and serving to control one of said motor devices; a device serving to control one of the motor devices aforesaid to which no one of the keys aforesaid corresponds; said motor-controlling device being itself controlled by the keys aforesaid; and means operating to connect the different character-controlling devices, controlled by a motor device, with such motor device, each as required.

164. A permutational character-selecting mechanism, for use in a type-writing machine, linotyping-machine, type-setting machine, or other similar instrument, including in combination with suitable character-controlling devices a group of motor devices, each serving to control a group of the character-controlling devices aforesaid; a plurality of the character-controlling devices in each group being normally disconnected from the motor device controlling said group; keys, less in number than said motor devices, each key corresponding to and serving to control one of said motor devices; a device serving to control one of the motor devices aforesaid to which no one of the keys aforesaid corresponds; said motor-controlling device being itself controlled by the keys aforesaid; and devices, each serving to connect a different character-controlling device in each of the groups aforesaid with the motor device controlling such group.

165. A permutational character-selecting mechanism, for use in a type-writing machine, or other similar instrument, including, in combination with suitable type-bars, a group of motor devices, each serving to control a group of the type-bars aforesaid; a plurality of the type-bars in each group being normally disconnected from the motor device controlling said group; keys, less in number than said motor devices, each key corresponding to and serving to control one of said motor devices; a device serving to control one of the motor devices aforesaid to which no one of the keys aforesaid corresponds; said motor-controlling device being itself controlled by the keys aforesaid; and means operating to connect the different type-bars controlled by a motor device with such motor device, each as required.

166. A permutational character-selecting mechanism, for use in a type-writing machine, or other similar instrument, including, in combination with suitable type-bars, a group of motor devices, each serving to control a group of the type-bars aforesaid; a plurality of the type-bars in each group being normally disconnected from the motor device controlling said group; keys, less in number than said motor devices, each key corresponding to and serving to control one of said motor devices; a device serving to control one of the motor devices aforesaid to which no one of the keys aforesaid corresponds; said motor-controlling device being itself controlled by the keys aforesaid; and devices, each serving to connect a different type-bar in each of the groups aforesaid with the motor device controlling such group.

In testimony whereof I have hereunto set my hand, at Washington, in the District of Columbia, in the presence of the subscribing witnesses whose names are hereto annexed, this 20th day of October, A. D. 1896.

THADDEUS CAHILL.

Witnesses:
M. H. CAHILL,
GEO. F. CAHILL.